(12) United States Patent
Nishi et al.

(10) Patent No.: US 11,245,913 B2
(45) Date of Patent: Feb. 8, 2022

(54) ENCODER, DECODER, ENCODING METHOD, AND DECODING METHOD WITH PARAMETER SETS FOR PICTURES

(71) Applicant: Panasonic Intellectual Property Corporation of America, Torrance, CA (US)

(72) Inventors: Takahiro Nishi, Nara (JP); Tadamasa Toma, Osaka (JP); Kiyofumi Abe, Osaka (JP); Ryuichi Kanoh, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/839,850

(22) Filed: Apr. 3, 2020

(65) Prior Publication Data

US 2020/0236371 A1 Jul. 23, 2020

Related U.S. Application Data

(63) Continuation of application No. PCT/JP0218/036979, filed on Oct. 3, 2018.
(Continued)

(51) Int. Cl.
*H04N 19/31* (2014.01)
*H04N 19/117* (2014.01)
*H04N 19/172* (2014.01)

(52) U.S. Cl.
CPC .......... *H04N 19/31* (2014.11); *H04N 19/117* (2014.11); *H04N 19/172* (2014.11)

(58) Field of Classification Search
None
See application file for complete search history.

(56) References Cited

U.S. PATENT DOCUMENTS

2014/0064384 A1 3/2014 Wang
2015/0189299 A1 7/2015 Deshpande
(Continued)

FOREIGN PATENT DOCUMENTS

EP 1 589 760 10/2005
EP 1 684 522 7/2006
(Continued)

OTHER PUBLICATIONS

International Search Report dated Nov. 27, 2018 in International (PCT) Application No. PCT/JP2018/036979.
(Continued)

*Primary Examiner* — Stuart D Bennett
(74) *Attorney, Agent, or Firm* — Wenderoth, Lind & Ponack, L.L.P.

(57) ABSTRACT

An encoder which encodes a video including a plurality of pictures includes circuitry and memory. Using the memory, the circuitry performs: encoding a first picture among the plurality of pictures; and performing (i) a first operation for encoding a parameter set for a second picture which follows the first picture in coding order among the plurality of pictures after encoding the first picture, and encoding the second picture after encoding the parameter set, or (ii) a second operation for encoding the second picture without encoding the parameter set after encoding the first picture. The circuitry performs the first operation when the second picture is a determined picture, in the performing of the first operation or the second operation.

12 Claims, 44 Drawing Sheets

Related U.S. Application Data

(60) Provisional application No. 62/569,196, filed on Oct. 6, 2017.

(56) References Cited

U.S. PATENT DOCUMENTS

| | | | |
|---|---|---|---|
| 2015/0358629 A1* | 12/2015 | Choi | H04N 19/44 375/240.02 |
| 2016/0065983 A1 | 3/2016 | Choi et al. | |

FOREIGN PATENT DOCUMENTS

| | | |
|---|---|---|
| EP | 1 684 523 | 7/2006 |
| JP | 2015-119402 | 6/2015 |
| JP | 2015119402 A * | 6/2015 |

OTHER PUBLICATIONS

H.265 (ISO/IEC 23008-2 High efficiency video coding (HEVC)), "Information technology—High efficiency coding and media delivery in heterogeneous environments—Part 2: High efficiency video coding", Dec. 1, 2013.

Sakae Okubo et al., "H.264/AVC Textbook, Third Edition", Impress R&D, Jan. 1, 2009, pp. 101, with partial English translation.

Yong He et al., "MV-HEVC/SHVC HLS: On Picture Parameter Set", Joint Collaborative Team on Video Coding (JCT-VC) of ITU-T SG 16 WP 3 and ISO/IEC JTC 1/SC 29/WG 11, Document: JCT3V-G0159, 16th Meeting: San José, California, US, Jan. 9-17, 2014.

Extended European Search Report dated Nov. 18, 2020 in European Application No. 18864764.8.

Sameulsson et al., "Temporal layer access pictures", Joint Collaborative Team on Video Coding (JCT-VC) of ITU-T SG16 WP3 and ISO/IEC JTC1/SC29/WG11, 8th Meeting: San José, CA, USA, Feb. 1-10, 2012 Document: JCTVC-H0566, WG11 No. m23447, XP030051972.

Rickard Sjöberg et al., "Overview of HEVC High-Level Syntax and Reference Picture Management", IEEE Transactions on Circuits and Systems for Video Technology, Dec. 2012, vol. 22, No. 12, pp. 1858-1870.

High efficiency video coding, Recommendation ITU-T H.265, Apr. 2015, p. 33.

\* cited by examiner

FIG. 3

| TRANSFORM TYPE | BASIS FUNCTION $T_i(j)$, $i, j = 0, 1, ..., N-1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$ <br> WHERE $\omega_0 = \begin{cases} \sqrt{\dfrac{2}{N}} & i = 0 \\ 1 & i \neq 0 \end{cases}$ |
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$ <br> WHERE $\omega_0 = \begin{cases} \sqrt{\dfrac{2}{N}} & i = 0 \\ 1 & i \neq 0 \end{cases}$, $\omega_1 = \begin{cases} \sqrt{\dfrac{2}{N}} & j = 0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

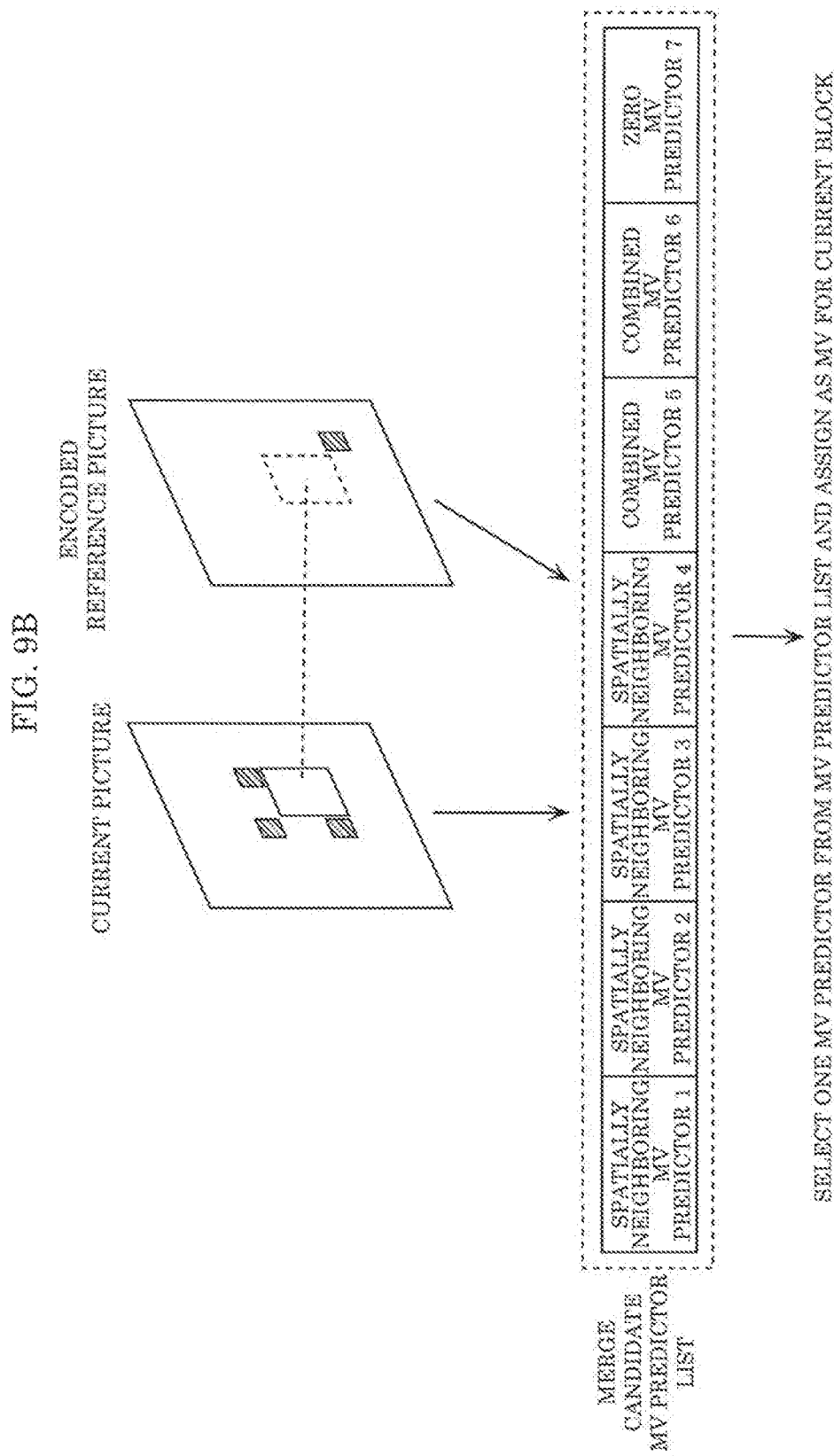

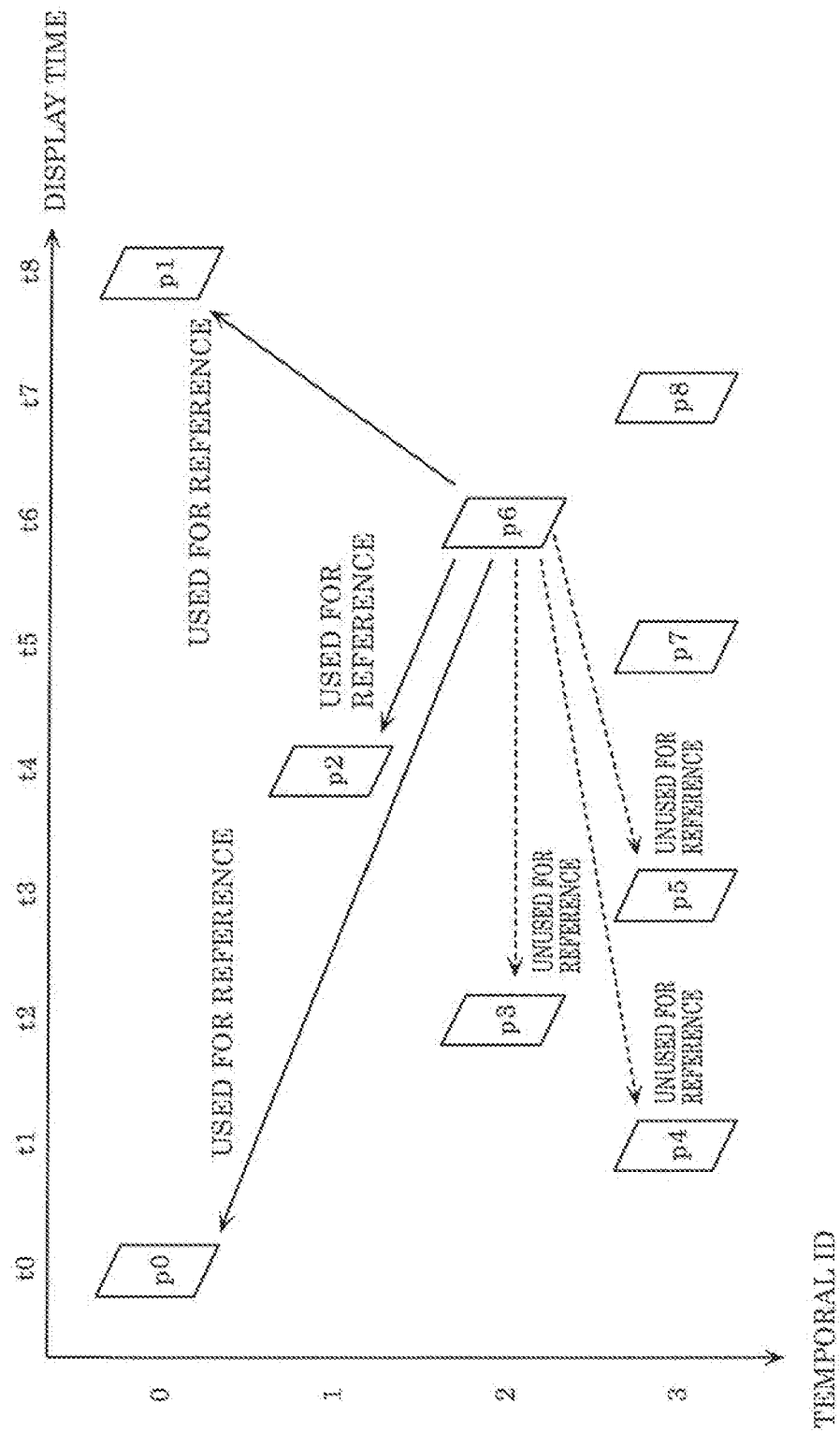

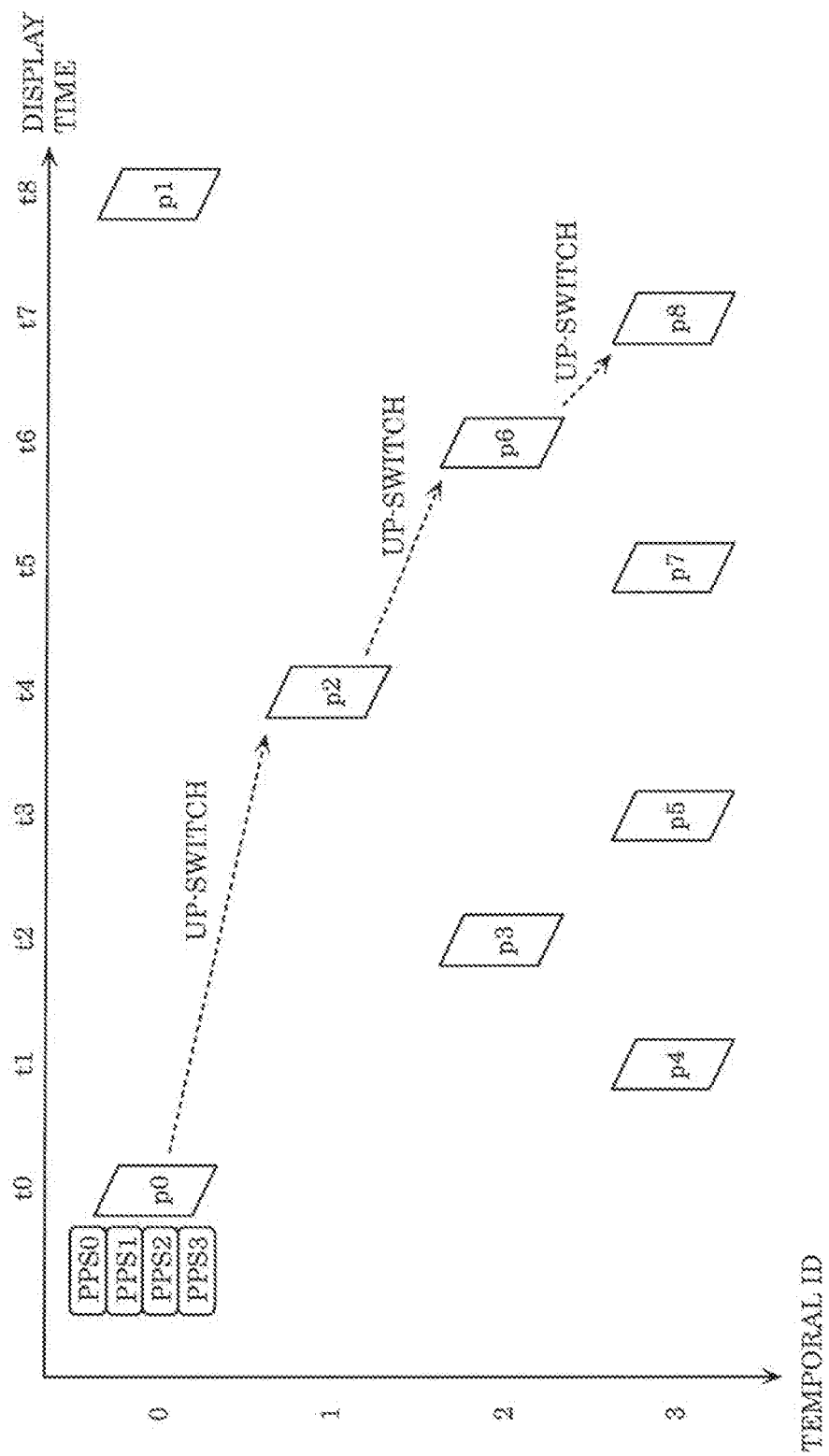

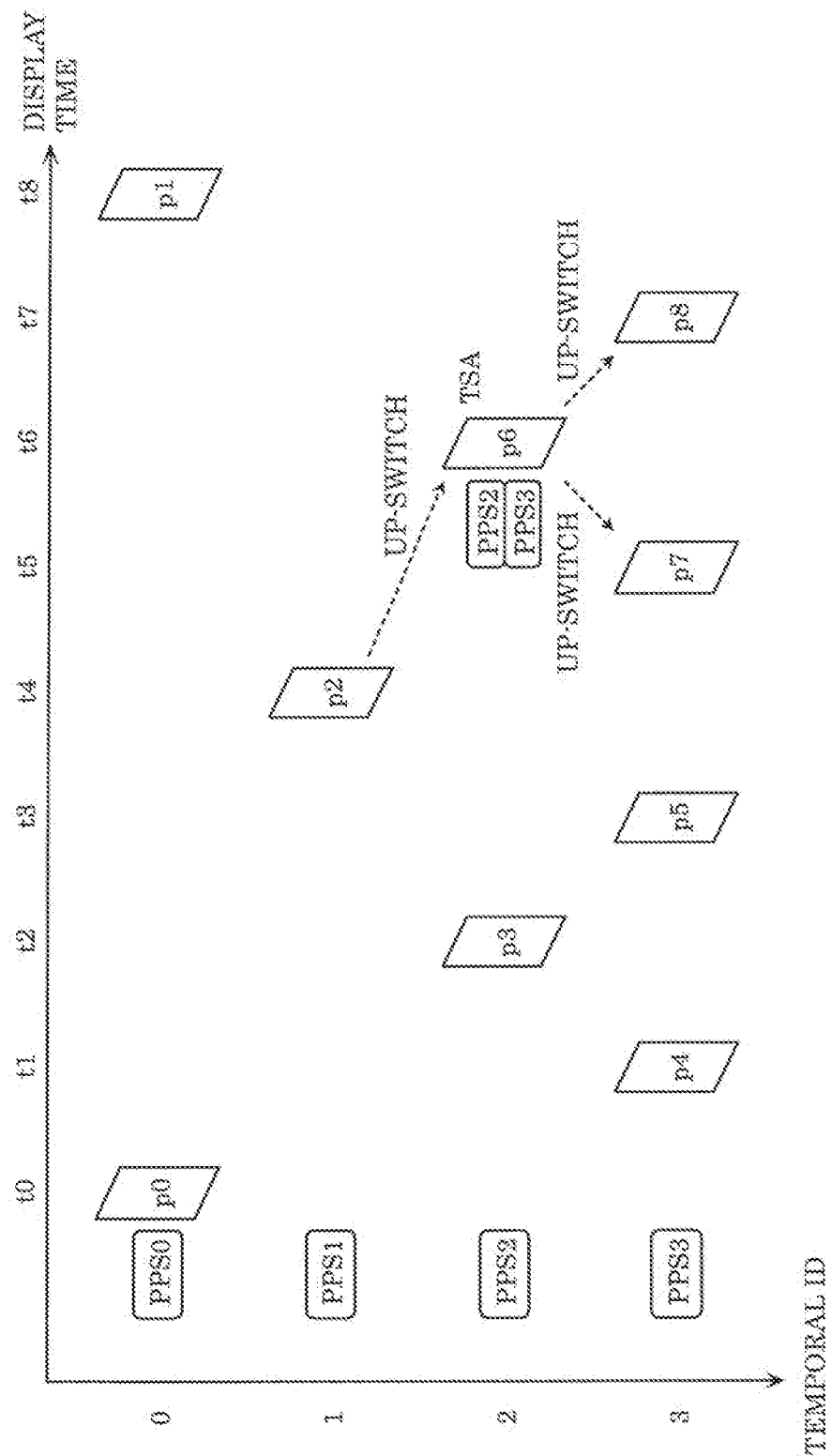

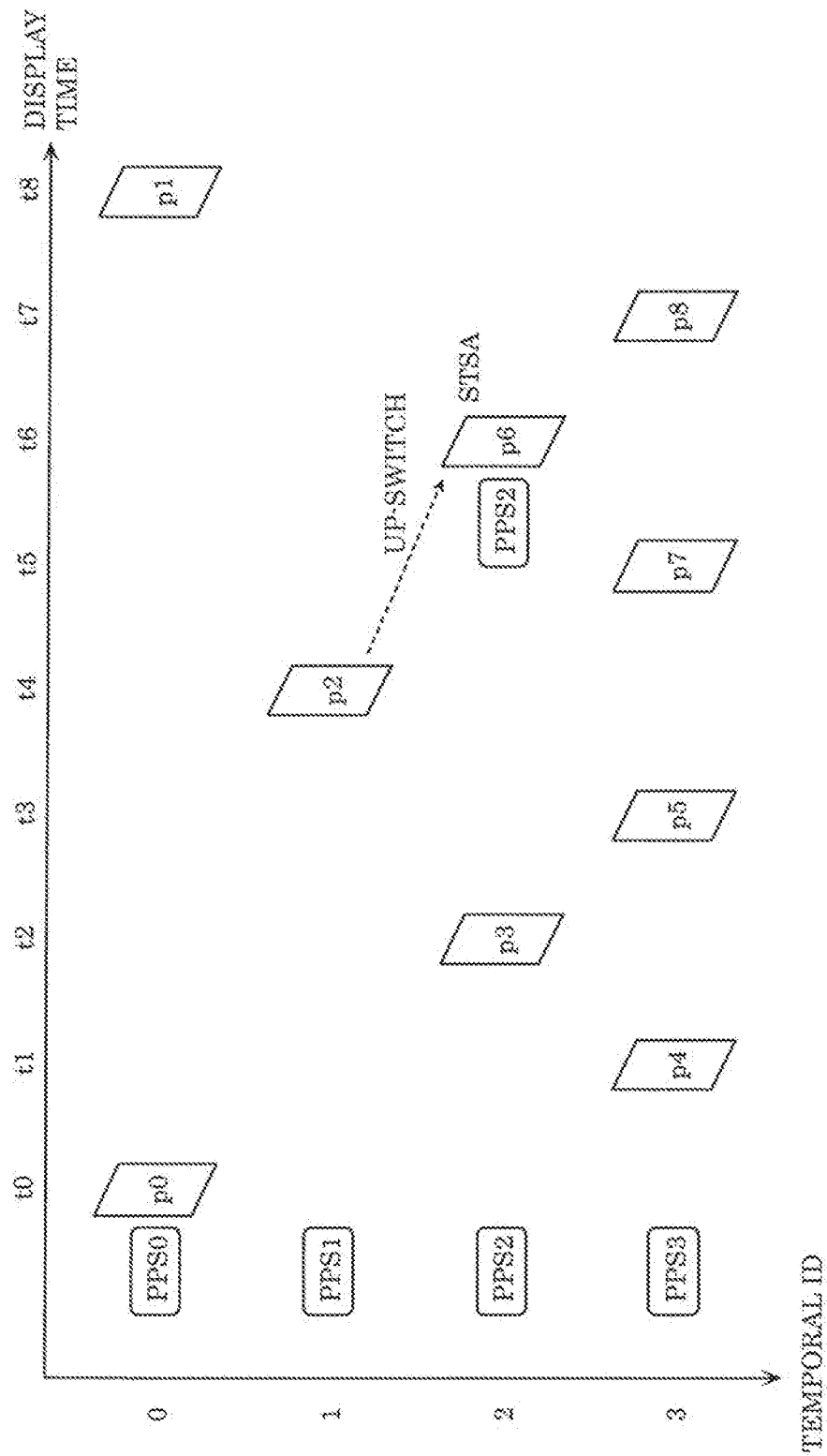

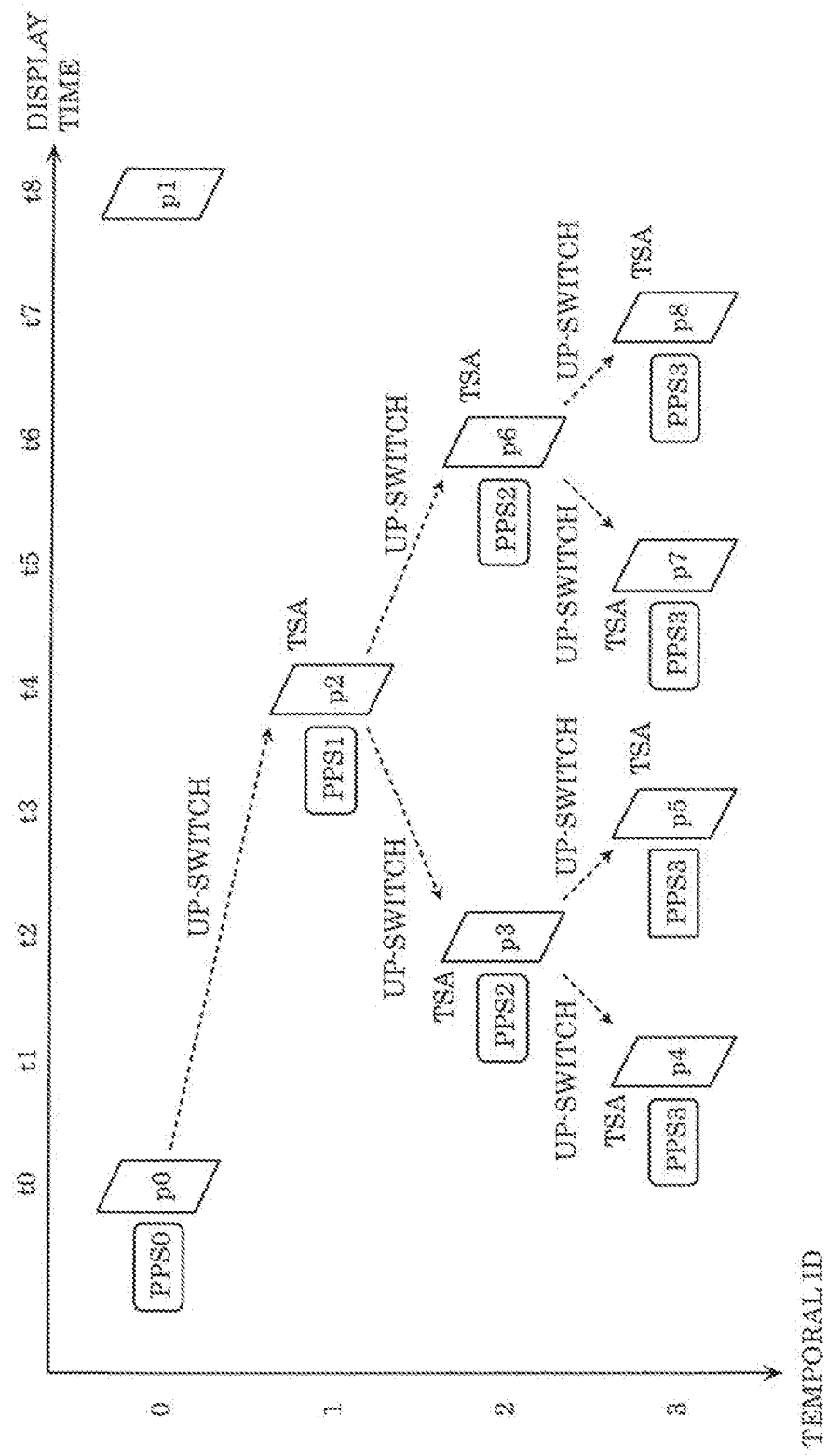

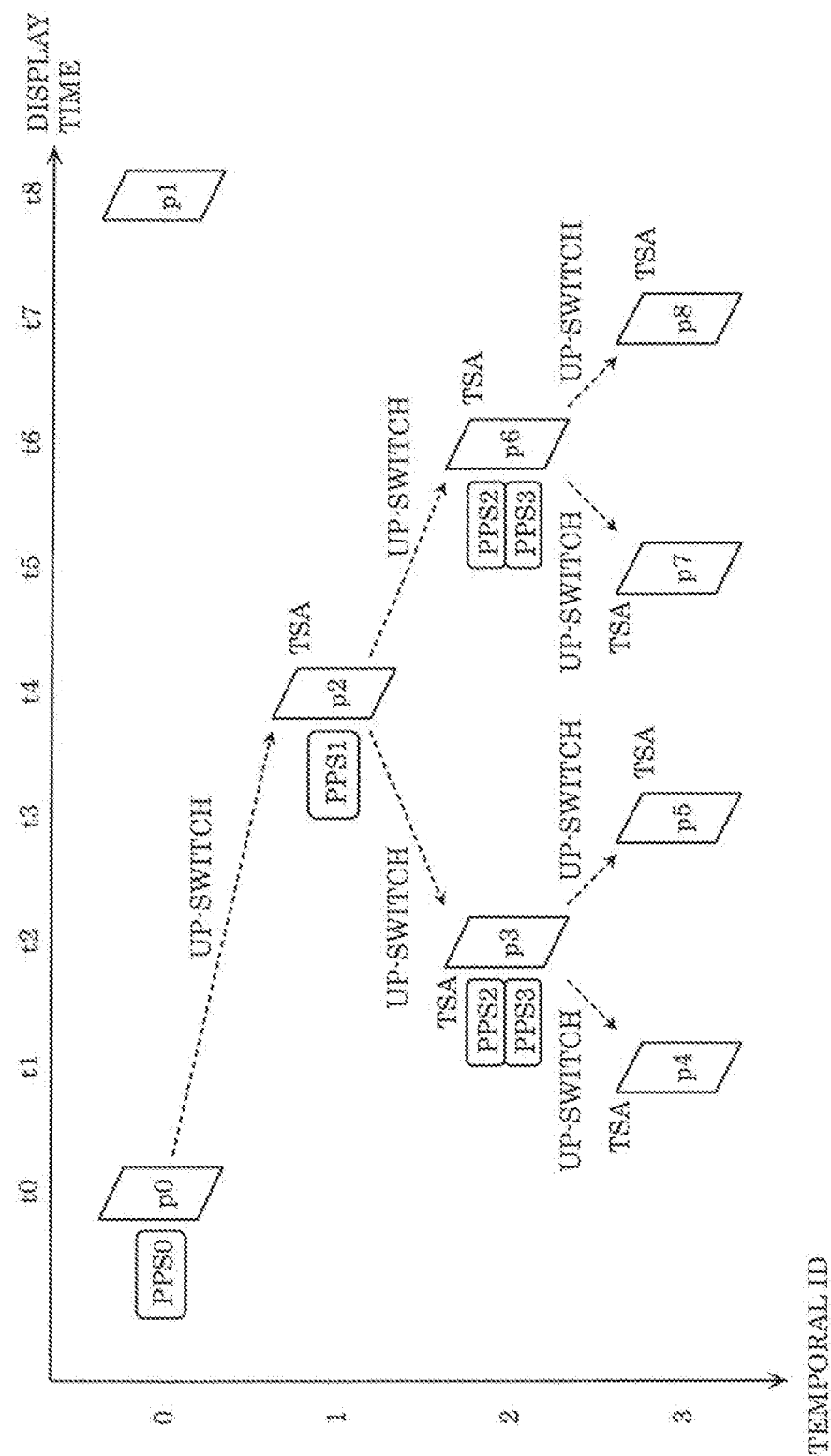

ical Field
ENCODER, DECODER, ENCODING METHOD, AND DECODING METHOD WITH PARAMETER SETS FOR PICTURES

CROSS REFERENCE TO RELATED APPLICATIONS

This application is a U.S. Continuation Application of PCT International Patent Application Number PCT/JP2018/036979 filed on Oct. 3, 2018, claiming the benefit of priority of U.S. Provisional Patent Application No. 62/569,196 filed on Oct. 6, 2017, the entire contents of which are hereby incorporated by reference.

BACKGROUND

1. Technical Field

The present disclosure relates to an encoder, etc., for encoding a video including a plurality of pictures.

2. Description of the Related Art

There has conventionally been H. 265 called High Efficiency Video Coding (HEVC) as a standard for encoding videos (H. 265 (ISO/IEC 23008-2 HEVC)/HEVC (High Efficiency Video Coding).

SUMMARY

In addition, an encoder according to an aspect of the present disclosure is an encoder which encodes a video including a plurality of pictures and includes circuitry and memory. Using the memory, the circuitry performs: encoding a first picture among the plurality of pictures; and performing (i) a first operation for encoding a parameter set for a second picture which follows the first picture in coding order among the plurality of pictures after encoding the first picture, and encoding the second picture after encoding the parameter set, or (ii) a second operation for encoding the second picture without encoding the parameter set after encoding the first picture. The circuitry performs the first operation when the second picture is a determined picture, in the performing of the first operation or the second operation.

These general and specific aspects may be implemented using a system, a device, a method, an integrated circuit, a computer program, or a non-transitory computer-readable recording medium such as a CD-ROM, or any combination of systems, devices, methods, integrated circuits, computer programs, or computer-readable recording media.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 is a chart indicating transform basis functions for each transform type.

FIG. 9B is for illustrating an outline of a process for deriving a motion vector via merge mode.

FIG. 14A is a conceptual diagram illustrating a first specific example of a reference restriction of filter information according to Embodiment 1.

FIG. 19 is a conceptual diagram illustrating a second specific example of PPS notification according to a variation.

FIG. 20A is a conceptual diagram illustrating a third specific example of PPS notification according to a variation.

FIG. 20B is a conceptual diagram illustrating a fourth specific example of PPS notification according to a variation.

FIG. 21A is a conceptual diagram illustrating a fifth specific example of PPS notification according to a variation.

FIG. 21B is a conceptual diagram illustrating a sixth specific example of PPS notification according to a variation.

Figure 1:
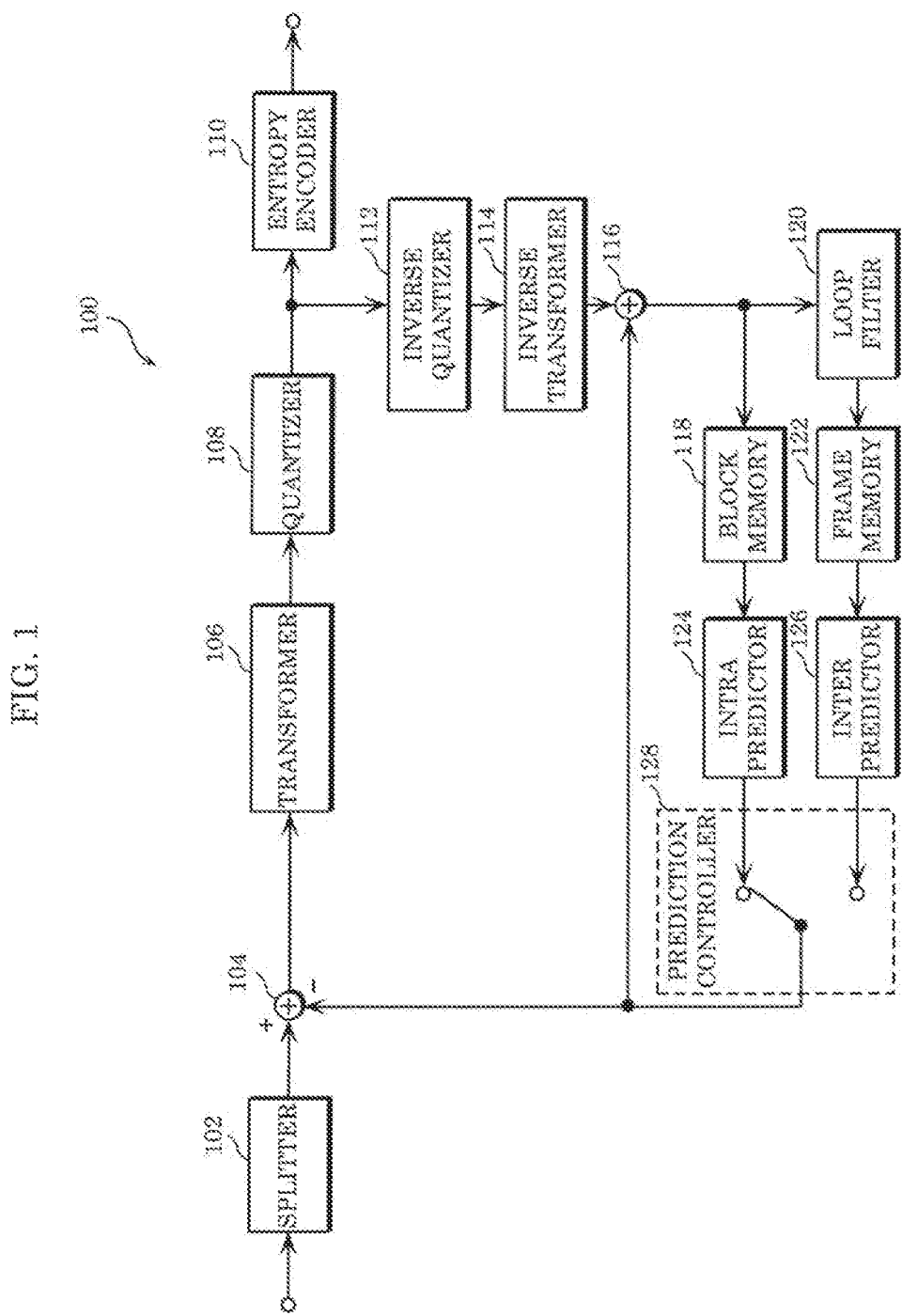
FIG. 1 is a block diagram illustrating a functional configuration of an encoder according to Embodiment 1.

DETAILED DESCRIPTION OF THE EMBODIMENTS (Underlying Knowledge Forming Basis of the Present Disclosure)

For example, an encoder which encodes a video including a plurality of pictures may encode a current picture to be encoded among a plurality of pictures by referring to an encoded picture among the plurality of pictures. Likewise, a decoder which decodes a video including a plurality of pictures may decode a current picture to be decoded among a plurality of pictures with reference to a decoded picture among the plurality of pictures.

Each of the plurality of pictures may be assigned with a temporal ID indicating a hierarchical layer regarding temporal scalability. The temporal ID corresponds to an integer value of 0 or more. For example, in encoding of the current picture, it is prohibited that an encoded picture having a temporal ID larger than the temporal ID of the current picture is referred to. In this way, encoded pictures which are used for reference in the encoding of the current picture are appropriately restricted, and complexity of the process of encoding the current picture is reduced.

Likewise, in decoding of a current picture to be decoded, it is prohibited that a decoded picture having a temporal ID larger than the temporal ID of the current picture is referred to. In this way, decoded pictures which are used for reference in the decoding of the current picture are appropriately restricted, and complexity of the process of decoding the current picture is reduced. In addition, the decoder is capable of skipping decoding of some pictures in decoding of a video by decoding only pictures each having a temporal ID smaller than or equal to a determined value among all the pictures, thereby reducing the processing amount.

In addition, in the encoding and decoding of the video, one or more pictures included in the pictures may be used as Temporal Sub-layer Access (TSA) pictures. For example, in the encoding of a TSA picture and one or more pictures that follow the TSA picture in coding order, it is prohibited that a picture having a temporal ID larger than or equal to the temporal ID of the TSA picture among a plurality of pictures which precedes the TSA picture is referred to.

When the TSA picture is decoded, it is possible to transit from a state in which each of pictures having a smaller temporal ID compared with the temporal ID of the TSA picture is decoded to a state in which each of pictures having a larger or equal temporal ID compared with the temporal ID of the TSA picture is decoded. Such a transition to the state in which a picture having a larger temporal ID is decoded is referred to as an up-switch.

A picture having a temporal ID may not be decoded by being skipped. When an up-switch is performed without use of restrictions such as a restriction regarding a TSA picture, a picture which has not been decoded may be referred to. For this reason, when no restriction such as the restriction regarding the TSA picture is used, it is difficult to perform an appropriate up-switch.

In addition, in the encoding and decoding of the video, one or more pictures included in the pictures may be Step-wise Temporal Sub-layer Access (STSA) pictures. For example, in encoding of the STSA picture or a picture which follows the STSA picture in coding order and has a temporal ID equal to the temporal ID of the STSA picture, it is prohibited that a picture which precedes the STSA picture in coding order and has the same temporal ID as the temporal ID of the STSA picture is referred to.

In this way, it is possible to appropriately transit from a state in which each of pictures having a temporal ID smaller than the temporal ID of the STSA picture is decoded to a state in which each of pictures having the same temporal ID as the temporal ID of the STSA picture is decoded.

In other words, for the TSA picture, an up-switch from the state in which each of pictures having the smaller temporal ID compared with the temporal ID of the TSA picture is decoded to the state in which each of pictures having the same or larger temporal ID compared with the temporal ID of the TSA picture is decoded is guaranteed. For the STSA picture, an up-switch from the state in which each of pictures having the smaller temporal ID compared with the temporal ID of the STSA picture is decoded to the state in which each of pictures having the same temporal ID compared with the temporal ID of the STSA picture is decoded is guaranteed.

In addition, various kinds of information is used in encoding and decoding of a video. Filter information of an adaptive loop filter is one example of information for use in encoding and decoding of a video. The adaptive loop filter is a filter for approximating a reconstructed image to be generated in encoding or decoding of a video to an original image, and for performing image processing such as smoothing the reconstructed image or increasing the sharpness of the reconstructed image.

By means of filter information being set appropriately, an adaptive loop filter is appropriately applied to the reconstructed image using filter information, and encoding and decoding of the video is performed appropriately. If filter information is not set appropriately, encoding and decoding of the video is not performed appropriately. In other words, encoding and decoding of the video is not performed if information for use in the encoding and decoding of the video is not set appropriately.

For this reason, an encoder according to an aspect of the present disclosure may be an encoder which applies an adaptive loop filter in encoding of a video including a plurality of pictures each assigned with a temporal ID indicating a hierarchical layer regarding temporal scalability. The encoder may include circuitry and memory. Using the memory, the circuitry may perform: determining first filter information for applying an adaptive loop filter to a first picture among the plurality of pictures with reference to second filter information associated with a second picture which precedes the first picture in coding order among the plurality of pictures; and applying the adaptive loop filter to the first picture using the first filter information determined. In the determining of the first filter information, the circuitry may perform prohibiting that third filter information associated with a third picture is referred to as the second filter information when a Network Abstraction Layer (NAL) unit type of the first picture is a determined NAL unit type. The third picture is a picture which precedes the first picture in coding order among the plurality of pictures, and has the same temporal ID as the temporal ID of the first picture.

In this way, the encoder is capable of determining the first filter information of the first picture with reference to the second filter information of the second picture. At that time, the encoder is capable of prohibiting that third filter information of the third picture in the hierarchical layer in which the first picture of the determined NAL unit type is present is referred to.

In other words, the encoder is capable of placing a reference restriction on the filter information of the picture in the hierarchical layer in which the first picture of the determined NAL unit type is present, as in the case of the reference restriction which may be placed on a picture in the hierarchical layer in which the picture of the determined NAL unit type is present. Accordingly, the encoder is capable of appropriately managing the filter information in association with the picture, and appropriately restricting filter information and setting filter information to be referred to. Thus, the encoder is capable of appropriately setting information related to encoding of the video.

In addition, for example, in the determining of the first filter information, the circuitry may prohibit reference to, as the second filter information, fourth filter information associated with a fourth picture which precedes the first picture in coding order and has a temporal ID larger than the temporal ID of the first picture among the plurality of pictures.

In this way, it is prohibited that the fourth filter information of the fourth picture having the temporal ID larger than the temporal ID of the first picture is referred to as the second filter information when determining the first filter information of the first picture with reference to the second filter information of the second picture. Accordingly, the encoder is capable of placing a reference restriction on the filter information associated with the picture, as in the case of the reference restriction placed on the picture in temporal scalability. Thus, the encoder is capable of appropriately restricting the filter information and setting the filter information to be referred to.

In addition, for example, the circuitry may perform: determining fifth filter information for applying an adaptive loop filter to a fifth picture which follows the first picture in coding order among the plurality of pictures with reference to sixth filter information associated with a sixth picture which precedes the fifth picture in coding order among the plurality of pictures; and applying an adaptive loop filter to the fifth picture using the fifth filter information determined. In the determining of the fifth filter information, the circuitry may perform prohibiting that the third filter information associated with the third picture is referred to as the sixth filter information when the NAL unit type of the first picture is the determined NAL unit type.

In this way, the encoder is capable of determining the fifth filter information of the fifth picture which follows the first picture in coding order with reference to the sixth filter information of the sixth picture. At that time, the encoder is capable of prohibiting that the third filter information of the third picture in the hierarchical layer in which the first picture of the determined NAL unit type is present is referred to as the sixth filter information.

In other words, after the first picture of the determined NAL unit type, the encoder is capable of placing a reference restriction on the filter information of the picture in the hierarchical layer in which the first picture is present, as in the case of the reference restriction which may be placed on a picture in the hierarchical layer in which the picture of the determined NAL unit type is present. Accordingly, the encoder is capable of appropriately managing the filter information in association with the picture, and appropriately restricting filter information and setting filter information to be referred to. Thus, the encoder is capable of appropriately setting information related to encoding of the video.

In addition, for example, in the determining of the fifth filter information, when the NAL unit type of the first picture is the determined NAL unit type, the circuitry may prohibit reference to, as the sixth filter information, the fourth filter information associated with the fourth picture which precedes the first picture in coding order and has a temporal ID larger than the temporal ID of the first picture among the plurality of pictures.

In this way, it is prohibited that the fourth filter information of the fourth picture having the temporal ID larger than the temporal ID of the first picture is referred to as the fifth filter information when determining the fifth filter information of the fifth picture with reference to the sixth filter information of the sixth picture.

In other words, the encoder is capable of placing a reference restriction on the filter information of the picture after the first picture of the determined NAL unit type, as in the case of the reference restriction which may be placed on the picture having the temporal ID larger than the temporal ID of the first picture. Accordingly, the encoder is capable of appropriately managing the filter information in association with the picture, and appropriately restricting filter information and setting filter information to be referred to. Thus, the encoder is capable of appropriately setting information related to encoding of the video.

In addition, for example, in the determining of the first filter information, when (i) an eighth picture having a temporal ID which is smaller than or equal to the temporal ID of a seventh picture which precedes the first picture in coding order among the plurality of pictures and has a temporal ID larger than 0 is present between the first picture and the seventh picture and (ii) the NAL unit type of the eighth picture is the determined NAL unit type, the circuitry may prohibit reference to seventh filter information associated with the seventh picture as the second filter information.

In this way, after the eighth picture of the determined NAL unit type, the encoder is capable of prohibiting reference to, as the second filter information, the seventh filter information of the seventh picture having a larger or equal temporal ID compared with the temporal ID of the eighth picture.

In other words, after the eighth picture of the determined NAL unit type, the encoder is capable of placing a reference restriction on the seventh filter information of the seventh picture, as in the case of the reference restriction which may be placed on the seventh picture. Accordingly, the encoder is capable of appropriately managing the filter information in association with the picture, and appropriately restricting filter information and setting filter information to be referred to. Thus, the encoder is capable of appropriately setting information related to encoding of the video.

In addition, for example, the determined NAL unit type may be a NAL unit type of a Temporal Sub-layer Access (TSA) picture.

In this way, the encoder is capable of placing a reference restriction on the filter information of the picture in the hierarchical layer in which the TSA picture is present, as in the case of the reference restriction which can be placed on the picture in the hierarchical layer in which the TSA picture is present. Accordingly, the encoder is capable of appropriately managing the filter information in association with the picture, and appropriately restricting filter information and setting filter information to be referred to. Thus, the encoder is capable of appropriately setting information related to encoding of the video.

In addition, for example, the circuitry may further perform: determining fifth filter information for applying an adaptive loop filter to a fifth picture which follows the first picture in coding order among the plurality of pictures with reference to sixth filter information associated with a sixth picture which precedes the fifth picture in coding order among the plurality of pictures; and applying an adaptive loop filter to the fifth picture using the fifth filter information determined. In the determining of the fifth filter information, the circuitry may perform prohibiting that the third filter information associated with the third picture is referred to as the sixth filter information when the NAL unit type of the first picture is the determined NAL unit type and the temporal ID of the fifth picture is the same as the temporal ID of the first picture.

In this way, the encoder is capable of determining the fifth filter information of the fifth picture which is in the hierarchical layer in which the first picture is present and which follows the first picture in coding order, with reference to the sixth filter information of the sixth picture. At that time, the encoder is capable of prohibiting that third filter information of the third picture in the hierarchical layer in which the first picture of the determined NAL unit type is present is referred to as the sixth filter information.

In other words, after the first picture of the determined NAL unit type and in the hierarchical layer in which the first picture is present, the encoder is capable of placing a reference restriction on the filter information, as in the case of the reference restriction which may be placed on the picture which precedes the first picture. Accordingly, the encoder is capable of appropriately managing the filter information in association with the picture, and appropriately restricting filter information and setting filter information to be referred to. Thus, the encoder is capable of appropriately setting information related to encoding of the video.

In addition, for example, the determined NAL unit type may be a NAL unit type of a Step-wise Temporal Sub-layer Access (STSA) picture.

In this way, the encoder is capable of placing a reference restriction on the filter information of the picture in the hierarchical layer in which the STSA picture is present, as in the case of the reference restriction which can be placed on the picture in the hierarchical layer in which the STSA picture is present. Accordingly, the encoder is capable of appropriately managing the filter information in association with the picture, and appropriately restricting filter information and setting filter information to be referred to. Thus, the encoder is capable of appropriately setting information related to encoding of the video.

In addition, for example, a decoder according to an aspect of the present disclosure may be a decoder which applies an adaptive loop filter in decoding of a video including a plurality of pictures each assigned with a temporal ID indicating a hierarchical layer regarding temporal scalability. The decoder includes circuitry and memory. Using the memory, the circuitry may perform: determining first filter information for applying an adaptive loop filter to a first picture among the plurality of pictures with reference to second filter information associated with a second picture which precedes the first picture in decoding order among the plurality of pictures; and applying the adaptive loop filter to the first picture using the first filter information determined. In the determining of the first filter information, the circuitry may perform prohibiting that third filter information associated with a third picture is referred to as the second filter information when a Network Abstraction Layer (NAL) unit type of the first picture is a determined NAL unit type. The third picture is a picture which precedes the first picture in decoding order among the plurality of pictures, and has the same temporal ID as the temporal ID of the first picture.

In this way, the decoder is capable of determining the first filter information of the first picture with reference to the second filter information of the second picture. At that time, the decoder is capable of prohibiting that third filter information of the third picture in the hierarchical layer in which the first picture of the determined NAL unit type is present is referred to as the second filter information.

In other words, the decoder is capable of placing a reference restriction on the filter information of the picture in the hierarchical layer in which the first picture of the determined NAL unit type is present, as in the case of the reference restriction which may be placed on the picture in the hierarchical layer in which the picture of the determined NAL unit type is present. Accordingly, the decoder is capable of appropriately managing the filter information in association with the picture, and appropriately restricting filter information and setting filter information to be referred to. Thus, the decoder is capable of appropriately setting information related to decoding of the video.

In addition, for example, in the determining of the first filter information, the circuitry may prohibit reference to, as the second filter information, the fourth filter information associated with the fourth picture which precedes the first picture in decoding order and has a temporal ID larger than the temporal ID of the first picture among the plurality of pictures.

In this way, it is prohibited that the fourth filter information of the fourth picture having the temporal ID larger than the temporal ID of the first picture is referred to as the second filter information when determining the first filter information of the first picture with reference to the second filter information of the second picture. Accordingly, the decoder is capable of placing a reference restriction on the filter information associated with the picture, as in the case of the reference restriction placed on the picture in temporal scalability. Thus, the decoder is capable of appropriately restricting the filter information and setting the filter information to be referred to.

In addition, for example, the circuitry may perform: determining fifth filter information for applying an adaptive loop filter to a fifth picture which follows the first picture in decoding order among the plurality of pictures with reference to sixth filter information associated with a sixth picture which precedes the fifth picture in decoding order among the plurality of pictures; and applying an adaptive loop filter to the fifth picture using the fifth filter information determined. In the determining of the fifth filter information, the circuitry may perform prohibiting that the third filter information associated with the third picture is referred to as the sixth filter information when the NAL unit type of the first picture is the determined NAL unit type.

In this way, the decoder is capable of determining the fifth filter information of the fifth picture which follows the first picture in decoding order with reference to the sixth filter information of the sixth picture. At that time, the decoder is capable of prohibiting that third filter information of the third picture in the hierarchical layer in which the first picture of the determined NAL unit type is present is referred to as the sixth filter information.

In other words, after the first picture of the determined NAL unit type, the decoder is capable of placing a reference restriction on the filter information of the picture in the hierarchical layer in which the first picture is present, as in the case of the reference restriction which can be performed on a picture in the hierarchical layer in which the first picture is present. Accordingly, the decoder is capable of appropriately managing the filter information in association with the picture, and appropriately restricting filter information and setting filter information to be referred to. Thus, the decoder is capable of appropriately setting information related to decoding of the video.

In addition, for example, in the determining of the fifth filter information, when the NAL unit type of the first picture is the determined NAL unit type, the circuitry may prohibit reference to, as the sixth filter information, the fourth filter information associated with the fourth picture which precedes the first picture in decoding order and has a temporal ID larger than the temporal ID of the first picture among the plurality of pictures.

In this way, it is prohibited that the fourth filter information of the fourth picture having the temporal ID larger than the temporal ID of the first picture is referred to as the fifth filter information when determining the fifth filter information of the fifth picture with reference to the sixth filter information of the sixth picture.

In other words, after the first picture of the determined NAL unit type, the decoder is capable of placing a reference restriction on the filter information, as in the case of the reference restriction which can be performed on the picture having the temporal ID larger than the temporal ID of the first picture. Accordingly, the decoder is capable of appropriately managing the filter information in association with the picture, and appropriately restricting filter information and setting filter information to be referred to. Thus, the decoder is capable of appropriately setting information related to decoding of the video.

In addition, for example, in the determining of the first filter information, when (i) an eighth picture having a temporal ID which is smaller than or equal to the temporal ID of a seventh picture which precedes the first picture in decoding order among the plurality of pictures and has a temporal ID larger than 0 is present between the first picture and the seventh picture and (ii) the NAL unit type of the eighth picture is the determined NAL unit type, the circuitry may prohibit reference to the seventh filter information associated with the seventh picture as the second filter information.

In this way, after the eighth picture of the determined NAL unit type, the decoder is capable of prohibiting reference to, as the second filter information, the seventh filter information of the seventh picture having a larger or equal temporal ID compared with the temporal ID of the eighth picture.

In other words, after the eighth picture of the determined NAL unit type, the decoder is capable of placing a reference restriction on the seventh filter information of the seventh picture, as in the case of the reference restriction which can be performed on the seventh picture. Accordingly, the decoder is capable of appropriately managing the filter information in association with the picture, and appropriately restricting filter information and setting filter information to be referred to. Thus, the decoder is capable of appropriately setting information related to decoding of the video.

In addition, for example, the determined NAL unit type may be a NAL unit type of a Temporal Sub-layer Access (TSA) picture.

In this way, the decoder is capable of placing a reference restriction on the filter information of the picture in the hierarchical layer in which the TSA picture is present, as in the case of the reference restriction which can be placed on the picture in the hierarchical layer in which the TSA picture is present. Accordingly, the decoder is capable of appropriately managing the filter information in association with the picture, and appropriately restricting filter information and setting filter information to be referred to. Thus, the decoder is capable of appropriately setting information related to decoding of the video.

In addition, for example, the circuitry may further perform: determining fifth filter information for applying an adaptive loop filter to a fifth picture which follows the first picture in decoding order among the plurality of pictures with reference to sixth filter information associated with a sixth picture which precedes the fifth picture in decoding order among the plurality of pictures; and applying an adaptive loop filter to the fifth picture using the fifth filter information determined. In the determining of the fifth filter information, the circuitry may perform prohibiting that the third filter information associated with the third picture is referred to as the sixth filter information when the NAL unit type of the first picture is the determined NAL unit type and the temporal ID of the fifth picture is the same as the temporal ID of the first picture.

In this way, the decoder is capable of determining the fifth filter information of the fifth picture which is in the hierarchical layer in which the first picture is present and which follows the first picture in decoding order, with reference to the sixth filter information of the sixth picture. At that time, the decoder is capable of prohibiting that third filter information of the third picture in the hierarchical layer in which the first picture of the determined NAL unit type is present is referred to as the sixth filter information.

In other words, the decoder is capable of placing a reference restriction on the filter information of a picture after the first picture of the determined NAL unit type and in the hierarchical layer in which the first picture is present, as in the case of the reference restriction which can be performed on the picture which precedes the first picture. Accordingly, the decoder is capable of appropriately managing the filter information in association with the picture, and appropriately restricting filter information and setting filter information to be referred to. Thus, the decoder is capable of appropriately setting information related to decoding of the video.

In addition, for example, the determined NAL unit type may be a NAL unit type of a Step-wise Temporal Sub-layer Access (STSA) picture.

In this way, the decoder is capable of placing a reference restriction on the filter information of the picture in the hierarchical layer in which the STSA picture is present, as in the case of the reference restriction which can be placed on the picture in the hierarchical layer in which the STSA picture is present. Accordingly, the decoder is capable of appropriately managing the filter information in association with the picture, and appropriately restricting filter information and setting filter information to be referred to. Thus, the decoder is capable of appropriately setting information related to decoding of the video.

In addition, for example, an encoding method according to an aspect of the present disclosure may be an encoding method for applying an adaptive loop filter in encoding of a video including a plurality of pictures each assigned with a temporal ID indicating a hierarchical layer regarding temporal scalability. The encoding method may include: determining first filter information for applying an adaptive loop filter to a first picture among the plurality of pictures with reference to second filter information associated with a second picture which precedes the first picture in coding order among the plurality of pictures; and applying the adaptive loop filter to the first picture using the first filter information determined. In the determining of the first filter information, it may be prohibited that third filter information associated with a third picture is referred to as the second filter information when a Network Abstraction Layer (NAL) unit type of the first picture is a predetermined NAL unit type. The third picture is a picture which precedes the first picture in coding order among the plurality of pictures, and has the same temporal ID as the temporal ID of the first picture.

In this way, it is possible to determine the first filter information of the first picture with reference to the second filter information of the second picture. At that time, it is possible to prohibit that third filter information of the third picture in the hierarchical layer in which the first picture of the determined NAL unit type is present is referred to as the second filter information.

In other words, it is possible to place a reference restriction on the filter information of the picture in the hierarchical layer in which the first picture of the determined NAL unit type is present, as in the case of the reference restriction which may be placed on a picture in the hierarchical layer in which the picture of the determined NAL unit type is present. Accordingly, it is possible to appropriately manage the filter information in association with the picture, and appropriately restrict filter information and set filter information to be referred to. Thus, it is possible to appropriately set information related to encoding of the video.

In addition, for example, a decoding method according to an aspect of the present disclosure may be a decoding method for applying an adaptive loop filter in decoding of a video including a plurality of pictures each assigned with a temporal ID indicating a hierarchical layer regarding temporal scalability. The decoding method may include: determining first filter information for applying an adaptive loop filter to a first picture among the plurality of pictures with reference to second filter information associated with a second picture which precedes the first picture in decoding order among the plurality of pictures; and applying the adaptive loop filter to the first picture using the first filter information determined. In the determining of the first filter information, it may be prohibited that third filter information associated with a third picture is referred to as the second filter information when a Network Abstraction Layer (NAL) unit type of the first picture is a predetermined NAL unit type. The third picture is a picture which precedes the first picture in decoding order among the plurality of pictures, and has the same temporal ID as the temporal ID of the first picture.

In this way, it is possible to determine the first filter information of the first picture with reference to the second filter information of the second picture. At that time, it is possible to prohibit that third filter information of the third picture in the hierarchical layer in which the first picture of the determined NAL unit type is present is referred to as the second filter information.

In other words, it is possible to place a reference restriction on the filter information of the picture in the hierarchical layer in which the first picture of the determined NAL unit type is present, as in the case of the reference restriction which may be placed on the picture in the hierarchical layer in which the picture of the determined NAL unit type is present. Accordingly, it is possible to appropriately manage the filter information in association with the picture, and appropriately restrict filter information and set filter information to be referred to. Thus, it is possible to appropriately set information related to decoding of the video.

In addition, for example, an encoder according to an aspect of the present disclosure may be an encoder which encodes a video including a plurality of pictures each assigned with a temporal ID indicating a hierarchical layer regarding temporal scalability. The encoder may include circuitry and memory. Using the memory, the circuitry may perform: encoding a plurality of parameter sets each assigned with 0 as a temporal ID indicating a hierarchical layer regarding the temporal scalability; and encoding an initial picture in coding order among the plurality of pictures after encoding the plurality of parameter sets. The plurality of parameter sets may correspond respectively to a plurality of hierarchical layers indicated by a plurality of temporal IDs assigned to the plurality of pictures. Each of the parameter sets may be a parameter set for one or more pictures each assigned with a temporal ID indicating a hierarchical layer corresponding to the parameter set among the plurality of pictures.

In this way, the encoder is capable of collectively encoding the plurality of parameter sets corresponding respectively to the plurality of hierarchical layers at the beginning. In addition, each of the plurality of parameter sets is assigned with 0 as the temporal ID. Accordingly, the plurality of parameter sets can be appropriately processed without being discarded. Thus, the encoder is capable of appropriately setting information related to encoding of the video.

In addition, for example, the plurality of pictures may be included in a first picture group, the plurality of parameter sets is included in a first parameter set group, and the video includes a plurality of pictures included in a second picture group. The circuitry may further perform: encoding a plurality of parameter sets each of which is included in a second parameter set group and which is assigned with 0 as a temporal ID indicating a hierarchical layer regarding the temporal scalability after encoding pictures included in the first picture group; and encoding an initial picture in coding order among the plurality of pictures included in the second picture group after encoding the plurality of parameter sets included in the second parameter set group. The plurality of parameter sets included in the second parameter set group may correspond respectively to a plurality of hierarchical layers indicated by a plurality of temporal IDs assigned to the plurality of pictures included in the second picture group. Each of the plurality of parameter sets included in the second parameter set group may be a parameter set for one or more pictures each assigned with a temporal ID indicating a hierarchical layer corresponding to the parameter set included in the second parameter set group among the plurality of pictures included in the second picture group.

In this way, the encoder is capable of collectively encoding, for each picture group, the plurality of parameter sets corresponding respectively to the plurality of hierarchical layers at the beginning. Thus, the encoder is capable of appropriately setting, for each picture group, information related to encoding of the video.

In addition, for example, a decoder according to an aspect of the present disclosure may be a decoder which decodes a video including a plurality of pictures each assigned with a temporal ID indicating a hierarchical layer regarding temporal scalability. The decoder may include circuitry and memory. Using the memory, the circuitry may perform: decoding a plurality of parameter sets each assigned with 0 as a temporal ID indicating a hierarchical layer regarding the temporal scalability; and decoding an initial picture in decoding order among the plurality of pictures after decoding the plurality of parameter sets. The plurality of parameter sets may correspond respectively to a plurality of hierarchical layers indicated by a plurality of temporal IDs assigned to the plurality of pictures. Each of the parameter sets may be a parameter set for one or more pictures each assigned with a temporal ID indicating a hierarchical layer corresponding to the parameter set among the plurality of pictures.

In this way, the decoder is capable of collectively decoding the plurality of parameter sets corresponding respectively to the plurality of hierarchical layers at the beginning. In addition, each of the plurality of parameter sets is assigned with 0 as the temporal ID. Accordingly, the plurality of parameter sets can be appropriately processed without being discarded. Thus, the decoder is capable of appropriately setting information related to decoding of the video.

In addition, for example, the plurality of pictures may be included in a first picture group, the plurality of parameter sets may be included in a first parameter set group, and the video may include a plurality of pictures included in a second picture group. The circuitry may further perform: decoding a plurality of parameter sets each of which is included in a second parameter set group and which is assigned with 0 as a temporal ID indicating a hierarchical layer regarding the temporal scalability after decoding pictures included in the first picture group; and decoding an initial picture in decoding order among the plurality of pictures included in the second picture group after decoding the plurality of parameter sets included in the second parameter set group. The plurality of parameter sets included in the second parameter set group may correspond respectively to a plurality of hierarchical layers indicated by a plurality of temporal IDs assigned to the plurality of pictures included in the second picture group. Each of the plurality of parameter sets included in the second parameter set group may be a parameter set for one or more pictures each assigned with a temporal ID indicating a hierarchical layer corresponding to the parameter set included in the second parameter set group among the plurality of pictures included in the second picture group.

In this way, the decoder is capable of collectively decoding, for each picture group, the plurality of parameter sets corresponding respectively to the plurality of hierarchical layers at the beginning. Thus, the decoder is capable of appropriately setting, for each picture group, information related to decoding of the video.

In addition, for example, an encoding method according to an aspect of the present disclosure may be an encoding method for encoding a video including a plurality of pictures each assigned with a temporal ID indicating a hierarchical layer regarding temporal scalability. The encoding method may include: encoding a plurality of parameter sets each assigned with 0 as a temporal ID indicating a hierarchical layer regarding the temporal scalability; and encoding an initial picture in coding order among the plurality of pictures after encoding the plurality of parameter sets. The plurality of parameter sets may correspond respectively to a plurality of hierarchical layers indicated by a plurality of temporal IDs assigned to the plurality of pictures. Each of the parameter sets may be a parameter set for one or more pictures each assigned with a temporal ID indicating a hierarchical layer corresponding to the parameter set among the plurality of pictures.

In this way, it is possible to collectively encode the plurality of parameter sets corresponding respectively to the plurality of hierarchical layers at the beginning. In addition, each of the plurality of parameter sets is assigned with 0 as the temporal ID. Accordingly, the plurality of parameter sets can be appropriately processed without being discarded. Thus, it is possible to appropriately set information related to encoding of the video.

In addition, for example, a decoding method according to an aspect of the present disclosure may be a decoding method for decoding a video including a plurality of pictures each assigned with a temporal ID indicating a hierarchical layer regarding temporal scalability. The decoding method may include: decoding a plurality of parameter sets each assigned with 0 as a temporal ID indicating a hierarchical layer regarding the temporal scalability; and decoding an initial picture in decoding order among the plurality of pictures after decoding the plurality of parameter sets. The plurality of parameter sets may correspond respectively to a plurality of hierarchical layers indicated by a plurality of temporal IDs assigned to the plurality of pictures. Each of the parameter sets may be a parameter set for one or more pictures each assigned with a temporal ID indicating a hierarchical layer corresponding to the parameter set among the plurality of pictures.

In this way, it is possible to collectively decode a plurality of parameter sets corresponding respectively to the plurality of hierarchical layers at the beginning. In addition, each of the plurality of parameter sets is assigned with 0 as a temporal ID. Accordingly, the plurality of parameter sets can be appropriately processed without being discarded. Thus, it is possible to appropriately set information related to decoding of the video.

In addition, for example, an encoder according to an aspect of the present disclosure may be an encoder which encodes a video including a plurality of pictures and includes circuitry and memory. Using the memory, the circuitry may perform: encoding a first picture among the plurality of pictures; and performing (i) a first operation for encoding a parameter set for a second picture which follows the first picture in coding order among the plurality of pictures after encoding the first picture, and encoding the second picture after encoding the parameter set, or (ii) a second operation for encoding the second picture without encoding the parameter set after encoding the first picture. The circuitry may perform the first operation when the second picture is a determined picture, in the performing of the first operation or the second operation.

In this way, the encoder is capable of encoding the parameter set for the determined picture before the determined picture. Accordingly, the parameter set for the determined picture can be appropriately processed in the up-switch, etc., for the determined picture. Thus, the encoder is capable of appropriately setting information related to encoding of the video.

In addition, for example, the determined picture may be a Temporal Sub-layer Access (TSA) picture.

In this way, the encoder is capable of encoding the parameter set for the TSA picture before the TSA picture. Accordingly, the parameter set for the TSA picture can be appropriately processed in the up-switch, etc., for the TSA picture. Thus, the encoder is capable of appropriately setting information related to encoding of the video.

In addition, for example, each of the plurality of pictures may be a picture assigned with a temporal ID indicating a hierarchical layer regarding temporal scalability. In the first operation, the circuitry may encode a plurality of related parameter sets which are a plurality of parameter sets including the parameter set for the second picture after encoding the first picture, and encode the second picture after encoding the plurality of related parameter sets. The plurality of related parameter sets may correspond respectively to a plurality of hierarchical layers indicated by a plurality of temporal IDs larger than a temporal ID assigned to the second picture. Each of the plurality of related parameter sets may be a parameter set for one or more pictures each assigned with a temporal ID indicating a hierarchical layer corresponding to the related parameter set among the plurality of pictures.

In this way, the encoder is capable of encoding, before encoding the determined picture, the plurality of parameter sets for the plurality of pictures each having the temporal ID larger than or equal to the temporal ID of the determined picture. Accordingly, the parameter sets can be appropriately processed in the up-switch, etc., for the pictures each having the temporal ID larger than the temporal ID of the determined picture. Thus, the encoder is capable of appropriately setting information related to encoding of the video.

In addition, for example, the determined picture may be a Step-wise Temporal Sub-layer Access (STSA) picture.

In this way, the encoder is capable of encoding the parameter set for the STSA picture before the STSA picture. Accordingly, the parameter set for the STSA picture can be appropriately processed in the up-switch, etc., for the STSA picture. Thus, the encoder is capable of appropriately setting information related to encoding of the video.

In addition, for example, the second picture may be a picture to be encoded next to the first picture among the plurality of pictures.

In this way, the encoder is capable of appropriately encoding the parameter set for the determined picture immediately before encoding the determined picture. Accordingly, the parameter set for the determined picture can be appropriately processed. Thus, the encoder is capable of appropriately setting information related to encoding of the video.

In addition, for example, each of the plurality of pictures may be a picture assigned with a temporal ID indicating a hierarchical layer regarding temporal scalability. The circuitry may further encode a plurality of collective parameter sets which are a plurality of parameter sets including the parameter set for the second picture, before encoding an initial picture in coding order among the plurality of pictures. The plurality of collective parameter sets may correspond respectively to a plurality of hierarchical layers indicated by a plurality of temporal IDs assigned to the plurality of pictures. Each of the collective parameter sets may be a parameter set for one or more pictures each assigned with a temporal ID indicating a hierarchical layer corresponding to the collective parameter set among the plurality of pictures.

In this way, the encoder is capable of re-encoding the parameter set for the determined picture before the determined picture even when the plurality of parameter sets including the parameter set for the determined picture has been encoded at the beginning. Accordingly, the parameter set for the determined picture can be appropriately processed. Thus, the encoder is capable of appropriately setting information related to encoding of the video.

In addition, for example, a decoder according to an aspect of the present disclosure may be a decoder which decodes a video including a plurality of pictures and includes circuitry and memory. Using the memory, the circuitry may perform: decoding a first picture among the plurality of pictures; and performing (i) a first operation for decoding a parameter set for a second picture which follows the first picture in decoding order among the plurality of pictures after decoding the first picture, and decoding the second picture after decoding the parameter set, or (ii) a second operation for decoding the second picture without decoding the parameter set after decoding the first picture. The circuitry may perform the first operation when the second picture is a determined picture, in the performing of the first operation or the second operation.

In this way, the decoder is capable of decoding the parameter set for the determined picture before the determined picture. Accordingly, the parameter set for the determined picture can be appropriately processed in the up-switch, etc., for the determined picture. Thus, the decoder is capable of appropriately setting information related to decoding of the video.

In addition, for example, the determined picture may be a Temporal Sub-layer Access (TSA) picture.

In this way, the decoder is capable of decoding the parameter set for the TSA picture before the TSA picture. Accordingly, the parameter set for the TSA picture can be appropriately processed in the up-switch, etc., for the TSA picture. Thus, the decoder is capable of appropriately setting information related to decoding of the video.

In addition, for example, each of the plurality of pictures may be a picture assigned with a temporal ID indicating a hierarchical layer regarding temporal scalability. In the first operation, the circuitry may decode a plurality of related parameter sets which are a plurality of parameter sets including the parameter set for the second picture after decoding the first picture, and decode the second picture after decoding the plurality of related parameter sets. The plurality of related parameter sets may correspond respectively to a plurality of hierarchical layers indicated by a plurality of temporal IDs larger than a temporal ID assigned to the second picture. Each of the plurality of related parameter sets may be a parameter set for one or more pictures each assigned with a temporal ID indicating a hierarchical layer corresponding to the related parameter set among the plurality of pictures.

In this way, the decoder is capable of decoding, before decoding the determined picture, the plurality of parameter sets for the plurality of pictures each having a temporal ID larger than or equal to the temporal ID of the determined picture. Accordingly, the parameter sets can be appropriately processed in the up-switch, etc., for the pictures each having the temporal ID larger than the temporal ID of the determined picture. Thus, the decoder is capable of appropriately setting information related to decoding of the video.

In addition, for example, the determined picture may be a Step-wise Temporal Sub-layer Access (STSA) picture.

In this way, the decoder is capable of decoding the parameter set for the STSA picture before the STSA picture. Accordingly, the parameter set for the STSA picture can be appropriately processed in the up-switch, etc., for the STSA picture. Thus, the decoder is capable of appropriately setting information related to decoding of the video.

In addition, for example, the second picture may be a picture to be decoded next to the first picture among the plurality of pictures.

In this way, the decoder is capable of appropriately decoding the parameter set for the determined picture immediately before decoding the determined picture. Accordingly, the parameter set for the determined picture can be appropriately processed. Thus, the decoder is capable of appropriately setting information related to decoding of the video.

In addition, for example, each of the plurality of pictures may be a picture assigned with a temporal ID indicating a hierarchical layer regarding temporal scalability. The circuitry may further decode a plurality of collective parameter sets which are a plurality of parameter sets including the parameter set for the second picture, before decoding an initial picture in decoding order among the plurality of pictures. The plurality of collective parameter sets may correspond respectively to a plurality of hierarchical layers indicated by a plurality of temporal IDs assigned to the plurality of pictures. Each of the collective parameter sets may be a parameter set for one or more pictures each assigned with a temporal ID indicating a hierarchical layer corresponding to the collective parameter set among the plurality of pictures.

In this way, the decoder is capable of re-decoding the parameter set for the determined picture before decoding the determined picture even when the plurality of parameter sets including the parameter set for the determined picture have been decoded at the beginning. Accordingly, the parameter set for the determined picture can be appropriately processed. Thus, the decoder is capable of appropriately setting information related to decoding of the video.

In addition, for example, an encoding method according to an aspect of the present disclosure may be an encoding method for encoding a video including a plurality of pictures, including: encoding a first picture among the plurality of pictures; and performing (i) a first operation for encoding a parameter set for a second picture which follows the first picture in coding order among the plurality of pictures after encoding the first picture, and encoding the second picture after encoding the parameter set, or (ii) a second operation for encoding the second picture without encoding the parameter set after encoding the first picture. The first operation may be performed when the second picture is a determined picture, in the performing of the first operation or the second operation.

In this way, it is possible to encode the parameter set for the determined picture before the determined picture. Accordingly, the parameter set for the determined picture can be appropriately processed in the up-switch, etc., for the determined picture. Thus, it is possible to appropriately set information related to encoding of the video.

In addition, for example, a decoding method according to an aspect of the present disclosure may be a decoding method for decoding a video including a plurality of pictures, including: decoding a first picture among the plurality of pictures; and performing (i) a first operation for decoding a parameter set for a second picture which follows the first picture in decoding order among the plurality of pictures after decoding the first picture, and decoding the second picture after decoding the parameter set, or (ii) a second operation for decoding the second picture without decoding the parameter set after decoding the first picture. The first operation may be performed when the second picture is a determined picture, in the performing of the first operation or the second operation.

In this way, it is possible to decode the parameter set for the determined picture before the determined picture. Accordingly, the parameter set for the determined picture can be appropriately processed in the up-switch, etc., for the determined picture. Thus, it is possible to appropriately set information related to decoding of the video.

In addition, for example, an encoder according to an aspect of the present disclosure may be an encoder which encodes a video including a plurality of pictures each assigned with a temporal ID indicating a hierarchical layer regarding temporal scalability. The encoder may include circuitry and memory. Using the memory, the circuitry may perform: encoding a first picture among the plurality of pictures; and performing (i) a first operation for encoding a parameter set for a second picture which follows the first picture in coding order among the plurality of pictures after encoding the first picture, and encoding the second picture after encoding the parameter set, or (ii) a second operation for encoding the second picture without encoding the parameter set after encoding the first picture. In the performing of the first operation or the second operation, the circuitry may perform the first operation when a temporal ID assigned to the second picture is larger than a smallest temporal ID among a plurality of temporal IDs assigned to the plurality of pictures and smaller than a largest temporal ID among the plurality of temporal IDs.

In this way, the encoder is capable of encoding the parameter set for the picture in the middle hierarchical layer before the picture in the middle hierarchical layer. Accordingly, the parameter set for the picture in the middle hierarchical layer can be appropriately processed in the up-switch, etc., for the picture in the middle hierarchical layer. Thus, the encoder is capable of appropriately setting information related to encoding of the video.

In addition, for example, in the performing of the first operation or the second operation, the circuitry may perform the first operation also when the temporal ID assigned to the second picture is the largest temporal ID.

In this way, the encoder is capable of encoding the parameter set for the picture in the uppermost hierarchical layer before the picture in the uppermost hierarchical layer. Accordingly, the parameter set for the picture in the uppermost hierarchical layer can be appropriately processed in the up-switch, etc., for the picture in the uppermost hierarchical layer. Thus, the encoder is capable of appropriately setting information related to encoding of the video.

In addition, for example, in the first operation which is performed when the temporal ID assigned to the second picture is a second largest temporal ID among the plurality of temporal IDs, the circuitry may encode the parameter set and an uppermost parameter set after encoding the first picture, and encode the second picture after encoding the parameter set and the uppermost parameter set. The uppermost parameter set may be a parameter set for one or more pictures each assigned with the largest temporal ID.

In this way, the encoder is capable of efficiently encoding the two parameter sets including the parameter set for the picture in the uppermost hierarchical layer.

In addition, for example, in the performing of the first operation or the second operation, the circuitry may perform the second operation when the temporal ID assigned to the second picture is the largest temporal ID.

In this way, the encoder is capable of skipping encoding of the parameter set for the picture in the uppermost hierarchical layer before encoding the picture in the uppermost hierarchical layer.

In addition, for example, in the performing of the first operation or the first operation, the circuitry may perform the first operation when the temporal ID assigned to the second picture is larger than the smallest temporal ID and smaller than the largest temporal ID under a condition that a determined flag included in a sequence parameter set for the plurality of pictures indicates a determined value.

In this way, the encoder is capable of appropriately encoding the parameter set for the picture in the middle hierarchical layer before the picture in the middle hierarchical layer in a determined sequence.

In addition, for example, each of the plurality of pictures may be a Temporal Sub-layer Access (TSA) picture when the temporal ID assigned to the picture is not the smallest temporal ID under the condition that the determined flag indicates the determined value.

In this way, the encoder is capable of appropriately encoding the parameter set for the picture in the middle hierarchical layer before the picture in the middle hierarchical layer in the determined sequence including the TSA picture present in each of the hierarchical layers other than the uppermost hierarchical layer.

In addition, for example, a decoder according to an aspect of the present disclosure may be a decoder which decodes a video including a plurality of pictures each assigned with a temporal ID indicating a hierarchical layer regarding temporal scalability. The decoder may include circuitry and memory. Using the memory, the circuitry may perform: decoding a first picture among the plurality of pictures; and performing (i) a first operation for decoding a parameter set for a second picture which follows the first picture in decoding order among the plurality of pictures after decoding the first picture, and decoding the second picture after decoding the parameter set, or (ii) a second operation for decoding the second picture without decoding the parameter set after decoding the first picture. In the performing of the first operation or the second operation, the circuitry may perform the first operation when a temporal ID assigned to the second picture is larger than a smallest temporal ID among a plurality of temporal IDs assigned to the plurality of pictures and smaller than a largest temporal ID among the plurality of temporal IDs.

In this way, the decoder is capable of decoding the parameter set for the picture in the middle hierarchical layer before the picture in the middle hierarchical layer. Accordingly, the parameter set for the picture in the middle hierarchical layer can be appropriately processed in the up-switch, etc., for the picture in the middle hierarchical layer. Thus, the decoder is capable of appropriately setting information related to decoding of the video.

In addition, for example, in the performing of the first operation or the second operation, the circuitry may perform the first operation also when the temporal ID assigned to the second picture is the largest temporal ID.

In this way, the decoder is capable of decoding the parameter set for the picture in the uppermost hierarchical layer before the picture in the uppermost hierarchical layer. Accordingly, the parameter set for the picture in the uppermost hierarchical layer can be appropriately processed in the up-switch, etc., for the picture in the uppermost hierarchical layer. Thus, the decoder is capable of appropriately setting information related to decoding of the video.

In addition, for example, in the first operation which is performed when the temporal ID assigned to the second picture is a second largest temporal ID among the plurality of temporal IDs, the circuitry may decode the parameter set and an uppermost parameter set after decoding the first picture, and decode the second picture after decoding the parameter set and the uppermost parameter set. The uppermost parameter set may be a parameter set for one or more pictures each assigned with the largest temporal ID.

In this way, the decoder is capable of efficiently decoding the two parameter sets including the parameter set for the picture in the uppermost hierarchical layer.

In addition, for example, in the performing of the first operation or the second operation, the circuitry may perform the second operation when the temporal ID assigned to the second picture is the largest temporal ID.

In this way, the decoder is capable of skipping decoding of the parameter set for the picture in the uppermost hierarchical layer before the picture in the uppermost hierarchical layer.

In addition, for example, in the performing of the first operation or the first operation, the circuitry may perform the first operation when the temporal ID assigned to the second picture is larger than the smallest temporal ID and smaller than the largest temporal ID under a condition that a determined flag included in a sequence parameter set for the plurality of pictures indicates a determined value.

In this way, the decoder is capable of appropriately decoding the parameter set for the picture in the middle hierarchical layer before the picture in the middle hierarchical layer in a determined sequence.

In addition, for example, each of the plurality of pictures may be a Temporal Sub-layer Access (TSA) picture when the temporal ID assigned to the picture is not the smallest temporal ID under the condition that the determined flag indicates the determined value.

In this way, the decoder is capable of appropriately decoding the parameter set for the picture in the middle hierarchical layer before the picture in the middle hierarchical layer in a determined sequence including the TSA picture present in each of the hierarchical layers other than the uppermost hierarchical layer.

In addition, for example, an encoding method according to an aspect of the present disclosure may be an encoding method for encoding a video including a plurality of pictures each assigned with a temporal ID indicating a hierarchical layer regarding temporal scalability. The encoding method may include: encoding a first picture among the plurality of pictures; and performing (i) a first operation for encoding a parameter set for a second picture which follows the first picture in coding order among the plurality of pictures after encoding the first picture, and encoding the second picture after encoding the parameter set, or (ii) a second operation for encoding the second picture without encoding the parameter set after encoding the first picture. In the performing of the first operation or the second operation, the first operation may be performed when a temporal ID assigned to the second picture is larger than a smallest temporal ID among a plurality of temporal IDs assigned to the plurality of pictures and smaller than a largest temporal ID among the plurality of temporal IDs.

In this way, it is possible to encode the parameter set for the picture in the middle hierarchical layer before the picture in the middle hierarchical layer. Accordingly, the parameter set for the picture in the middle hierarchical layer can be appropriately processed in the up-switch, etc., for the picture in the middle hierarchical layer. Thus, it is possible to appropriately set information related to encoding of the video.

In addition, for example, a decoding method according to an aspect of the present disclosure may be a decoding method for decoding a video including a plurality of pictures each assigned with a temporal ID indicating a hierarchical layer regarding temporal scalability. The decoding method may include: decoding a first picture among the plurality of pictures; and performing (i) a first operation for decoding a parameter set for a second picture which follows the first picture in decoding order among the plurality of pictures after decoding the first picture, and decoding the second picture after decoding the parameter set, or (ii) a second operation for decoding the second picture without decoding the parameter set after decoding the first picture. In the performing of the first operation or the second operation, the first operation may be performed when a temporal ID assigned to the second picture is larger than a smallest temporal ID among a plurality of temporal IDs assigned to the plurality of pictures and smaller than a largest temporal ID among the plurality of temporal IDs.

In this way, it is possible to decode the parameter set for the picture in the middle hierarchical layer before the picture in the middle hierarchical layer. Accordingly, the parameter set for the picture in the middle hierarchical layer can be appropriately processed in the up-switch, etc., for the picture in the middle hierarchical layer. Thus, it is possible to appropriately set information related to decoding of the video.

In addition, for example, the encoder according to an aspect of the present disclosure may include a splitter, an intra predictor, an inter predictor, a transformer, a quantizer, an entropy encoder, and a filter.

The splitter may split a picture into a plurality of blocks. The intra predictor may perform intra prediction on a block included in the plurality of blocks. The inter predictor may perform inter prediction on the block. The transformer may transform prediction errors between an original image and a prediction image obtained by performing either the intra prediction or the inter prediction to generate transform coefficients. The quantizer may quantize the transform coefficients to generate quantized coefficients. The entropy encoder may encode the quantized coefficients to generate an encoded bitstream. The filter may apply a filter to a reconstructed image generated using the prediction image.

In addition, for example, the encoder may be an encoder which applies an adaptive loop filter in encoding of the video including the plurality of pictures each assigned with a temporal ID indicating a hierarchical layer regarding temporal scalability.

The filter may then determine first filter information for applying an adaptive loop filter to the first picture among the plurality of pictures with reference to second filter information associated with the second picture which precedes the first picture in coding order among the plurality of pictures, and apply the adaptive loop filter to the first picture using the first filter information determined.

When the NAL unit type of the first picture is a determined NAL unit type, the filter may then prohibit, in the determining of the first filter information, reference to, as the second filter information, the third filter information associated with the third picture which precedes the first picture in coding order and has the same temporal ID as the temporal ID of the first picture among the plurality of pictures.

In addition, for example, the encoder may be an encoder which encodes the video including the plurality of pictures each assigned with a temporal ID indicating a hierarchical layer regarding temporal scalability.

The entropy encoder may then encode the plurality of parameter sets each assigned with 0 as a temporal ID indicating a hierarchical layer regarding the temporal scalability, and after encoding the plurality of parameter sets, encode an initial picture in coding order among the plurality of pictures.

Furthermore, the plurality of parameter sets may be the parameter sets which (i) correspond respectively to the plurality of hierarchical layers indicated by a plurality of temporal IDs assigned to the plurality of pictures, and (ii) are for one or more pictures each assigned with a temporal ID indicating the hierarchical layer corresponding to the parameter set among the plurality of pictures.

In addition, for example, the encoder may be an encoder which encodes a video including a plurality of pictures.

The entropy encoder may then perform: encoding the first picture among the plurality of pictures; and performing (i) a first operation for encoding a parameter set for a second picture which follows the first picture in coding order among the plurality of pictures after encoding the first picture, and encoding the second picture after encoding the parameter set, or (ii) a second operation for encoding the second picture without encoding the parameter set after encoding the first picture.

The entropy encoder may then perform the first operation when the second picture is a determined picture in the performing of either the first operation or the second operation.

In addition, for example, the encoder may be an encoder which encodes the video including the plurality of pictures each assigned with a temporal ID indicating a hierarchical layer regarding temporal scalability.

The entropy encoder may then perform: encoding the first picture among the plurality of pictures; and performing (i) a first operation for encoding a parameter set for a second picture which follows the first picture in coding order among the plurality of pictures after encoding the first picture, and encoding the second picture after encoding the parameter set, or (ii) a second operation for encoding the second picture without encoding the parameter set after encoding the first picture.

The entropy encoder may then perform the first operation when the temporal ID assigned to the second picture is (i) larger than the smallest temporal ID among the plurality of temporal IDs assigned to the plurality of pictures and (ii) smaller than the largest temporal ID among the plurality of temporal IDs in the performing of either the first operation or the second operation.

In addition, for example, the decoder according to an aspect of the present disclosure may include an entropy decoder, an inverse quantizer, an inverse transformer, an intra predictor, an inter predictor, and a filter.

The entropy decoder may decode quantized coefficients of a block in a picture from an encoded bitstream. The inverse quantizer may inverse-quantize the quantized coefficients to obtain transform coefficients. The inverse transformer may inverse-transform the transform coefficients to obtain prediction errors. The intra predictor may perform intra prediction on the block. The inter predictor may perform inter prediction on the block. The filter may apply a filter to a reconstructed image generated using the prediction errors and the prediction image obtained by performing either the intra prediction or the inter prediction.

In addition, for example, the decoder may be a decoder which applies an adaptive loop filter in decoding of the video including the plurality of pictures each assigned with a temporal ID indicating a hierarchical layer regarding temporal scalability.

The filter then may determine first filter information for applying an adaptive loop filter to the first picture among the plurality of pictures with reference to second filter information associated with the second picture which precedes the first picture in decoding order among the plurality of pictures, and apply the adaptive loop filter to the first picture using the first filter information determined.

When the NAL unit type of the first picture is a determined NAL unit type, the filter may then prohibit, in the determining of the first filter information, reference to, as the second filter information, the third filter information associated with the third picture which precedes the first picture in decoding order and has the same temporal ID as the temporal ID of the first picture among the plurality of pictures.

In addition, for example, the decoder may be a decoder which decodes the video including the plurality of pictures each assigned with a temporal ID indicating a hierarchical layer regarding temporal scalability.

The entropy decoder may then decode the plurality of parameter sets each assigned with 0 as a temporal ID indicating a hierarchical layer regarding the temporal scalability, and after the decoding of the plurality of parameter sets, decode the initial picture in decoding order among the plurality of pictures.

Furthermore, the plurality of parameter sets may be the parameter sets which (i) correspond respectively to the plurality of hierarchical layers indicated by a plurality of temporal IDs assigned to the plurality of pictures, and (ii) are for one or more pictures each assigned with a temporal ID indicating the hierarchical layer corresponding to the parameter set among the plurality of pictures.

In addition, for example, the decoder may be a decoder which decodes a video including a plurality of pictures.

The entropy decoder may then perform: decoding a first picture among the plurality of pictures; and performing (i) a first operation for decoding a parameter set for a second picture which follows the first picture in decoding order among the plurality of pictures after decoding the first picture, and decoding the second picture after decoding the parameter set, or (ii) a second operation for decoding the second picture without decoding the parameter set after decoding the first picture.

The entropy decoder may then perform the first operation when the second picture is a determined picture in the performing of either the first operation or the second operation.

In addition, for example, the decoder may be a decoder which decodes the video including the plurality of pictures each assigned with a temporal ID indicating a hierarchical layer regarding temporal scalability.

The entropy decoder may then perform: decoding the first picture among the plurality of pictures; and performing (i) a first operation for decoding a parameter set for a second picture which follows the first picture in decoding order among the plurality of pictures after decoding the first picture, and decoding the second picture after decoding the parameter set, or (ii) a second operation for decoding the second picture without decoding the parameter set after decoding the first picture.

The entropy decoder may then perform, in the performing of either the first operation or the second operation, the first operation when the temporal ID assigned with the second picture is (i) larger than the smallest temporal ID among the plurality of temporal IDs assigned to the plurality of pictures and (ii) smaller than the largest temporal ID among the plurality of temporal IDs.

Furthermore, these general and specific aspects may be implemented using a system, a device, a method, an integrated circuit, a computer program, or a non-transitory computer-readable recording medium such as a CD-ROM, or any combination of systems, devices, methods, integrated circuits, computer programs, or computer-readable recording media.

Hereinafter, embodiments will be described with reference to the drawings.

It is to be noted that the embodiment and the variations thereof described below each indicates a general or specific example. The numerical values, shapes, materials, constituent elements, the arrangement and connection of the constituent elements, steps, order of the steps, etc., indicated in the following embodiment and variations are mere examples, and therefore are not intended to limit the scope of the claims. Therefore, among the constituent elements in the following embodiments, those not recited in any of the independent claims defining the broadest inventive concepts are described as optional components.

Embodiment 1

First, an outline of Embodiment 1 will be presented. Embodiment 1 is one example of an encoder and a decoder to which the processes and/or configurations presented in subsequent description of aspects of the present disclosure are applicable. Note that Embodiment 1 is merely one example of an encoder and a decoder to which the processes and/or configurations presented in the description of aspects of the present disclosure are applicable. The processes and/or configurations presented in the description of aspects of the present disclosure can also be implemented in an encoder and a decoder different from those according to Embodiment 1.

When the processes and/or configurations presented in the description of aspects of the present disclosure are applied to Embodiment 1, for example, any of the following may be performed.

(1) regarding the encoder or the decoder according to Embodiment 1, among components included in the encoder or the decoder according to Embodiment 1, substituting a component corresponding to a component presented in the description of aspects of the present disclosure with a component presented in the description of aspects of the present disclosure;

(2) regarding the encoder or the decoder according to Embodiment 1, implementing discretionary changes to functions or implemented processes performed by one or more components included in the encoder or the decoder according to Embodiment 1, such as addition, substitution, or removal, etc., of such functions or implemented processes, then substituting a component corresponding to a component presented in the description of aspects of the present disclosure with a component presented in the description of aspects of the present disclosure;

(3) regarding the method implemented by the encoder or the decoder according to Embodiment 1, implementing discretionary changes such as addition of processes and/or substitution, removal of one or more of the processes included in the method, and then substituting a processes corresponding to a process presented in the description of aspects of the present disclosure with a process presented in the description of aspects of the present disclosure;

(4) combining one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(5) combining a component including one or more functions included in one or more components included in the encoder or the decoder according to Embodiment 1, or a component that implements one or more processes implemented by one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(6) regarding the method implemented by the encoder or the decoder according to Embodiment 1, among processes included in the method, substituting a process corresponding to a process presented in the description of aspects of the present disclosure with a process presented in the description of aspects of the present disclosure; and (7) combining one or more processes included in the method implemented by the encoder or the decoder according to Embodiment 1 with a process presented in the description of aspects of the present disclosure.

Note that the implementation of the processes and/or configurations presented in the description of aspects of the present disclosure is not limited to the above examples. For example, the processes and/or configurations presented in the description of aspects of the present disclosure may be implemented in a device used for a purpose different from the moving picture/picture encoder or the moving picture/picture decoder disclosed in Embodiment 1. Moreover, the processes and/or configurations presented in the description of aspects of the present disclosure may be independently implemented. Moreover, processes and/or configurations described in different aspects may be combined.

[Encoder Outline]

First, the encoder according to Embodiment 1 will be outlined. FIG. 1 is a block diagram illustrating a functional configuration of encoder 100 according to Embodiment 1. Encoder 100 is a moving picture/picture encoder that encodes a moving picture/picture block by block.

As illustrated in FIG. 1, encoder 100 is a device that encodes a picture block by block, and includes splitter 102, subtractor 104, transformer 106, quantizer 108, entropy encoder 110, inverse quantizer 112, inverse transformer 114, adder 116, block memory 118, loop filter 120, frame memory 122, intra predictor 124, inter predictor 126, and prediction controller 128.

Encoder 100 is realized as, for example, a generic processor and memory. In this case, when a software program stored in the memory is executed by the processor, the processor functions as splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128. Alternatively, encoder 100 may be realized as one or more dedicated electronic circuits corresponding to splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128.

Hereinafter, each component included in encoder 100 will be described.

[Splitter]

Splitter 102 splits each picture included in an input moving picture into blocks, and outputs each block to subtractor 104. For example, splitter 102 first splits a picture into blocks of a fixed size (for example, 128×128). The fixed size block is also referred to as coding tree unit (CTU). Splitter 102 then splits each fixed size block into blocks of variable sizes (for example, 64×64 or smaller), based on recursive quadtree and/or binary tree block splitting. The variable size block is also referred to as a coding unit (CU), a prediction unit (PU), or a transform unit (TU). Note that in this embodiment, there is no need to differentiate between CU, PU, and TU; all or some of the blocks in a picture may be processed per CU, PU, or TU.

Figure 2:
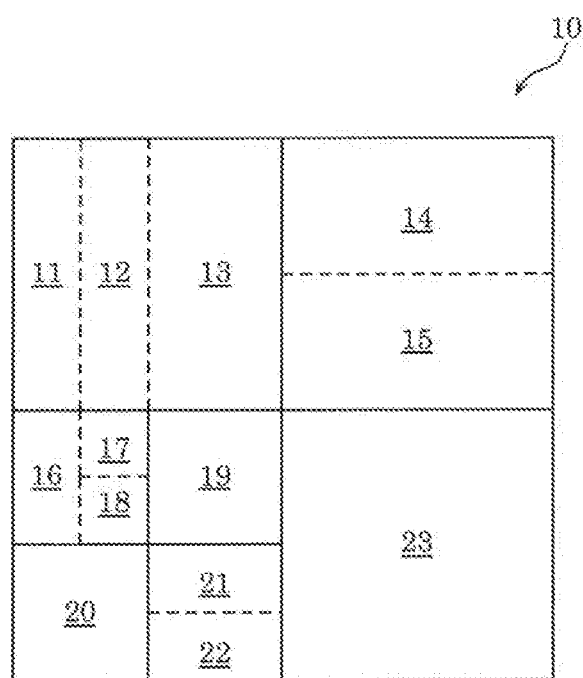
FIG. 2 illustrates one example of block splitting according to Embodiment 1.

FIG. 2 illustrates one example of block splitting according to Embodiment 1. In FIG. 2, the solid lines represent block boundaries of blocks split by quadtree block splitting, and the dashed lines represent block boundaries of blocks split by binary tree block splitting.

Here, block 10 is a square 128×128 pixel block (128×128 block). This 128×128 block 10 is first split into four square 64×64 blocks (quadtree block splitting).

The top left 64×64 block is further vertically split into two rectangle 32×64 blocks, and the left 32×64 block is further vertically split into two rectangle 16×64 blocks (binary tree block splitting). As a result, the top left 64×64 block is split into two 16×64 blocks 11 and 12 and one 32×64 block 13.

The top right 64×64 block is horizontally split into two rectangle 64×32 blocks 14 and 15 (binary tree block splitting).

The bottom left 64×64 block is first split into four square 32×32 blocks (quadtree block splitting). The top left block and the bottom right block among the four 32×32 blocks are further split. The top left 32×32 block is vertically split into two rectangle 16×32 blocks, and the right 16×32 block is further horizontally split into two 16×16 blocks (binary tree block splitting). The bottom right 32×32 block is horizontally split into two 32×16 blocks (binary tree block splitting). As a result, the bottom left 64×64 block is split into 16×32 block 16, two 16×16 blocks 17 and 18, two 32×32 blocks 19 and 20, and two 32×16 blocks 21 and 22.

The bottom right 64×64 block 23 is not split.

As described above, in FIG. 2, block 10 is split into 13 variable size blocks 11 through 23 based on recursive quadtree and binary tree block splitting. This type of splitting is also referred to as quadtree plus binary tree (QTBT) splitting.

Note that in FIG. 2, one block is split into four or two blocks (quadtree or binary tree block splitting), but splitting is not limited to this example. For example, one block may be split into three blocks (ternary block splitting). Splitting including such ternary block splitting is also referred to as multi-type tree (MBT) splitting.

[Subtractor]

Subtractor 104 subtracts a prediction signal (prediction sample) from an original signal (original sample) per block split by splitter 102. In other words, subtractor 104 calculates prediction errors (also referred to as residuals) of a block to be encoded (hereinafter referred to as a current block). Subtractor 104 then outputs the calculated prediction errors to transformer 106.

The original signal is a signal input into encoder 100, and is a signal representing an image for each picture included in a moving picture (for example, a luma signal and two chroma signals). Hereinafter, a signal representing an image is also referred to as a sample.

[Transformer]

Transformer 106 transforms spatial domain prediction errors into frequency domain transform coefficients, and outputs the transform coefficients to quantizer 108. More specifically, transformer 106 applies, for example, a predefined discrete cosine transform (DCT) or discrete sine transform (DST) to spatial domain prediction errors.

Note that transformer 106 may adaptively select a transform type from among a plurality of transform types, and transform prediction errors into transform coefficients by using a transform basis function corresponding to the selected transform type. This sort of transform is also referred to as explicit multiple core transform (EMT) or adaptive multiple transform (AMT).

The transform types include, for example, DCT-II, DCT-V, DCT-VIII, DST-I, and DST-VII. FIG. 3 is a chart indicating transform basis functions for each transform type. In FIG. 3, N indicates the number of input pixels. For example, selection of a transform type from among the plurality of transform types may depend on the prediction type (intra prediction and inter prediction), and may depend on intra prediction mode.

Information indicating whether to apply such EMT or AMT (referred to as, for example, an AMT flag) and information indicating the selected transform type is signalled at the CU level. Note that the signaling of such information need not be performed at the CU level, and may be performed at another level (for example, at the sequence level, picture level, slice level, tile level, or CTU level).

Moreover, transformer 106 may apply a secondary transform to the transform coefficients (transform result). Such a secondary transform is also referred to as adaptive secondary transform (AST) or non-separable secondary transform (NSST). For example, transformer 106 applies a secondary transform to each sub-block (for example, each 4×4 sub-block) included in the block of the transform coefficients corresponding to the intra prediction errors. Information indicating whether to apply NSST and information related to the transform matrix used in NSST are signalled at the CU level. Note that the signaling of such information need not be performed at the CU level, and may be performed at another level (for example, at the sequence level, picture level, slice level, tile level, or CTU level).

Here, a separable transform is a method in which a transform is performed a plurality of times by separately performing a transform for each direction according to the number of dimensions input. A non-separable transform is a method of performing a collective transform in which two or more dimensions in a multidimensional input are collectively regarded as a single dimension.

In one example of a non-separable transform, when the input is a 4×4 block, the 4×4 block is regarded as a single array including 16 components, and the transform applies a 16×16 transform matrix to the array.

Moreover, similar to above, after an input 4×4 block is regarded as a single array including 16 components, a transform that performs a plurality of Givens rotations on the array (i.e., a Hypercube-Givens Transform) is also one example of a non-separable transform.

[Quantizer]

Quantizer 108 quantizes the transform coefficients output from transformer 106. More specifically, quantizer 108 scans, in a predetermined scanning order, the transform coefficients of the current block, and quantizes the scanned transform coefficients based on quantization parameters (QP) corresponding to the transform coefficients. Quantizer 108 then outputs the quantized transform coefficients (hereinafter referred to as quantized coefficients) of the current block to entropy encoder 110 and inverse quantizer 112.

A predetermined order is an order for quantizing/inverse quantizing transform coefficients. For example, a predetermined scanning order is defined as ascending order of frequency (from low to high frequency) or descending order of frequency (from high to low frequency).

A quantization parameter is a parameter defining a quantization step size (quantization width). For example, if the value of the quantization parameter increases, the quantization step size also increases. In other words, if the value of the quantization parameter increases, the quantization error increases.

[Entropy Encoder]

Entropy encoder 110 generates an encoded signal (encoded bitstream) by variable length encoding quantized coefficients, which are inputs from quantizer 108. More specifically, entropy encoder 110, for example, binarizes quantized coefficients and arithmetic encodes the binary signal.

[Inverse Quantizer]

Inverse quantizer 112 inverse quantizes quantized coefficients, which are inputs from quantizer 108. More specifically, inverse quantizer 112 inverse quantizes, in a predetermined scanning order, quantized coefficients of the current block. Inverse quantizer 112 then outputs the inverse quantized transform coefficients of the current block to inverse transformer 114.

[Inverse Transformer]

Inverse transformer 114 restores prediction errors by inverse transforming transform coefficients, which are inputs from inverse quantizer 112. More specifically, inverse transformer 114 restores the prediction errors of the current block by applying an inverse transform corresponding to the transform applied by transformer 106 on the transform coefficients. Inverse transformer 114 then outputs the restored prediction errors to adder 116.

Note that since information is lost in quantization, the restored prediction errors do not match the prediction errors calculated by subtractor 104. In other words, the restored prediction errors include quantization errors.

[Adder]

Adder 116 reconstructs the current block by summing prediction errors, which are inputs from inverse transformer 114, and prediction samples, which are inputs from prediction controller 128. Adder 116 then outputs the reconstructed block to block memory 118 and loop filter 120. A reconstructed block is also referred to as a local decoded block.

[Block Memory]

Block memory 118 is storage for storing blocks in a picture to be encoded (hereinafter referred to as a current picture) for reference in intra prediction. More specifically, block memory 118 stores reconstructed blocks output from adder 116.

[Loop Filter]

Loop filter 120 applies a loop filter to blocks reconstructed by adder 116, and outputs the filtered reconstructed blocks to frame memory 122. A loop filter is a filter used in an encoding loop (in-loop filter), and includes, for example, a deblocking filter (DF), a sample adaptive offset (SAO), and an adaptive loop filter (ALF).

In ALF, a least square error filter for removing compression artifacts is applied. For example, one filter from among a plurality of filters is selected for each 2×2 sub-block in the current block based on direction and activity of local gradients, and is applied.

More specifically, first, each sub-block (for example, each 2×2 sub-block) is categorized into one out of a plurality of classes (for example, 15 or 25 classes). The classification of the sub-block is based on gradient directionality and activity. For example, classification index C is derived based on gradient directionality D (for example, 0 to 2 or 0 to 4) and gradient activity A (for example, 0 to 4) (for example, C=5D+A). Then, based on classification index C, each sub-block is categorized into one out of a plurality of classes (for example, 15 or 25 classes).

For example, gradient directionality D is calculated by comparing gradients of a plurality of directions (for example, the horizontal, vertical, and two diagonal directions). Moreover, for example, gradient activity A is calculated by summing gradients of a plurality of directions and quantizing the sum.

The filter to be used for each sub-block is determined from among the plurality of filters based on the result of such categorization.

Figure 4A:
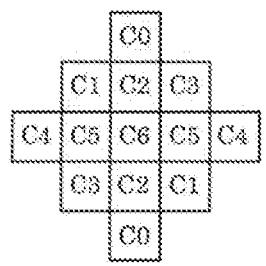
FIG. 4A illustrates one example of a filter shape used in ALF.
Figure 4B:
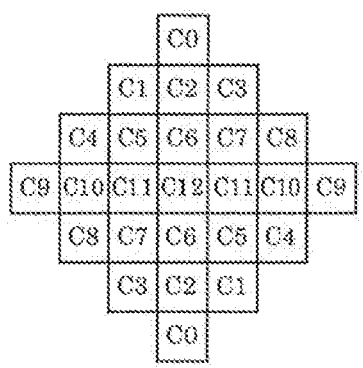
FIG. 4B illustrates another example of a filter shape used in ALF.
Figure 4C:
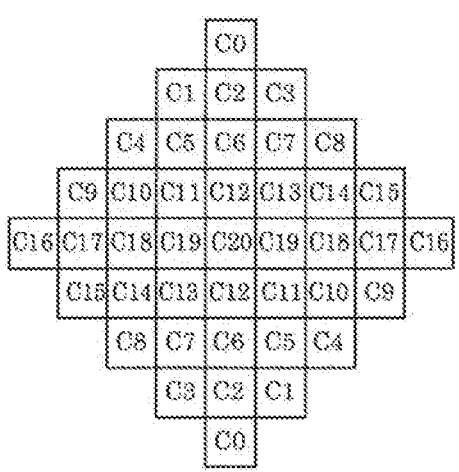
FIG. 4C illustrates another example of a filter shape used in ALF.

The filter shape to be used in ALF is, for example, a circular symmetric filter shape. FIG. 4A through FIG. 4C illustrate examples of filter shapes used in ALF. FIG. 4A illustrates a 5×5 diamond shape filter, FIG. 4B illustrates a 7×7 diamond shape filter, and FIG. 4C illustrates a 9×9 diamond shape filter. Information indicating the filter shape is signalled at the picture level. Note that the signaling of information indicating the filter shape need not be performed at the picture level, and may be performed at another level (for example, at the sequence level, slice level, tile level, CTU level, or CU level).

The enabling or disabling of ALF is determined at the picture level or CU level. For example, for luma, the decision to apply ALF or not is done at the CU level, and for chroma, the decision to apply ALF or not is done at the picture level. Information indicating whether ALF is enabled or disabled is signalled at the picture level or CU level. Note that the signaling of information indicating whether ALF is enabled or disabled need not be performed at the picture level or CU level, and may be performed at another level (for example, at the sequence level, slice level, tile level, or CTU level).

The coefficients set for the plurality of selectable filters (for example, 15 or 25 filters) is signalled at the picture level. Note that the signaling of the coefficients set need not be performed at the picture level, and may be performed at another level (for example, at the sequence level, slice level, tile level, CTU level, CU level, or sub-block level).

[Frame Memory]

Frame memory 122 is storage for storing reference pictures used in inter prediction, and is also referred to as a frame buffer. More specifically, frame memory 122 stores reconstructed blocks filtered by loop filter 120.

[Intra Predictor]

Intra predictor 124 generates a prediction signal (intra prediction signal) by intra predicting the current block with reference to a block or blocks in the current picture and stored in block memory 118 (also referred to as intra frame prediction). More specifically, intra predictor 124 generates an intra prediction signal by intra prediction with reference to samples (for example, luma and/or chroma values) of a block or blocks neighboring the current block, and then outputs the intra prediction signal to prediction controller 128.

For example, intra predictor 124 performs intra prediction by using one mode from among a plurality of predefined intra prediction modes. The intra prediction modes include one or more non-directional prediction modes and a plurality of directional prediction modes.

The one or more non-directional prediction modes include, for example, planar prediction mode and DC prediction mode defined in the H.265/high-efficiency video coding (HEVC) standard (see NPL 1).

Figure 5A:
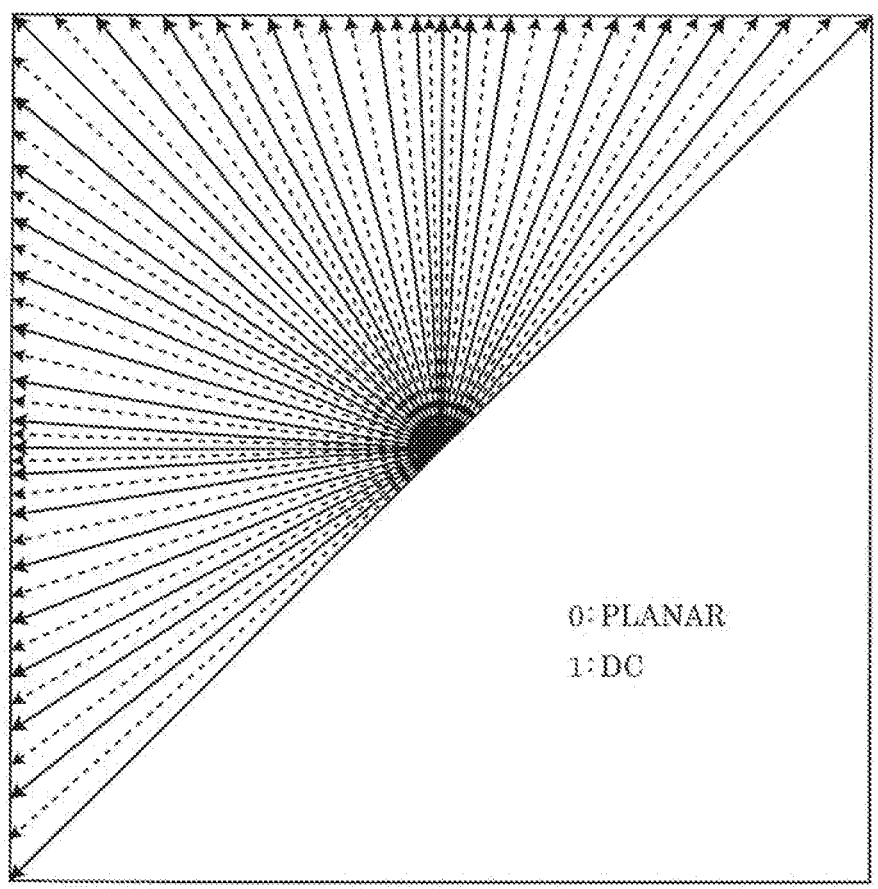
FIG. 5A illustrates 67 intra prediction modes used in intra prediction.

The plurality of directional prediction modes include, for example, the 33 directional prediction modes defined in the H.265/HEVC standard. Note that the plurality of directional prediction modes may further include 32 directional prediction modes in addition to the 33 directional prediction modes (for a total of 65 directional prediction modes). FIG. 5A illustrates 67 intra prediction modes used in intra prediction (two non-directional prediction modes and 65 directional prediction modes). The solid arrows represent the 33 directions defined in the H.265/HEVC standard, and the dashed arrows represent the additional 32 directions.

Note that a luma block may be referenced in chroma block intra prediction. In other words, a chroma component of the current block may be predicted based on a luma component of the current block. Such intra prediction is also referred to as cross-component linear model (CCLM) prediction. Such a chroma block intra prediction mode that references a luma block (referred to as, for example, CCLM mode) may be added as one of the chroma block intra prediction modes.

Intra predictor 124 may correct post-intra-prediction pixel values based on horizontal/vertical reference pixel gradients. Intra prediction accompanied by this sort of correcting is also referred to as position dependent intra prediction combination (PDPC). Information indicating whether to apply PDPC or not (referred to as, for example, a PDPC flag) is, for example, signalled at the CU level. Note that the signaling of this information need not be performed at the CU level, and may be performed at another level (for example, on the sequence level, picture level, slice level, tile level, or CTU level).

[Inter Predictor]

Inter predictor 126 generates a prediction signal (inter prediction signal) by inter predicting the current block with reference to a block or blocks in a reference picture, which is different from the current picture and is stored in frame memory 122 (also referred to as inter frame prediction). Inter prediction is performed per current block or per sub-block (for example, per 4×4 block) in the current block. For example, inter predictor 126 performs motion estimation in a reference picture for the current block or sub-block. Inter predictor 126 then generates an inter prediction signal of the current block or sub-block by motion compensation by using motion information (for example, a motion vector) obtained from motion estimation. Inter predictor 126 then outputs the generated inter prediction signal to prediction controller 128.

The motion information used in motion compensation is signalled. A motion vector predictor may be used for the signaling of the motion vector. In other words, the difference between the motion vector and the motion vector predictor may be signalled.

Note that the inter prediction signal may be generated using motion information for a neighboring block in addition to motion information for the current block obtained from motion estimation. More specifically, the inter prediction signal may be generated per sub-block in the current block by calculating a weighted sum of a prediction signal based on motion information obtained from motion estimation and a prediction signal based on motion information for a neighboring block. Such inter prediction (motion compensation) is also referred to as overlapped block motion compensation (OBMC).

In such an OBMC mode, information indicating sub-block size for OBMC (referred to as, for example, OBMC block size) is signalled at the sequence level. Moreover, information indicating whether to apply the OBMC mode or not (referred to as, for example, an OBMC flag) is signalled at the CU level. Note that the signaling of such information need not be performed at the sequence level and CU level, and may be performed at another level (for example, at the picture level, slice level, tile level, CTU level, or sub-block level).

Figure 5B:
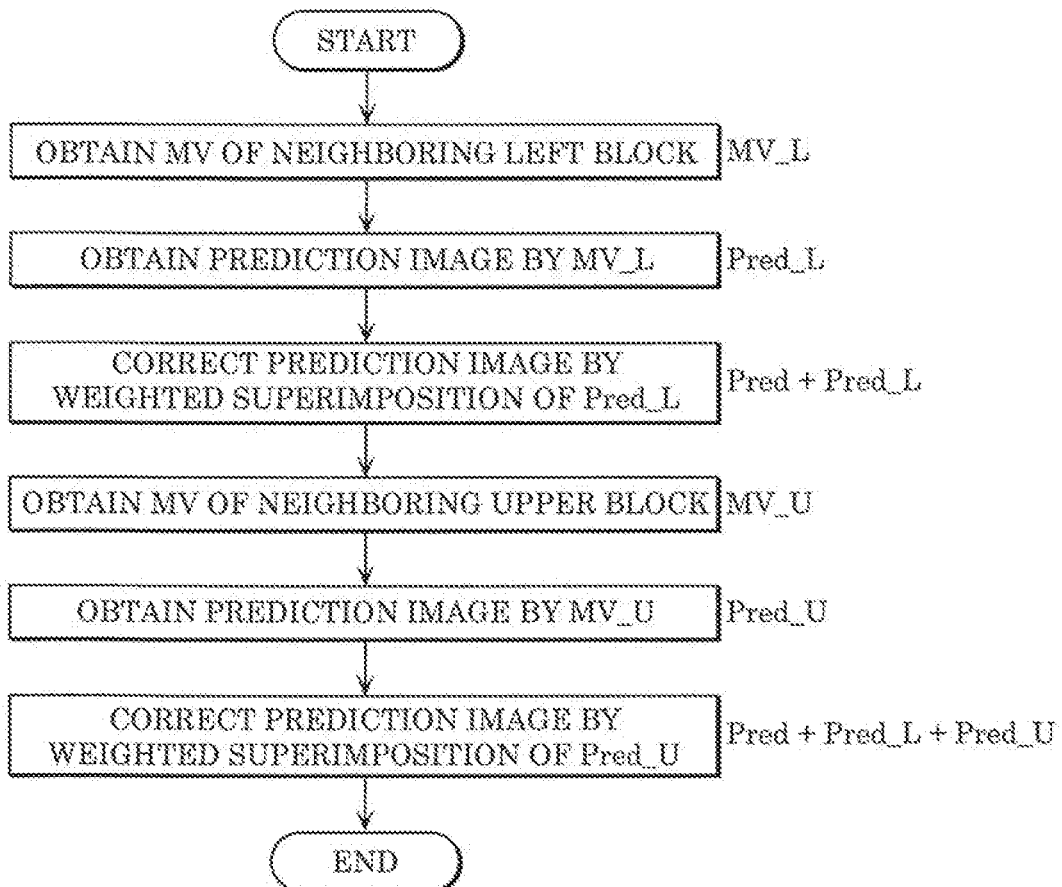
FIG. 5B is a flow chart for illustrating an outline of a prediction image correction process performed via OBMC processing.
Figure 5C:
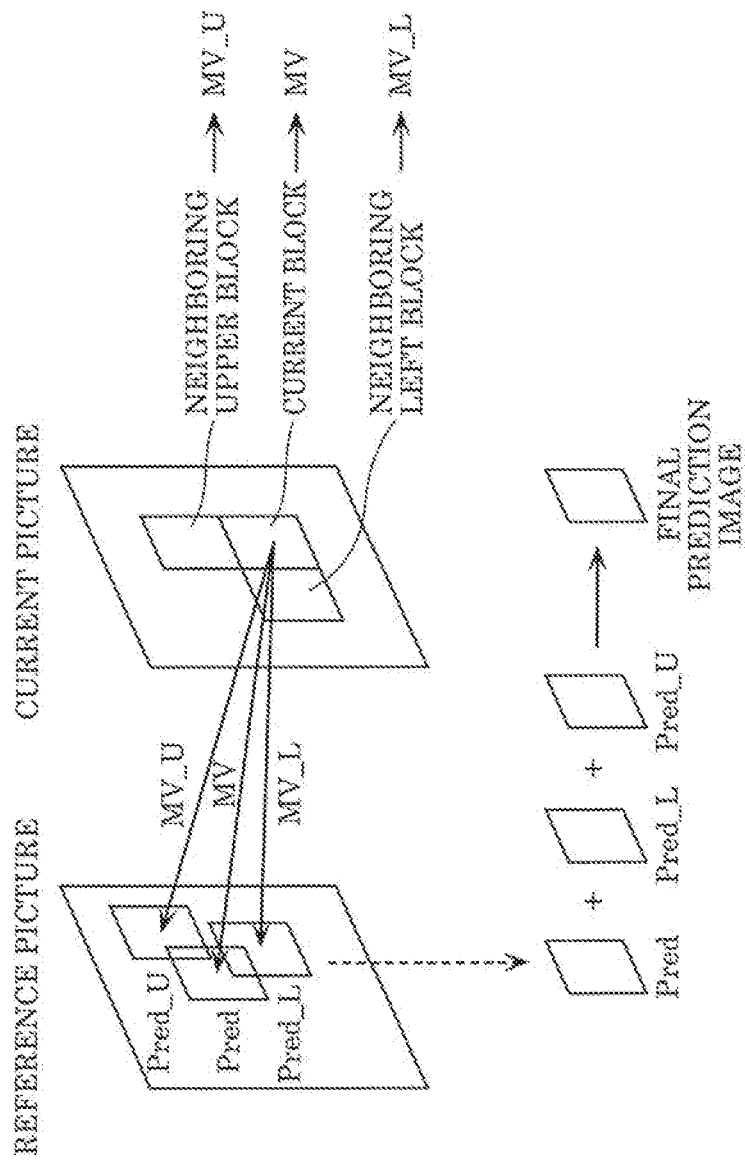
FIG. 5C is a conceptual diagram for illustrating an outline of a prediction image correction process performed via OBMC processing.

Hereinafter, the OBMC mode will be described in further detail. FIG. 5B is a flowchart and FIG. 5C is a conceptual diagram for illustrating an outline of a prediction image correction process performed via OBMC processing.

First, a prediction image (Pred) is obtained through typical motion compensation using a motion vector (MV) assigned to the current block.

Next, a prediction image (Pred_L) is obtained by applying a motion vector (MV_L) of the encoded neighboring left block to the current block, and a first pass of the correction of the prediction image is made by superimposing the prediction image and Pred_L.

Similarly, a prediction image (Pred_U) is obtained by applying a motion vector (MV_U) of the encoded neighboring upper block to the current block, and a second pass of the correction of the prediction image is made by superimposing the prediction image resulting from the first pass and Pred_U. The result of the second pass is the final prediction image.

Note that the above example is of a two-pass correction method using the neighboring left and upper blocks, but the method may be a three-pass or higher correction method that also uses the neighboring right and/or lower block.

Note that the region subject to superimposition may be the entire pixel region of the block, and, alternatively, may be a partial block boundary region.

Note that here, the prediction image correction process is described as being based on a single reference picture, but the same applies when a prediction image is corrected based on a plurality of reference pictures. In such a case, after corrected prediction images resulting from performing correction based on each of the reference pictures are obtained, the obtained corrected prediction images are further superimposed to obtain the final prediction image.

Note that the unit of the current block may be a prediction block and, alternatively, may be a sub-block obtained by further dividing the prediction block.

One example of a method for determining whether to implement OBMC processing is by using an obmc_flag, which is a signal that indicates whether to implement OBMC processing. As one specific example, the encoder determines whether the current block belongs to a region including complicated motion. The encoder sets the obmc_flag to a value of "1" when the block belongs to a region including complicated motion and implements OBMC processing when encoding, and sets the obmc_flag to a value of "0" when the block does not belong to a region including complication motion and encodes without implementing OBMC processing. The decoder switches between implementing OBMC processing or not by decoding the obmc_flag written in the stream and performing the decoding in accordance with the flag value.

Note that the motion information may be derived on the decoder side without being signalled. For example, a merge mode defined in the H.265/HEVC standard may be used. Moreover, for example, the motion information may be derived by performing motion estimation on the decoder side. In this case, motion estimation is performed without using the pixel values of the current block.

Here, a mode for performing motion estimation on the decoder side will be described. A mode for performing motion estimation on the decoder side is also referred to as pattern matched motion vector derivation (PMMVD) mode or frame rate up-conversion (FRUC) mode.

Figure 5D:
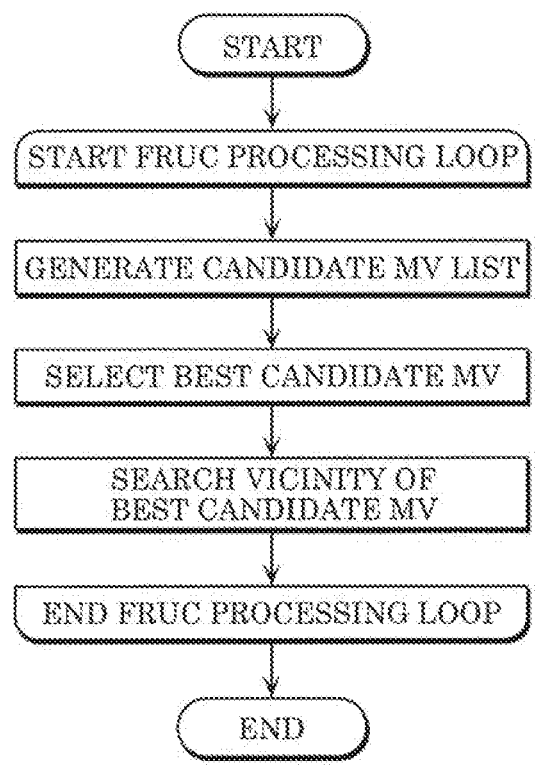
FIG. 5D illustrates one example of FRUC.

One example of FRUC processing is illustrated in FIG. 5D. First, a candidate list (a candidate list may be a merge list) of candidates each including a motion vector predictor is generated with reference to motion vectors of encoded blocks that spatially or temporally neighbor the current block. Next, the best candidate MV is selected from among a plurality of candidate MVs registered in the candidate list. For example, evaluation values for the candidates included in the candidate list are calculated and one candidate is selected based on the calculated evaluation values.

Next, a motion vector for the current block is derived from the motion vector of the selected candidate. More specifically, for example, the motion vector for the current block is calculated as the motion vector of the selected candidate (best candidate MV), as-is. Alternatively, the motion vector for the current block may be derived by pattern matching performed in the vicinity of a position in a reference picture corresponding to the motion vector of the selected candidate. In other words, when the vicinity of the best candidate MV is searched via the same method and an MV having a better evaluation value is found, the best candidate MV may be updated to the MV having the better evaluation value, and the MV having the better evaluation value may be used as the final MV for the current block. Note that a configuration in which this processing is not implemented is also acceptable.

The same processes may be performed in cases in which the processing is performed in units of sub-blocks.

Note that an evaluation value is calculated by calculating the difference in the reconstructed image by pattern matching performed between a region in a reference picture corresponding to a motion vector and a predetermined region. Note that the evaluation value may be calculated by using some other information in addition to the difference.

The pattern matching used is either first pattern matching or second pattern matching. First pattern matching and second pattern matching are also referred to as bilateral matching and template matching, respectively.

In the first pattern matching, pattern matching is performed between two blocks along the motion trajectory of the current block in two different reference pictures. Therefore, in the first pattern matching, a region in another reference picture conforming to the motion trajectory of the current block is used as the predetermined region for the above-described calculation of the candidate evaluation value.

Figure 6:
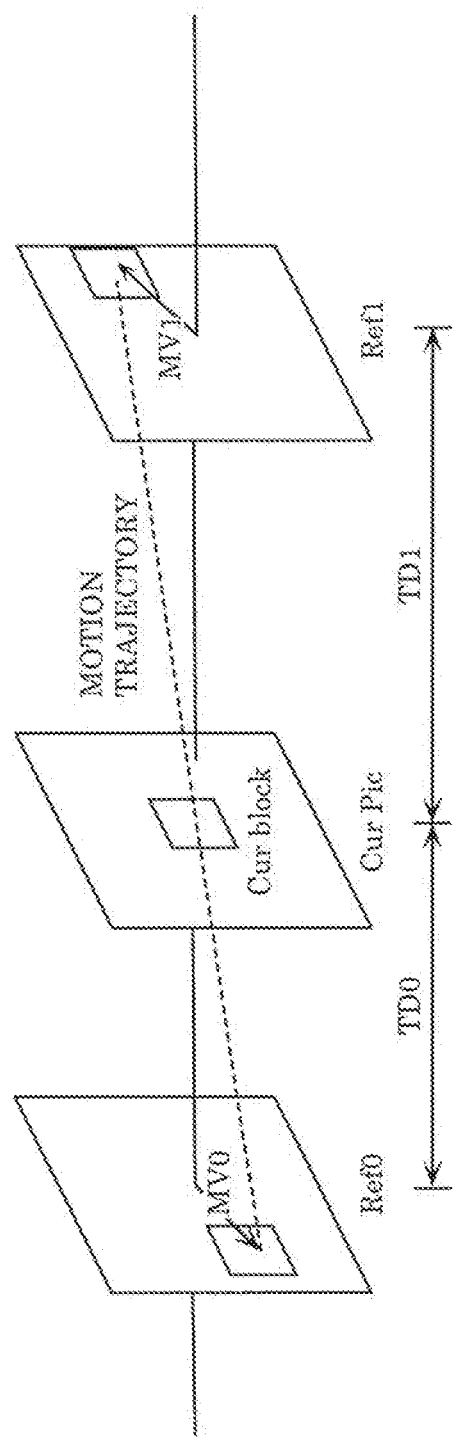
FIG. 6 is for illustrating pattern matching (bilateral matching) between two blocks along a motion trajectory.

FIG. 6 is for illustrating one example of pattern matching (bilateral matching) between two blocks along a motion trajectory. As illustrated in FIG. 6, in the first pattern matching, two motion vectors (MV0, MV1) are derived by finding the best match between two blocks along the motion trajectory of the current block (Cur block) in two different reference pictures (Ref0, Ref1). More specifically, a difference between (i) a reconstructed image in a specified position in a first encoded reference picture (Ref0) specified by a candidate MV and (ii) a reconstructed picture in a specified position in a second encoded reference picture (Ref1) specified by a symmetrical MV scaled at a display time interval of the candidate MV may be derived, and the evaluation value for the current block may be calculated by using the derived difference. The candidate MV having the best evaluation value among the plurality of candidate MVs may be selected as the final MV.

Under the assumption of continuous motion trajectory, the motion vectors (MV0, MV1) pointing to the two reference blocks shall be proportional to the temporal distances (TD0, TD1) between the current picture (Cur Pic) and the two reference pictures (Ref0, Ref1). For example, when the current picture is temporally between the two reference pictures and the temporal distance from the current picture to the two reference pictures is the same, the first pattern matching derives a mirror based bi-directional motion vector.

In the second pattern matching, pattern matching is performed between a template in the current picture (blocks neighboring the current block in the current picture (for example, the top and/or left neighboring blocks)) and a block in a reference picture. Therefore, in the second pattern matching, a block neighboring the current block in the current picture is used as the predetermined region for the above-described calculation of the candidate evaluation value.

Figure 7:
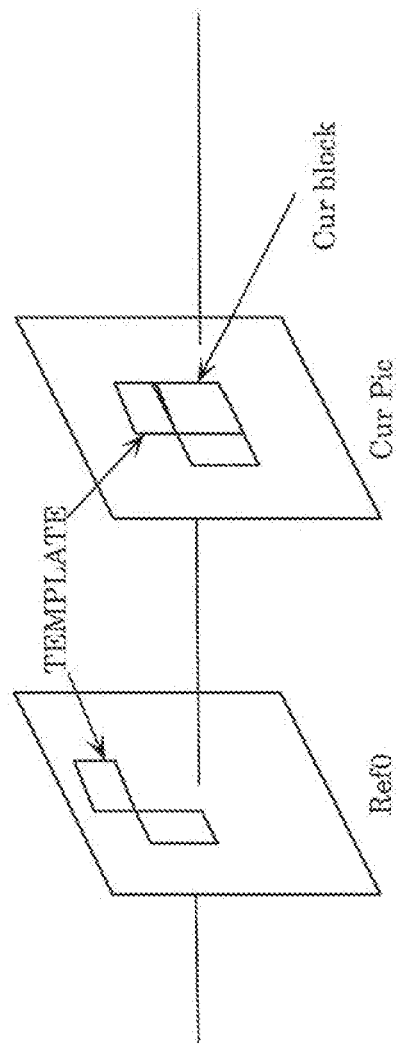
FIG. 7 is for illustrating pattern matching (template matching) between a template in the current picture and a block in a reference picture.

FIG. 7 is for illustrating one example of pattern matching (template matching) between a template in the current picture and a block in a reference picture. As illustrated in FIG. 7, in the second pattern matching, a motion vector of the current block is derived by searching a reference picture (Ref0) to find the block that best matches neighboring blocks of the current block (Cur block) in the current picture (Cur Pic). More specifically, a difference between (i) a reconstructed image of an encoded region that is both or one of the neighboring left and neighboring upper region and (ii) a reconstructed picture in the same position in an encoded reference picture (Ref0) specified by a candidate MV may be derived, and the evaluation value for the current block may be calculated by using the derived difference. The candidate MV having the best evaluation value among the plurality of candidate MVs may be selected as the best candidate MV.

Information indicating whether to apply the FRUC mode or not (referred to as, for example, a FRUC flag) is signalled at the CU level. Moreover, when the FRUC mode is applied (for example, when the FRUC flag is set to true), information indicating the pattern matching method (first pattern matching or second pattern matching) is signalled at the CU level. Note that the signaling of such information need not be performed at the CU level, and may be performed at another level (for example, at the sequence level, picture level, slice level, tile level, CTU level, or sub-block level).

Here, a mode for deriving a motion vector based on a model assuming uniform linear motion will be described. This mode is also referred to as a bi-directional optical flow (BIO) mode.

Figure 8:
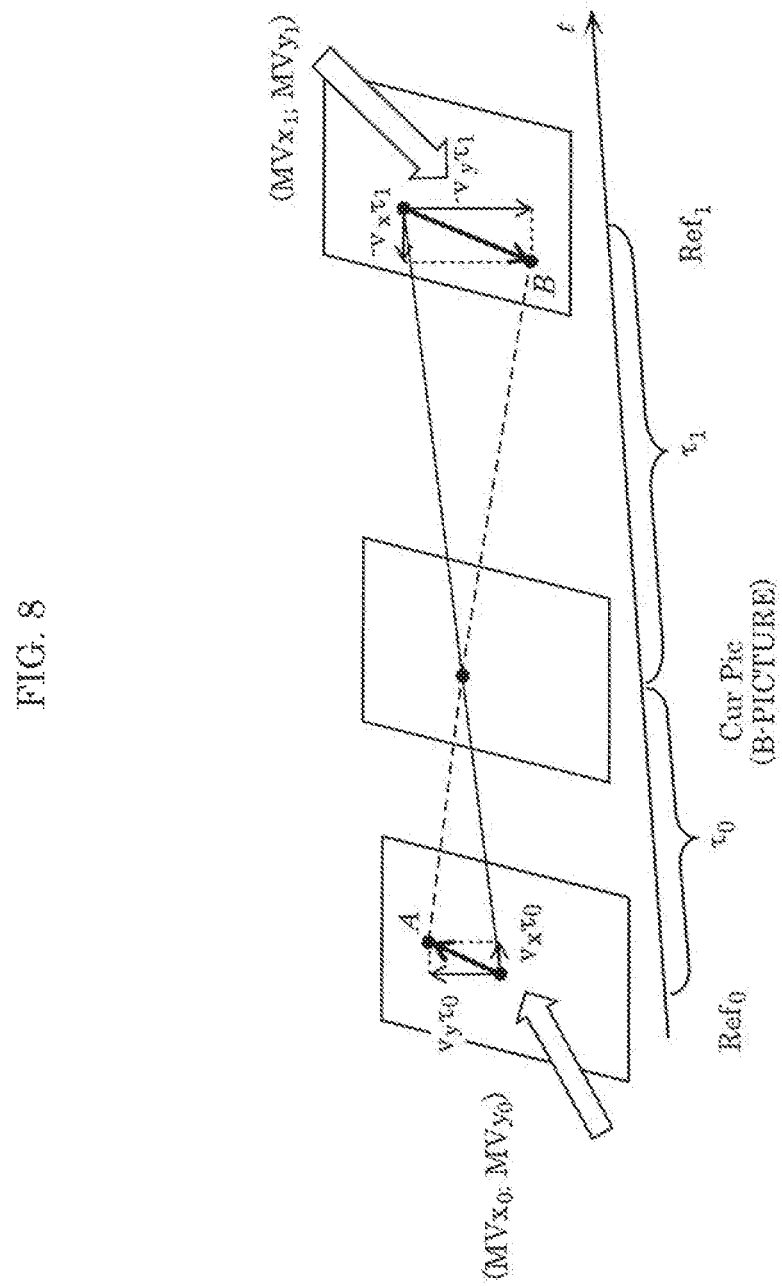
FIG. 8 is for illustrating a model assuming uniform linear motion.

FIG. 8 is for illustrating a model assuming uniform linear motion. In FIG. 8, $(v_x, v_y)$ denotes a velocity vector, and $\tau_0$ and $\tau_1$ denote temporal distances between the current picture (Cur Pic) and two reference pictures (Ref$_0$, Ref$_1$). (MVx$_0$, MVy$_0$) denotes a motion vector corresponding to reference picture Ref$_0$, and (MVx$_1$, MVy$_1$) denotes a motion vector corresponding to reference picture Ref$_1$.

Here, under the assumption of uniform linear motion exhibited by velocity vector $(v_x, v_y)$, (MVx$_0$, MVy$_0$) and (MVx$_1$, MVy$_1$) are represented as $(v_x\tau_0, v_y\tau_0)$ and $(-v_x\tau_1, -v_y\tau_1)$, respectively, and the following optical flow equation is given.

MATH. 1

$$\partial I^{(k)}/\partial t + v_x \partial I^{(k)}/\partial x + v_y \partial I^{(k)}/\partial y = 0. \quad (1)$$

Here, $I^{(k)}$ denotes a luma value from reference picture k (k=0, 1) after motion compensation. This optical flow equation shows that the sum of (i) the time derivative of the luma value, (ii) the product of the horizontal velocity and the horizontal component of the spatial gradient of a reference picture, and (iii) the product of the vertical velocity and the vertical component of the spatial gradient of a reference picture is equal to zero. A motion vector of each block obtained from, for example, a merge list is corrected pixel by pixel based on a combination of the optical flow equation and Hermite interpolation.

Note that a motion vector may be derived on the decoder side using a method other than deriving a motion vector based on a model assuming uniform linear motion. For example, a motion vector may be derived for each sub-block based on motion vectors of neighboring blocks.

Here, a mode in which a motion vector is derived for each sub-block based on motion vectors of neighboring blocks will be described. This mode is also referred to as affine motion compensation prediction mode.

Figure 9A:
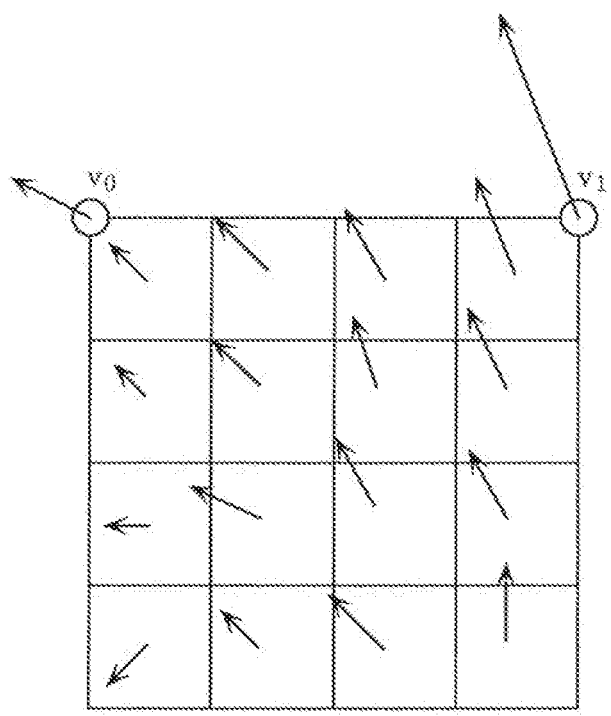
FIG. 9A is for illustrating deriving a motion vector of each sub-block based on motion vectors of neighboring blocks.

FIG. 9A is for illustrating deriving a motion vector of each sub-block based on motion vectors of neighboring blocks. In FIG. 9A, the current block includes 16 4×4 sub-blocks. Here, motion vector $v_0$ of the top left corner control point in the current block is derived based on motion vectors of neighboring sub-blocks, and motion vector $v_1$ of the top right corner control point in the current block is derived based on motion vectors of neighboring blocks. Then, using the two motion vectors $v_0$ and $v_1$, the motion vector $(v_x, v_y)$ of each sub-block in the current block is derived using Equation 2 below.

MATH. 2

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x + \dfrac{(v_{1x} - v_{0x})}{w}y + v_{0y} \end{cases} \quad (2)$$

Here, x and y are the horizontal and vertical positions of the sub-block, respectively, and w is a predetermined weighted coefficient.

Such an affine motion compensation prediction mode may include a number of modes of different methods of deriving the motion vectors of the top left and top right corner control points. Information indicating such an affine motion compensation prediction mode (referred to as, for example, an affine flag) is signalled at the CU level. Note that the signaling of information indicating the affine motion compensation prediction mode need not be performed at the CU level, and may be performed at another level (for example, at the sequence level, picture level, slice level, tile level, CTU level, or sub-block level).

[Prediction Controller]

Prediction controller 128 selects either the intra prediction signal or the inter prediction signal, and outputs the selected prediction signal to subtractor 104 and adder 116.

Here, an example of deriving a motion vector via merge mode in a current picture will be given. FIG. 9B is for illustrating an outline of a process for deriving a motion vector via merge mode.

First, an MV predictor list in which candidate MV predictors are registered is generated. Examples of candidate MV predictors include: spatially neighboring MV predictors, which are MVs of encoded blocks positioned in the spatial vicinity of the current block; a temporally neighboring MV predictor, which is an MV of a block in an encoded reference picture that neighbors a block in the same location as the current block; a combined MV predictor, which is an MV generated by combining the MV values of the spatially neighboring MV predictor and the temporally neighboring MV predictor; and a zero MV predictor, which is an MV whose value is zero.

Next, the MV of the current block is determined by selecting one MV predictor from among the plurality of MV predictors registered in the MV predictor list.

Furthermore, in the variable-length encoder, a merge_idx, which is a signal indicating which MV predictor is selected, is written and encoded into the stream.

Note that the MV predictors registered in the MV predictor list illustrated in FIG. 9B constitute one example. The number of MV predictors registered in the MV predictor list may be different from the number illustrated in FIG. 9B, the MV predictors registered in the MV predictor list may omit one or more of the types of MV predictors given in the example in FIG. 9B, and the MV predictors registered in the MV predictor list may include one or more types of MV predictors in addition to and different from the types given in the example in FIG. 9B.

Note that the final MV may be determined by performing DMVR processing (to be described later) by using the MV of the current block derived via merge mode.

Here, an example of determining an MV by using DMVR processing will be given.

Figure 9C:
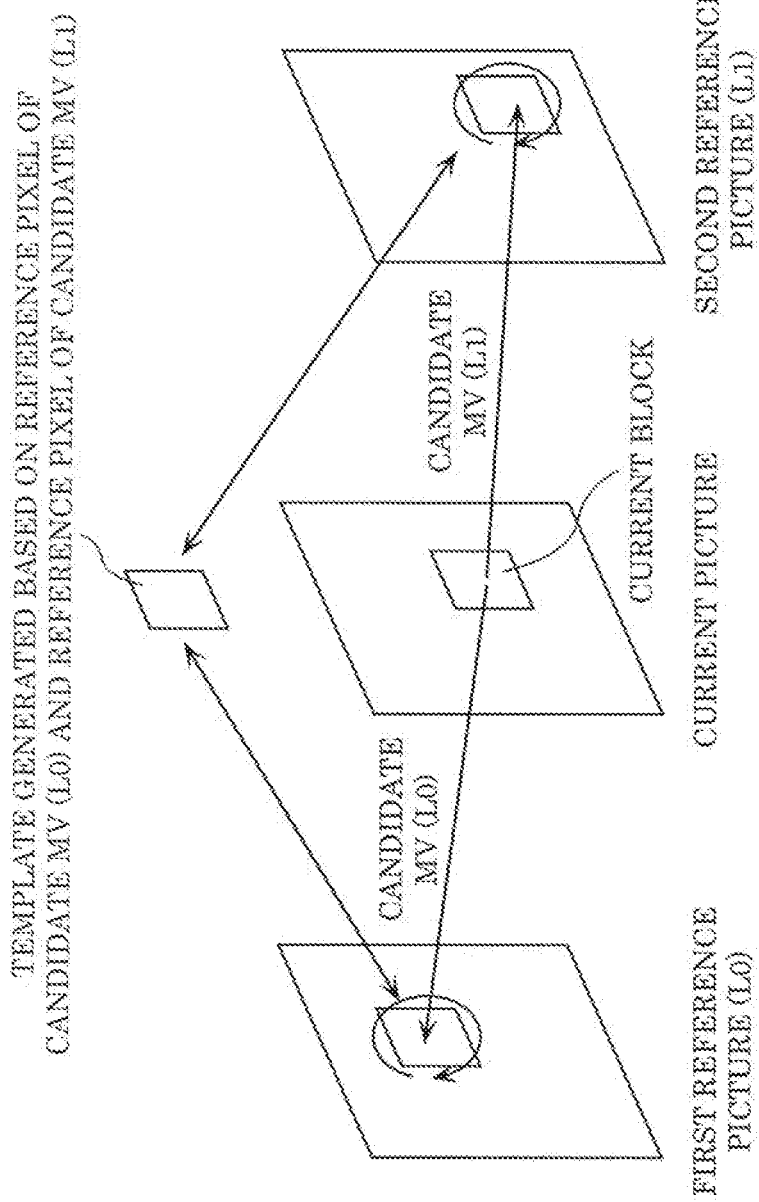
FIG. 9C is a conceptual diagram for illustrating an outline of DMVR processing.

FIG. 9C is a conceptual diagram for illustrating an outline of DMVR processing.

First, the most appropriate MVP set for the current block is considered to be the candidate MV, reference pixels are obtained from a first reference picture, which is a picture processed in the L0 direction in accordance with the candidate MV, and a second reference picture, which is a picture processed in the L1 direction in accordance with the candidate MV, and a template is generated by calculating the average of the reference pixels.

Next, using the template, the surrounding regions of the candidate MVs of the first and second reference pictures are searched, and the MV with the lowest cost is determined to be the final MV. Note that the cost value is calculated using, for example, the difference between each pixel value in the template and each pixel value in the regions searched, as well as the MV value.

Note that the outlines of the processes described here are fundamentally the same in both the encoder and the decoder.

Note that processing other than the processing exactly as described above may be used, so long as the processing is capable of deriving the final MV by searching the surroundings of the candidate MV.

Here, an example of a mode that generates a prediction image by using LIC processing will be given.

Figure 9D:
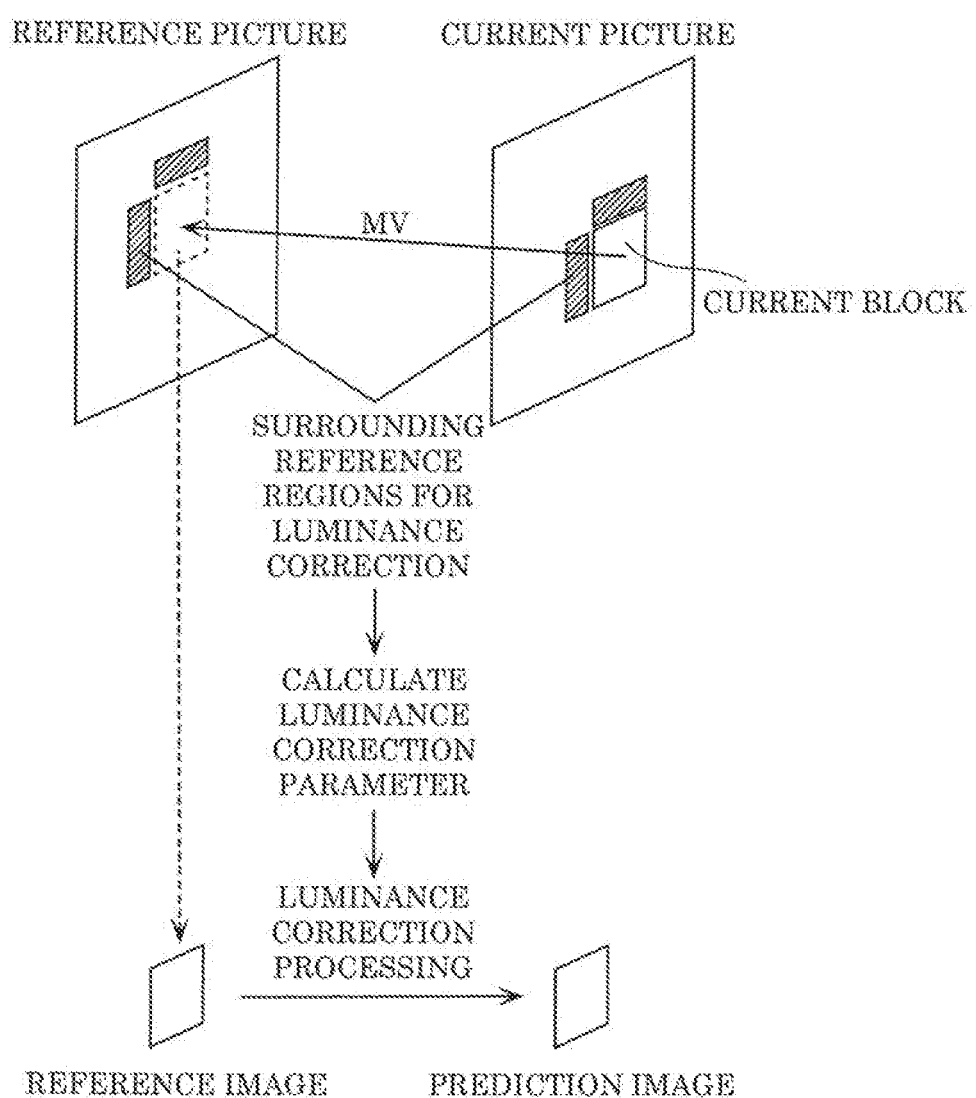
FIG. 9D is for illustrating an outline of a prediction image generation method using a luminance correction process performed via LIC processing.

FIG. 9D is for illustrating an outline of a prediction image generation method using a luminance correction process performed via LIC processing.

First, an MV is extracted for obtaining, from an encoded reference picture, a reference image corresponding to the current block.

Next, information indicating how the luminance value changed between the reference picture and the current picture is extracted and a luminance correction parameter is calculated by using the luminance pixel values for the encoded left neighboring reference region and the encoded upper neighboring reference region, and the luminance pixel value in the same location in the reference picture specified by the MV.

The prediction image for the current block is generated by performing a luminance correction process by using the luminance correction parameter on the reference image in the reference picture specified by the MV.

Note that the shape of the surrounding reference region illustrated in FIG. 9D is just one example; the surrounding reference region may have a different shape.

Moreover, although a prediction image is generated from a single reference picture in this example, in cases in which a prediction image is generated from a plurality of reference pictures as well, the prediction image is generated after performing a luminance correction process, via the same method, on the reference images obtained from the reference pictures.

One example of a method for determining whether to implement LIC processing is by using an lic_flag, which is a signal that indicates whether to implement LIC processing. As one specific example, the encoder determines whether the current block belongs to a region of luminance change. The encoder sets the lic_flag to a value of "1" when the block belongs to a region of luminance change and implements LIC processing when encoding, and sets the lic_flag to a value of "0" when the block does not belong to a region of luminance change and encodes without implementing LIC processing. The decoder switches between implementing LIC processing or not by decoding the lic_flag written in the stream and performing the decoding in accordance with the flag value.

One example of a different method of determining whether to implement LIC processing is determining so in accordance with whether LIC processing was determined to be implemented for a surrounding block. In one specific example, when merge mode is used on the current block, whether LIC processing was applied in the encoding of the surrounding encoded block selected upon deriving the MV in the merge mode processing may be determined, and whether to implement LIC processing or not can be switched based on the result of the determination. Note that in this example, the same applies to the processing performed on the decoder side.

[Decoder Outline]

Figure 10:
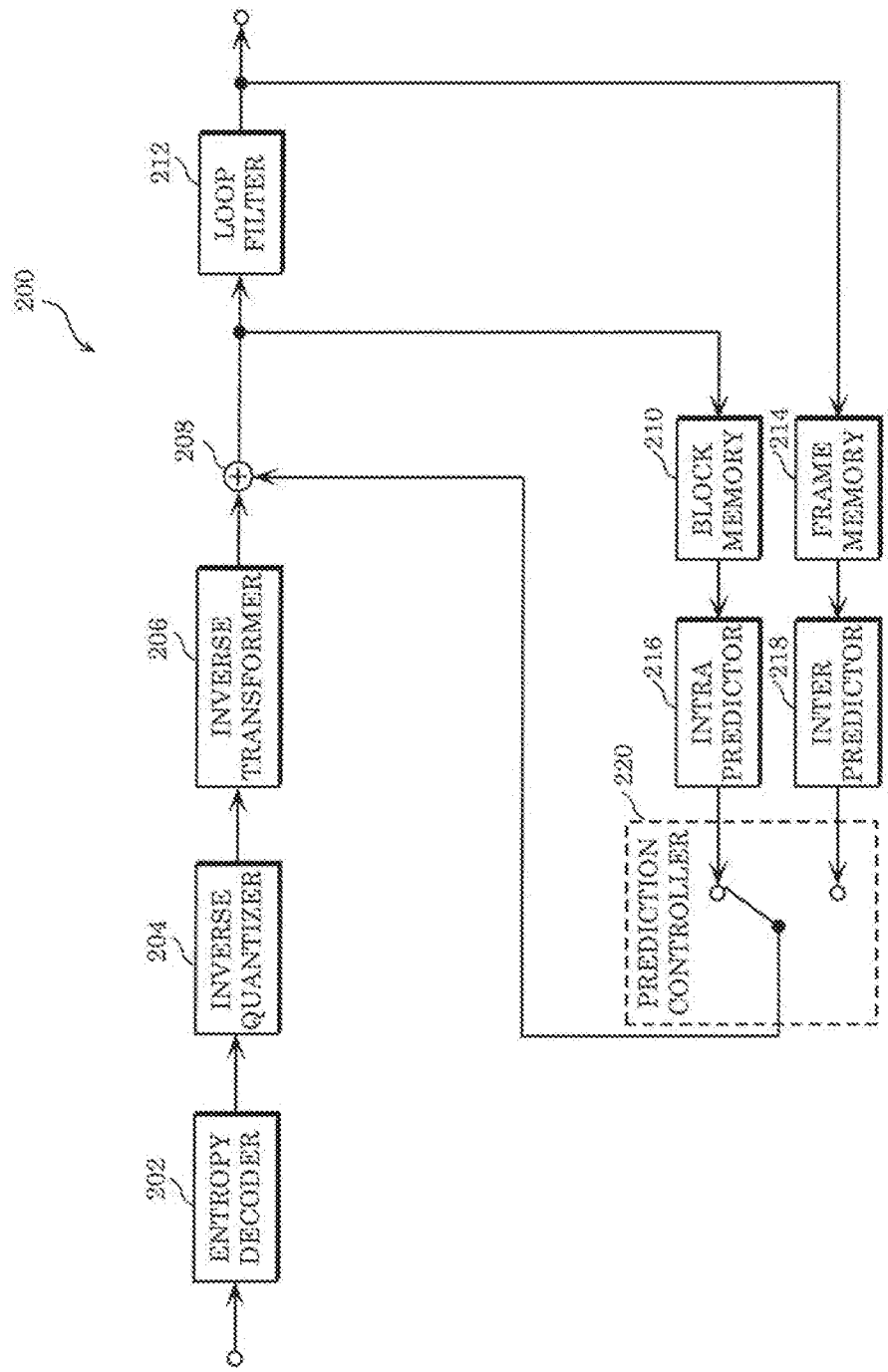
FIG. 10 is a block diagram illustrating a functional configuration of a decoder according to Embodiment 1.

Next, a decoder capable of decoding an encoded signal (encoded bitstream) output from encoder 100 will be described. FIG. 10 is a block diagram illustrating a functional configuration of decoder 200 according to Embodiment 1. Decoder 200 is a moving picture/picture decoder that decodes a moving picture/picture block by block.

As illustrated in FIG. 10, decoder 200 includes entropy decoder 202, inverse quantizer 204, inverse transformer 206, adder 208, block memory 210, loop filter 212, frame memory 214, intra predictor 216, inter predictor 218, and prediction controller 220.

Decoder 200 is realized as, for example, a generic processor and memory. In this case, when a software program stored in the memory is executed by the processor, the processor functions as entropy decoder 202, inverse quantizer 204, inverse transformer 206, adder 208, loop filter 212, intra predictor 216, inter predictor 218, and prediction controller 220. Alternatively, decoder 200 may be realized as one or more dedicated electronic circuits corresponding to entropy decoder 202, inverse quantizer 204, inverse transformer 206, adder 208, loop filter 212, intra predictor 216, inter predictor 218, and prediction controller 220.

Hereinafter, each component included in decoder 200 will be described.

[Entropy Decoder]

Entropy decoder 202 entropy decodes an encoded bitstream. More specifically, for example, entropy decoder 202 arithmetic decodes an encoded bitstream into a binary signal. Entropy decoder 202 then debinarizes the binary signal. With this, entropy decoder 202 outputs quantized coefficients of each block to inverse quantizer 204.

[Inverse Quantizer]

Inverse quantizer 204 inverse quantizes quantized coefficients of a block to be decoded (hereinafter referred to as a current block), which are inputs from entropy decoder 202. More specifically, inverse quantizer 204 inverse quantizes quantized coefficients of the current block based on quantization parameters corresponding to the quantized coefficients. Inverse quantizer 204 then outputs the inverse quantized coefficients (i.e., transform coefficients) of the current block to inverse transformer 206.

[Inverse Transformer]

Inverse transformer 206 restores prediction errors by inverse transforming transform coefficients, which are inputs from inverse quantizer 204.

For example, when information parsed from an encoded bitstream indicates application of EMT or AMT (for example, when the AMT flag is set to true), inverse transformer 206 inverse transforms the transform coefficients of the current block based on information indicating the parsed transform type.

Moreover, for example, when information parsed from an encoded bitstream indicates application of NSST, inverse transformer 206 applies a secondary inverse transform to the transform coefficients.

[Adder]

Adder 208 reconstructs the current block by summing prediction errors, which are inputs from inverse transformer 206, and prediction samples, which is an input from prediction controller 220. Adder 208 then outputs the reconstructed block to block memory 210 and loop filter 212.

[Block Memory]

Block memory 210 is storage for storing blocks in a picture to be decoded (hereinafter referred to as a current picture) for reference in intra prediction. More specifically, block memory 210 stores reconstructed blocks output from adder 208.

[Loop Filter]

Loop filter 212 applies a loop filter to blocks reconstructed by adder 208, and outputs the filtered reconstructed blocks to frame memory 214 and, for example, a display device.

When information indicating the enabling or disabling of ALF parsed from an encoded bitstream indicates enabled, one filter from among a plurality of filters is selected based on direction and activity of local gradients, and the selected filter is applied to the reconstructed block.

[Frame Memory]

Frame memory 214 is storage for storing reference pictures used in inter prediction, and is also referred to as a frame buffer. More specifically, frame memory 214 stores reconstructed blocks filtered by loop filter 212.

[Intra Predictor]

Intra predictor 216 generates a prediction signal (intra prediction signal) by intra prediction with reference to a block or blocks in the current picture and stored in block memory 210. More specifically, intra predictor 216 generates an intra prediction signal by intra prediction with reference to samples (for example, luma and/or chroma values) of a block or blocks neighboring the current block, and then outputs the intra prediction signal to prediction controller 220.

Note that when an intra prediction mode in which a chroma block is intra predicted from a luma block is selected, intra predictor 216 may predict the chroma component of the current block based on the luma component of the current block.

Moreover, when information indicating the application of PDPC is parsed from an encoded bitstream, intra predictor 216 corrects post-intra-prediction pixel values based on horizontal/vertical reference pixel gradients.

[Inter Predictor]

Inter predictor 218 predicts the current block with reference to a reference picture stored in frame memory 214. Inter prediction is performed per current block or per sub-block (for example, per 4×4 block) in the current block. For example, inter predictor 218 generates an inter prediction signal of the current block or sub-block by motion compensation by using motion information (for example, a motion vector) parsed from an encoded bitstream, and outputs the inter prediction signal to prediction controller 220.

Note that when the information parsed from the encoded bitstream indicates application of OBMC mode, inter predictor 218 generates the inter prediction signal using motion information for a neighboring block in addition to motion information for the current block obtained from motion estimation.

Moreover, when the information parsed from the encoded bitstream indicates application of FRUC mode, inter predictor 218 derives motion information by performing motion estimation in accordance with the pattern matching method (bilateral matching or template matching) parsed from the encoded bitstream. Inter predictor 218 then performs motion compensation using the derived motion information.

Moreover, when BIO mode is to be applied, inter predictor 218 derives a motion vector based on a model assuming uniform linear motion. Moreover, when the information parsed from the encoded bitstream indicates that affine motion compensation prediction mode is to be applied, inter predictor 218 derives a motion vector of each sub-block based on motion vectors of neighboring blocks.

[Prediction Controller]

Prediction controller 220 selects either the intra prediction signal or the inter prediction signal, and outputs the selected prediction signal to adder 208.

This aspect may be implemented in combination with one or more of the other aspects according to the present disclosure. In addition, part of the processes in the flowcharts, part of the constituent elements of the apparatuses, and part of the syntax described in this aspect may be implemented in combination with other aspects.

[Setting of Filter Information]

Next, setting of filter information of an Adaptive Loop Filter (ALF) is described in detail.

Figure 11:
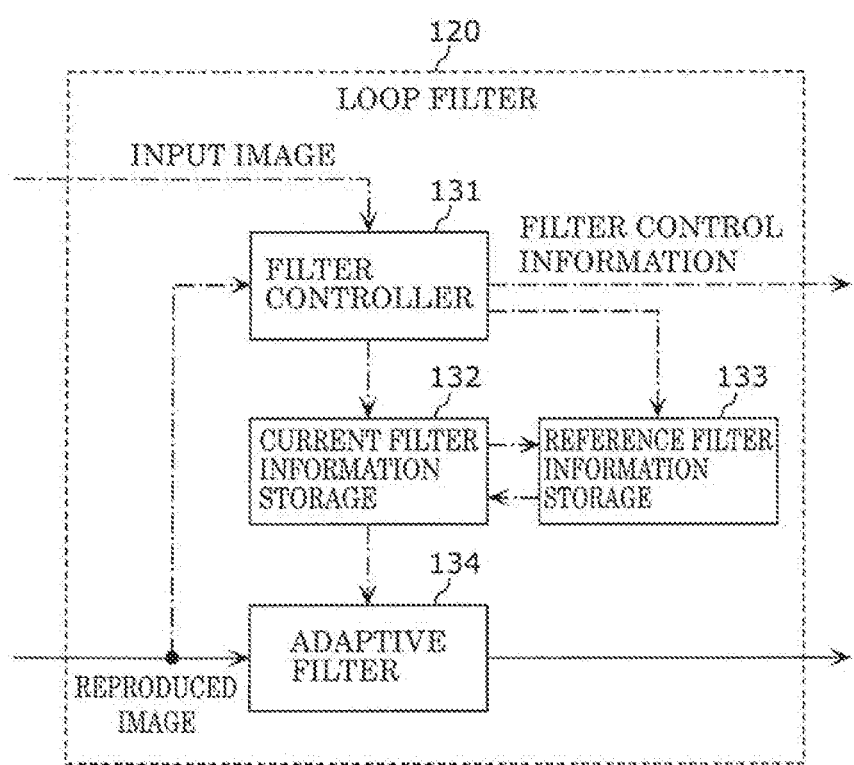
FIG. 11 is a block diagram illustrating a configuration of a loop filter of an encoder according to Embodiment 1.

FIG. 11 is a block diagram illustrating a configuration of loop filter 120 of encoder 100 according to Embodiment 1. Loop filter 120 includes filter controller 131, current filter information storage 132, reference filter information storage 133, and adaptive filter 134.

Filter controller 131 is a circuit for processing filter information. Current filter information storage 132 is memory for storing filter information which is used by an adaptive loop filter. Reference filter information storage 133 is memory for storing filter information which has been used by an adaptive loop filter. Adaptive filter 134 is a circuit for applying, for each block, an adaptive loop filter using filter information stored in current filter information storage 132.

Filter information is also referred to as one or more filter information sets. For example, filter controller 131 sets a filter information set to current filter information storage 132 with reference to filter information set stored in reference filter information storage 133 at the top of a slice.

Adaptive filter 134 applies, for each block, an adaptive loop filter using filter information set in current filter information storage 132. For example, adaptive filter 134 selects, for each block, filter coefficients for approximating a reproduced image (reconstructed image) to an input image (original image) from plural kinds of filter coefficients included in the filter information set according to properties of the reproduced image. Adaptive filter 134 then applies, for each block, an adaptive loop filter using the filter coefficients selected.

In addition, the Network Abstraction Layer (NAL) unit type of a current slice may correspond to a picture which is available as a reference picture in inter prediction. In this case, filter controller 131 stores, in reference filter information storage 133, the filter information set used by the adaptive loop filter for the picture including the current slice.

Filter controller 131 then stores, in reference filter information storage 133, a plurality of filter information sets used by an adaptive loop filter for a plurality of pictures.

Filter controller 131 manages a plurality of reference pictures stored in a reference picture buffer that is frame memory 122, in association with a plurality of filter information sets stored in reference filter information storage 133. At that time, filter controller 131 manages each of the plurality of filter information sets, in association with the reference picture to which the adaptive loop filter is applied using the filter information set.

In addition, for example, there is a case in which a reference picture is given a mark of "unused for reference". In this case, filter controller 131 provides the filter information set associated with the reference picture with the mark of "unused for reference" with the mark of "unused for reference". In other words, when the reference picture is deleted, filter controller 131 deletes the filter information set associated with the reference picture.

Here, when the data of a reference picture, a filter information set, and the like are marked as "unused for reference", the mark indicates that the data is not referred to later.

In addition, filter controller 131 may output filter control information regarding a method for setting filter information to current filter information storage 132. In addition, filter control information regarding the method for setting the filter information to current filter information storage 132 may be notified from encoder 100 to decoder 200.

For example, the filter control information is information for specifying the filter information set to be used by the adaptive loop filter to be applied to the picture. More specifically, the filter control information may indicate the value of the reference picture index of the reference picture associated with the filter information set to be used by the adaptive loop filter to be applied to the picture. The filter information set may be specified from the plurality of filter information sets in reference filter information storage 133 using the value of the reference picture index of the reference picture.

Alternatively, the filter control information may indicate filter coefficients of the filter information set generated based on the input image (original image) and the reproduced image (reconstructed image) instead of the filter information set in reference filter information storage 133. In this way, the filter information set to be used by the adaptive loop filter to be applied to the picture may be specified.

In addition, filter controller 131 may restrict reference so that only the filter information set associated with a reference picture that satisfies a determined condition is referred to. More specifically, filter controller 131 may allow reference to only the filter information set associated with the picture that satisfies a restriction condition regarding a TSA picture. The picture that satisfies the restriction condition regarding the TSA picture may be a picture having a temporal ID smaller than the temporal ID of the TSA picture.

For example, in the encoding of the TSA picture and the one or more following pictures in coding order, it is prohibited that a picture which precedes the TSA picture in coding order and has a temporal ID larger than or equal to the temporal ID of the TSA picture is referred to. Reference to the filter information set associated with such a picture may be prohibited.

In addition, the picture that satisfies the restriction condition regarding the TSA picture may be a reference picture having a temporal ID smaller than the temporal ID of each TSA picture between the current picture and the reference picture in coding order.

For example, when there is a TSA picture having a temporal ID smaller than or equal to the temporal ID of one reference picture between the current picture and the reference picture in coding order, reference to the one reference picture is prohibited. Accordingly, reference to the filter information set associated with the reference picture may be prohibited.

It is to be noted that the hierarchical layer indicated by a temporal ID is higher as the temporal ID is larger. For example, it is prohibited that a picture included in a relatively higher hierarchical layer is referred to in encoding another picture included in a relatively lower hierarchical layer.

In addition, the temporal ID is represented as an integer of 0 or more. When the temporal ID is 0, the hierarchical layer indicated by the temporal ID is the lowermost hierarchical layer. Basically, it is not prohibited that a picture included in the lowermost hierarchical layer is referred to in encoding another picture included in the lowermost hierarchical layer or any of the other hierarchical layers.

Figure 12A:
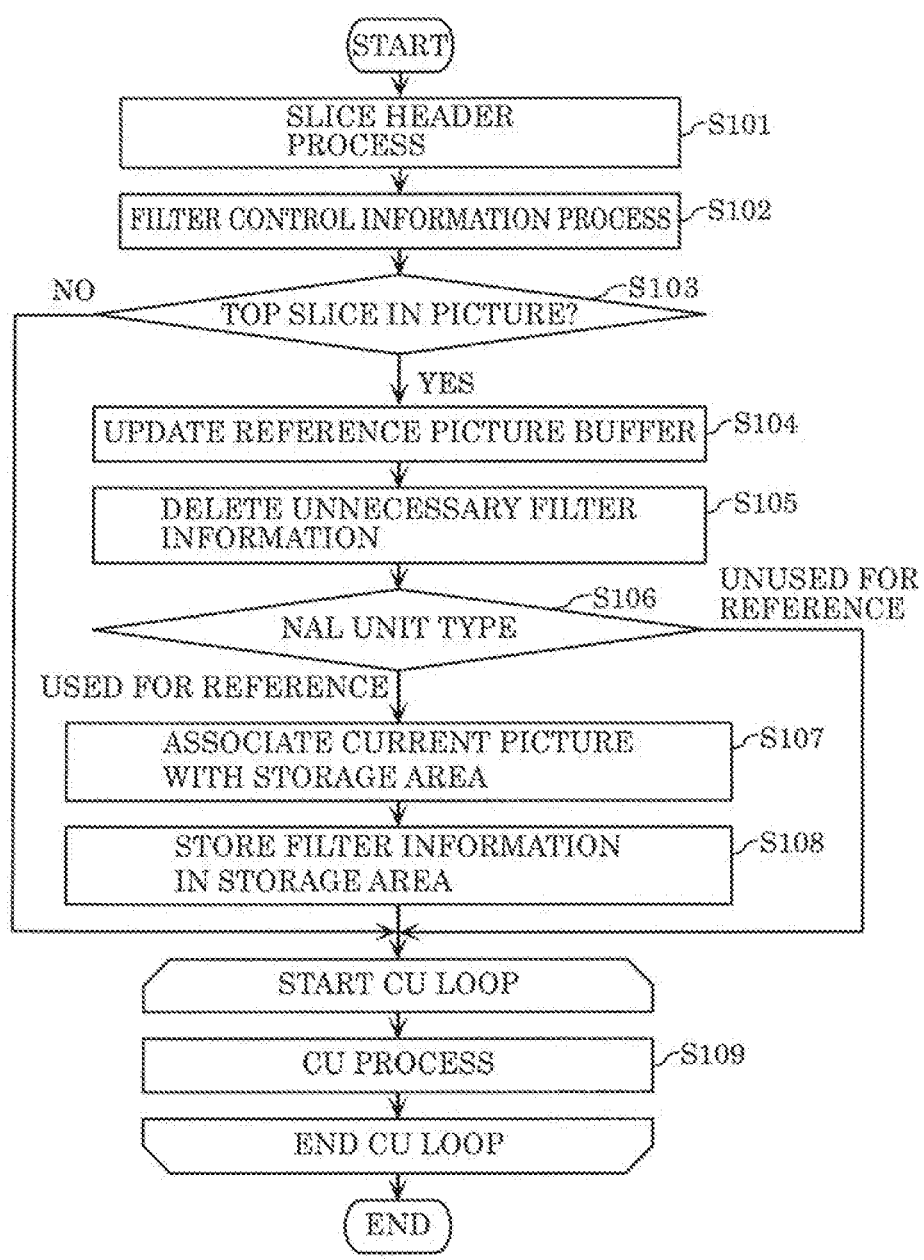
FIG. 12A is a flow chart indicating a first specific example of a management procedure of filter information according to Embodiment 1.

FIG. 12A is a flow chart indicating a first specific example of a management procedure of filter information according to Embodiment 1. Encoder 100 illustrated in FIG. 1 performs an operation indicated in FIG. 12A, for example.

First, encoder 100 performs a slice header process (S101). For example, entropy encoder 110 generates and encodes the slice header of a current slice to be encoded.

Next, encoder 100 performs a filter control information process (S102). For example, filter controller 131 generates and outputs filter control information. In addition, entropy encoder 110 encodes the filter control information output from filter controller 131. The filter control information may be included in the slice header. Accordingly, the filter control information process (S102) may be included in the slice header process (S101).

Next, encoder 100 determines whether the current slice is the top slice in the picture (S103). For example, splitter 102 determines whether the current slice is the top slice in the picture. Any other constituent element may perform such a determination, or each of the constituent elements may perform the determination.

In the case where the current slice is not the top slice (No in S103), a processing loop for a Coding Unit (CU) is performed (S109). In other words, encoder 100 may perform a coding process for each CU. At that time, encoder 100 applies an adaptive loop filter.

In the opposite case where the current slice is the top slice in the picture (Yes in S103), encoder 100 updates a reference picture buffer (S104). More specifically, inter predictor 126 updates information of a reference picture stored in frame memory 122. For example, inter predictor 126 provides an unnecessary reference picture which is not referred to with a mark of "unused for reference". In this way, the unnecessary reference picture which is not referred to is substantially deleted.

After the reference picture buffer is updated, encoder 100 deletes unnecessary filter information (S105). For example, filter controller 131 provides the filter information set associated with the reference picture with the mark of "unused for reference" with the mark of "unused for reference". In this way, the unnecessary filter information set which is not referred to is substantially deleted.

In other words, when the reference picture is deleted from the reference picture buffer, the filter information set associated with the reference picture is deleted.

Encoder 100 then determines whether the NAL unit type of the current slice indicates "used for reference" or "unused for reference" after deleting the unnecessary filter information (S106).

Here, the picture which is "used for reference" is a picture to be referred to, that is, a picture which is allowed to be referred to, and the picture which is "unused for reference" is a picture not to be referred to, that is, a picture which is not allowed to be referred to. For example, filter controller 131 determines whether the NAL unit type of the current slice is the type corresponding to the picture to be referred to, or the type corresponding to the picture not to be referred to.

In the case of "unused for reference" (UNUSED FOR REFERENCE in S106), the processing loop for the CU is performed (S109). In other words, encoder 100 may perform a coding process for each CU. At that time, encoder 100 applies an adaptive loop filter.

In the other case of "unused for reference" (UNUSED FOR REFERENCE in S106), encoder 100 associates the current picture with a storage area (S107). For example, filter controller 131 associates the current picture including the current slice with the storage area in which the filter information set is stored in reference filter information storage 133.

Encoder 100 then stores the filter information in the storage area (S108). More specifically, filter controller 131 stores the filter information set to be used by the adaptive loop filter for the current picture in the storage area associated with the current picture.

Subsequently, the processing loop for the CU is performed (S109). In other words, encoder 100 may perform a coding process for each CU. At that time, encoder 100 applies an adaptive loop filter.

By performing the above operation, encoder 100 can update, at the top of the picture, the filter information in reference filter information storage 133 according to a state of a reference picture buffer. In addition, encoder 100 can store the filter information of the current picture in reference filter information storage 133.

In addition, by performing the above operation, encoder 100 can manage a reference picture and the filter information in association with each other in frame memory 122 and reference filter information storage 133. It is to be noted that the filter information set associated with the reference picture may be managed using a reference picture index for specifying the reference picture.

Figure 12B:
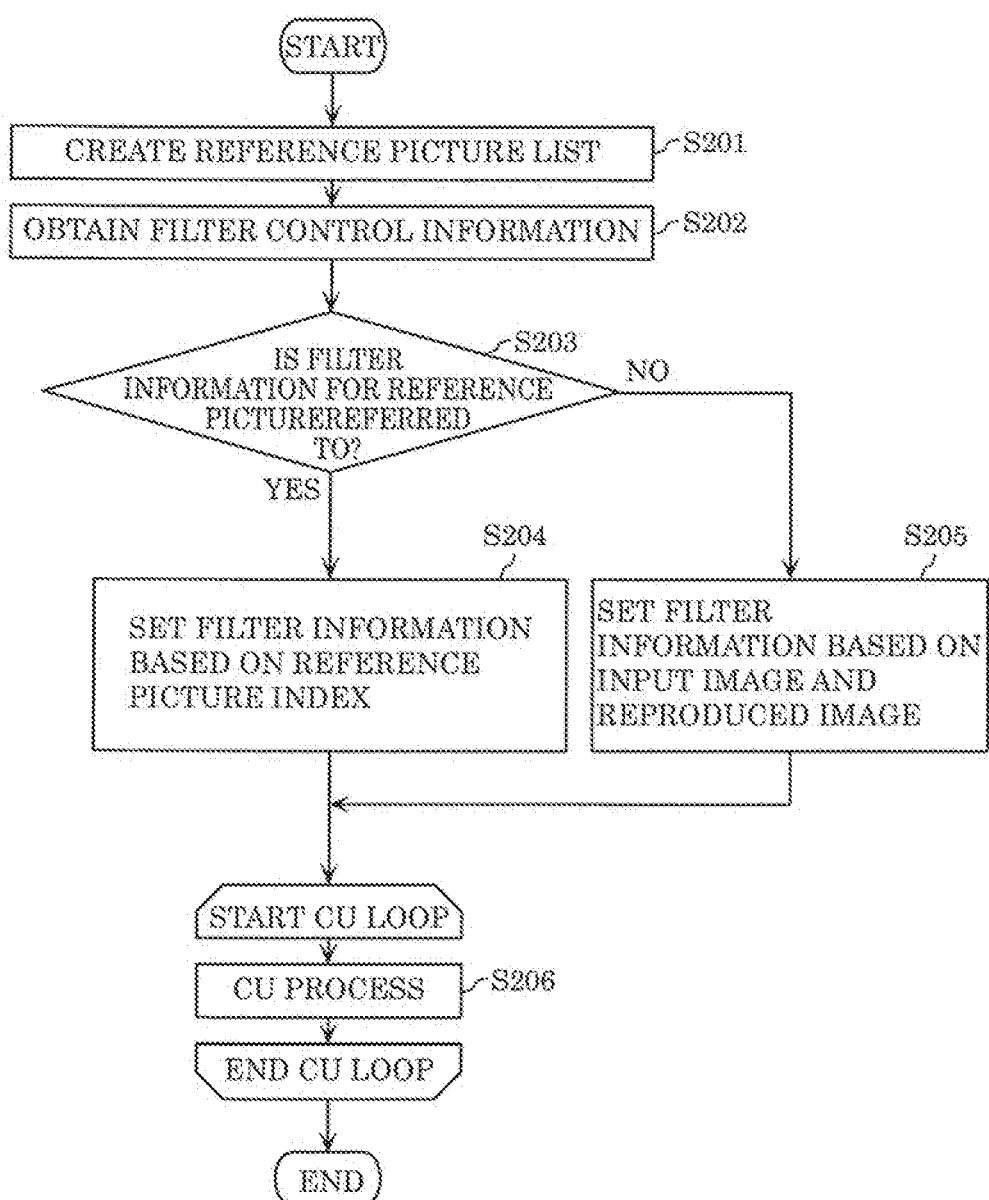
FIG. 12B is a flow chart indicating a first specific example of a setting procedure of filter information according to Embodiment 1.

FIG. 12B is a flow chart indicating a first specific example of a setting procedure of filter information according to Embodiment 1. Encoder 100 illustrated in FIG. 1 performs an operation indicated in FIG. 12B, for example.

First, encoder 100 creates a reference picture list (S201). More specifically, inter predictor 126 creates the reference picture list. For example, when the process for updating reference picture buffer (S104) is performed in FIG. 12A, a process for creating the reference picture list may be performed.

Next, encoder 100 obtains a filter control information (S202). For example, filter controller 131 obtains filter control information processed in filter control information process (S102) in FIG. 12A.

When the filter information set associated with the reference picture is used, the filter control information may include a reference picture index for specifying the filter information set in reference filter information storage 133.

In addition, when the filter information set associated with the reference picture is not used, the filter control information may include the filter information set to be used by an adaptive loop filter instead of the reference picture index. In other words, in this case, the filter control information may include filter coefficients included in the filter information set.

Next, encoder 100 determines whether to refer to the filter information of the reference picture (S203). More specifically, filter controller 131 determines whether to refer to the filter information set associated with the reference picture in the setting of the filter information set for the current picture.

When referring to the filter information of the reference picture (Yes in S203), encoder 100 sets the filter information based on the reference picture index (S204). For example, filter controller 131 specifies the filter information set associated with the reference picture specified by the reference picture index included in the filter control information from among the plurality of filter information sets in reference filter information storage 133. Filter controller 131 then stores the specified filter information set in current filter information storage 132.

In addition, when not referring to the filter information of the reference picture (No in S203), encoder 100 sets filter information based on the input image and the reproduced image (S205). In other words, encoder 100 stores the filter information generated based on the input image and the reproduced image in current filter information storage 132. For example, the filter control information includes the filter information set generated based on the input image and the reproduced image. Filter controller 131 stores the filter information set included in the filter control information in current filter information storage 132.

Subsequently, the processing loop for the CU is performed (S206). In other words, encoder 100 may perform a coding process for each CU. At that time, encoder 100 applies an adaptive loop filter. More specifically, adaptive filter 134 applies an adaptive loop filter using the filter information which has been set.

By performing the above operation, encoder 100 can store the filter information for the current picture in current filter information storage 132 according to the filter control information.

It is to be noted that encoder 100 may generate a reproduced image by partially performing the encoding process of each CU before generating filter control information. In this way, encoder 100 is capable of appropriately generating the filter information set based on the input image and the reproduced image, and appropriately generating the filter control information including the filter information set based on the input image and the reproduced image.

Figure 13A:
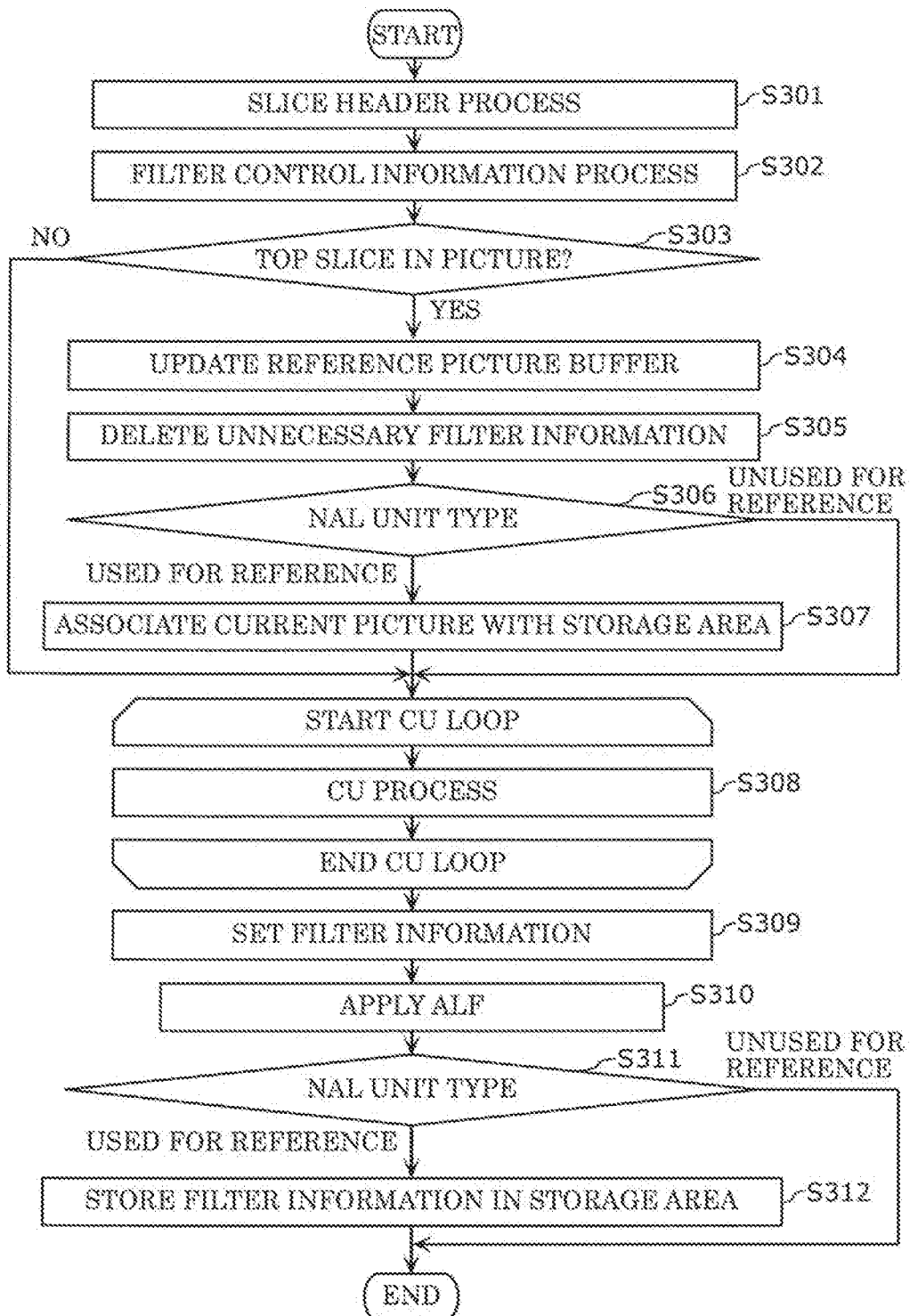
FIG. 13A is a flow chart indicating a second specific example of a management procedure of filter information according to Embodiment 1.

FIG. 13A is a flow chart indicating a second specific example of a management procedure of filter information according to Embodiment 1. Encoder 100 illustrated in FIG. 1 may perform an operation indicated in FIG. 13A.

In this example, first, encoder 100 performs the slice header process and the filter control information process (S301 and S302) as in the processes (S101 and S102) indicated in FIG. 12A. Encoder 100 then determines whether a current slice is the top slice in a picture as in the process (S103) indicated in FIG. 12A (S303).

In the opposite case where the current slice is the top slice in the picture (Yes in S303), encoder 100 updates a reference picture buffer, as in the case of the process (S104) indicated in FIG. 12A (S304). After the reference picture buffer is updated, encoder 100 deletes unnecessary filter information, as in the process (S105) indicated in FIG. 12A (S305).

Encoder 100 then determines whether the NAL unit type of the current slice indicates "used for reference" or "unused for reference" after deleting the unnecessary filter information, as in the case of the process (S106) indicated in FIG. 12A (S306).

In the other case of "used for reference" (USED FOR REFERENCE in S306), encoder 100 associates the current picture with a storage area, as in the case of the process (S107) indicated in FIG. 12A (S307).

When the current slice is not the top slice in the picture (No in S303), some of the processes are skipped, specifically, the processes are from the process for updating a reference picture buffer (S304) to the process for associating a current picture with a storage area (S307). In addition, when the NAL unit type of the current slice is "unused for reference" (UNUSED FOR REFERENCE in S306), the process for associating a current picture with a storage area (S307) is skipped.

Subsequently, the processing loop for the CU is performed (S308). In other words, encoder 100 performs an encoding process for each CU.

Next, encoder 100 sets filter information to be used by an adaptive loop filter (S309). More specifically, filter controller 131 stores the filter information set to be used by the adaptive loop filter in current filter information storage 132.

Next, encoder 100 applies an adaptive loop filter (S310). More specifically, adaptive filter 134 applies the adaptive loop filter to the current slice using the filter information set stored in current filter information storage 132.

Next, encoder 100 determines whether the NAL unit type of the current slice indicates "used for reference" or "unused for reference" (S311). For example, filter controller 131 determines whether the NAL unit type of the current slice is the type corresponding to the picture to be referred to, or the type corresponding to the picture not to be referred to.

In the case of "used for reference" (USED FOR REFERENCE in S311), encoder 100 then stores the filter information in the storage area (S312). More specifically, filter controller 131 stores the filter information set to be used by the adaptive loop filter for the current picture in the storage area associated with the current picture. In the case of "unused for reference" (UNUSED FOR REFERENCE in S311), the storage process (S312) is skipped.

By performing the above operation, encoder 100 can set the filter information after processing the CU, and apply the adaptive loop filter thereto. In this way, encoder 100 can appropriately generate the reproduced image before setting the filter information. Accordingly, encoder 100 can set the filter information based on the input image and the reproduced image.

It is to be noted that entropy encoder 110 may add the filter information which has been set based on the input image and the reproduced image to slice data instead of the slice header, and encodes the filter information. Entropy encoder 110 may then encode the slice header including the filter control information indicating that the filter information added to the slice data is to be used.

Figure 13B:
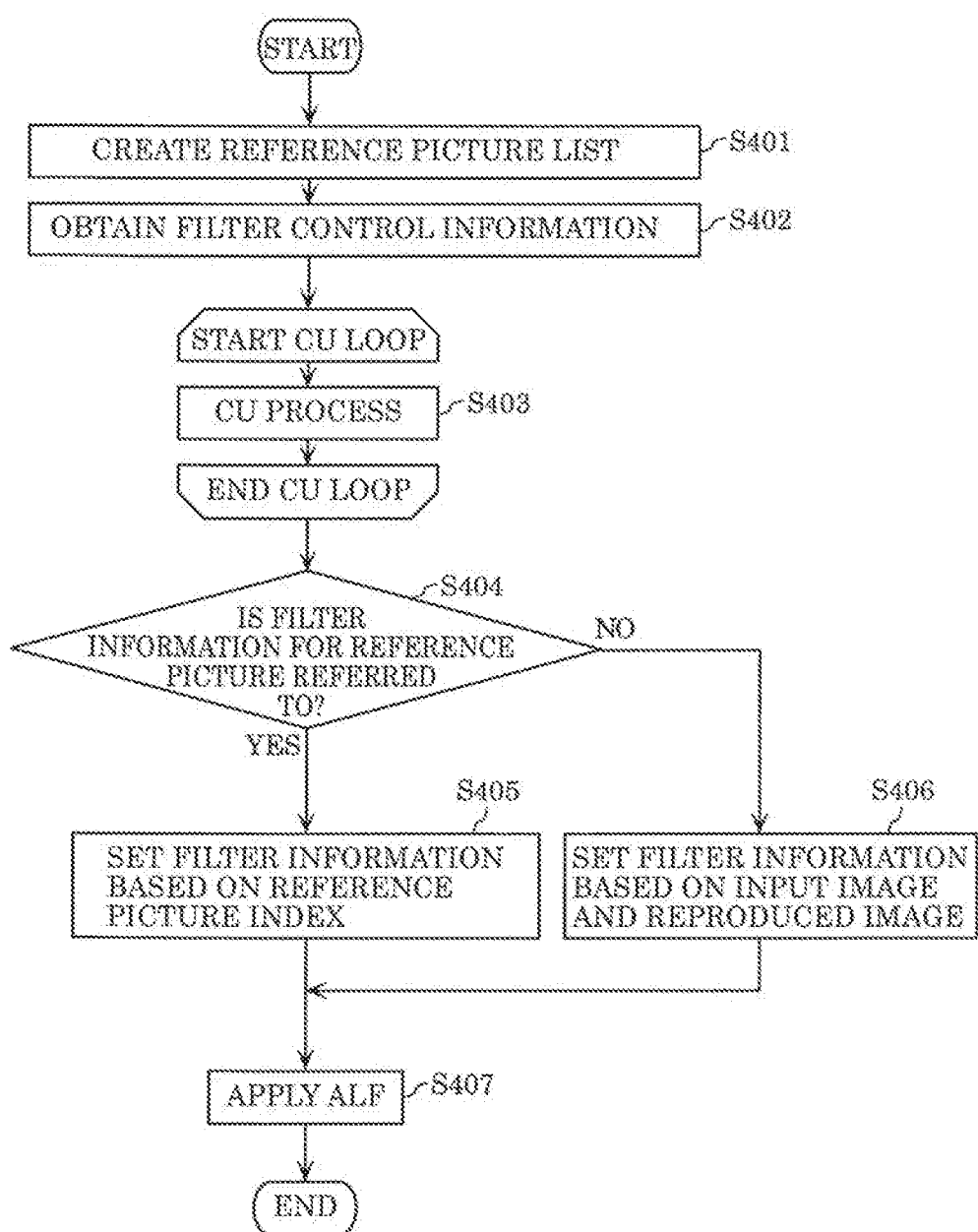
FIG. 13B is a flow chart indicating a second specific example of a setting procedure of filter information according to Embodiment 1.

FIG. 13B is a flow chart indicating a second specific example of a setting procedure of filter information according to Embodiment 1. Encoder 100 illustrated in FIG. 1 may perform an operation indicated in FIG. 13B.

In this example, first, encoder 100 creates a reference picture list as in the process (S201) indicated in FIG. 12B (S401). Encoder 100 then obtains filter control information as in the process (S202) indicated in FIG. 12B (S402).

The processing loop for the CU is then performed (S403). In other words, encoder 100 performs an encoding process for each CU.

Subsequently, encoder 100 determines whether to refer to the filter information of the reference picture as in the process (S203) indicated in FIG. 12B (S404).

When referring to the filter information of the reference picture (Yes in S404), encoder 100 sets filter information based on a reference picture index as in the process (S204) indicated in FIG. 12B (S405). When not referring to the filter information of the reference picture (No in S404), encoder 100 sets filter information based on an input image and a reproduced image, as in the process (S205) indicated in FIG. 12B (S406).

Encoder 100 then applies an adaptive loop filter (S407). More specifically, adaptive filter 134 applies an adaptive loop filter using the filter information which has been set.

FIG. 14A is a conceptual diagram illustrating a first specific example of a reference restriction of filter information according to Embodiment 1. In FIG. 14A, "USED FOR REFERENCE" indicates that reference is allowed, and "UNUSED FOR REFERENCE" indicates that reference is prohibited. In addition, pictures p0 to p8 illustrated in FIG. 14A are to be encoded in the order of p0, p1, p2, p3, p4, p5, p6, p7, and p8.

In addition, each of pictures p0 to p8 is assigned with a temporal ID indicating a hierarchical layer in temporal scalability. More specifically, pictures p0 and p1 are assigned with 0 as a temporal ID. In addition, picture p2 is assigned with 1 as a temporal ID. In addition, pictures p3 and p6 are assigned with 2 as a temporal ID. In addition, pictures p4, p5, p7, and p8 are assigned with 3 as a temporal ID.

FIG. 14A indicates an example in which picture p6 is the current picture to be encoded. FIG. 14A indicates filter information which is allowed to be referred to and filter information which is prohibited to be referred to in the setting of filter information for each slice of picture p6.

When picture p6 is the current picture to be encoded, pictures p0 to p5 are encoded pictures. The temporal ID of each of pictures p4 and p5 among pictures p0 to p5 is larger than the temporal ID of picture p6. Accordingly, reference to pictures p4 and p5 are prohibited in the encoding of picture p6. According to this, reference to the filter information of each of pictures p4 and p5 may be prohibited in the setting of the filter information of picture p6.

In addition, when picture p6 is a TSA picture, reference to picture p3 having a temporal ID which is the same as the temporal ID of picture p6 is prohibited in the encoding of picture p6. According to this, reference to the filter information of picture p3 may be prohibited in the setting of the filter information of picture p6.

Accordingly, in the setting of the filter information of picture p6, reference to the filter information of each of pictures p0 to p2 may be allowed among pictures p0 to p5, and reference to the filter information of each of pictures p3 to p5 may be prohibited among pictures p0 to p5.

Figure 14B:
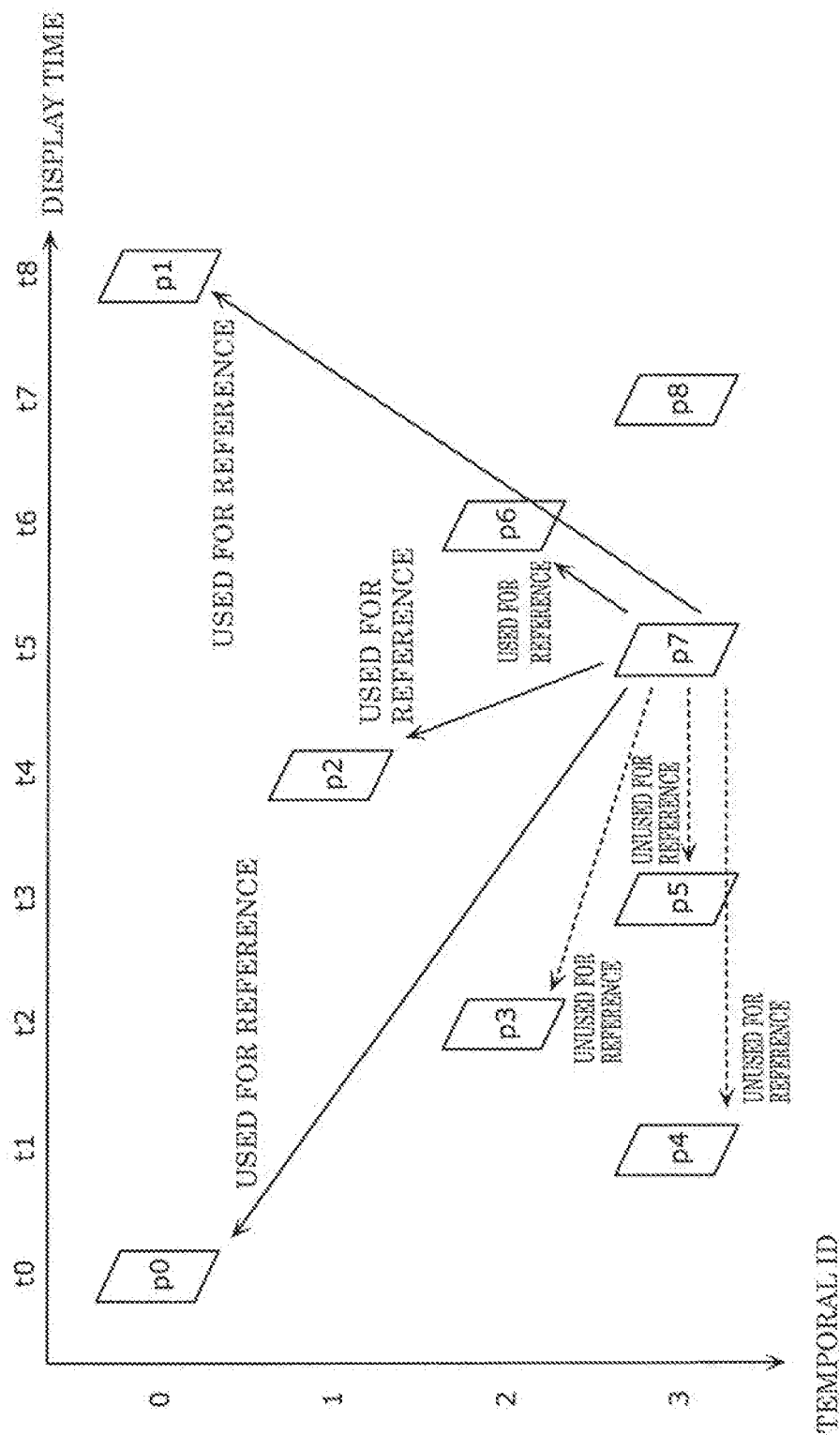
FIG. 14B is a conceptual diagram illustrating a second specific example of a reference restriction of filter information according to Embodiment 1.

FIG. 14B is a conceptual diagram illustrating a second specific example of a reference restriction of filter information according to Embodiment 1. In FIG. 14B, "USED FOR REFERENCE" indicates that reference is allowed, and "UNUSED FOR REFERENCE" indicates that reference is prohibited, as in FIG. 14A. In addition, FIG. 14B illustrates pictures p0 to p8 as in FIG. 14A. The coding order of pictures p0 to p8 and the temporal ID assigned to each of pictures p0 to p8 in FIG. 14B are the same as in the example in FIG. 14A.

FIG. 14B indicates an example in which picture p7 is the current picture to be encoded. FIG. 14B indicates filter information which is allowed to be referred to and filter information which is prohibited to be referred to in the setting of filter information for each slice of picture p7.

When picture p7 is the current picture to be encoded, pictures p0 to p6 are encoded pictures. Among pictures p0 to p6, a particular picture or a picture whose temporal ID is 0 may be allowed to be referred to. Here, the particular picture is a picture having a temporal ID smaller than the temporal ID of any of the pictures which follows the particular picture in coding order.

More specifically, the temporal ID of each of pictures p0 and p1 is 0. In addition, the temporal ID of picture p2 is smaller than any of the temporal IDs of pictures p3 to p7. In addition, the temporal ID of picture p6 is smaller than the temporal ID of picture p7. Accordingly, reference to the filter information of each of pictures p0 to p2 and p6 may be allowed in the setting of the filter information of picture p7.

In addition, the temporal ID of picture p3 is the same as the temporal ID of picture p6 among pictures p4 to p7. The temporal ID of picture p4 is larger than the temporal ID of picture p6 among pictures p5 to p7. The temporal ID of picture p5 is larger than the temporal ID of picture p6 among pictures p6 and p7. Accordingly, in the setting of the filter information of picture p7, reference to the filter information of each of pictures p3 to p5 may be prohibited.

Such a reference restriction as described above corresponds to a reference restriction in the case where each of pictures having a temporal ID other than a temporal ID of 0 is a TSA picture. In other words, such a reference restriction as described above corresponds to a reference restriction in the case where each of pictures p2 to p8 is a TSA picture.

In addition, the reference restriction illustrated in FIG. 14B also corresponds to a reference restriction in the case where picture p6 is a TSA picture. For example, when a TSA picture having a temporal ID which is smaller than or equal to the temporal ID of an encoded picture is present between a current picture and the encoded picture having a temporal ID larger than 0, reference to the filter information of the encoded picture may be prohibited. FIG. 14B also illustrates such a reference restriction.

Figure 15:
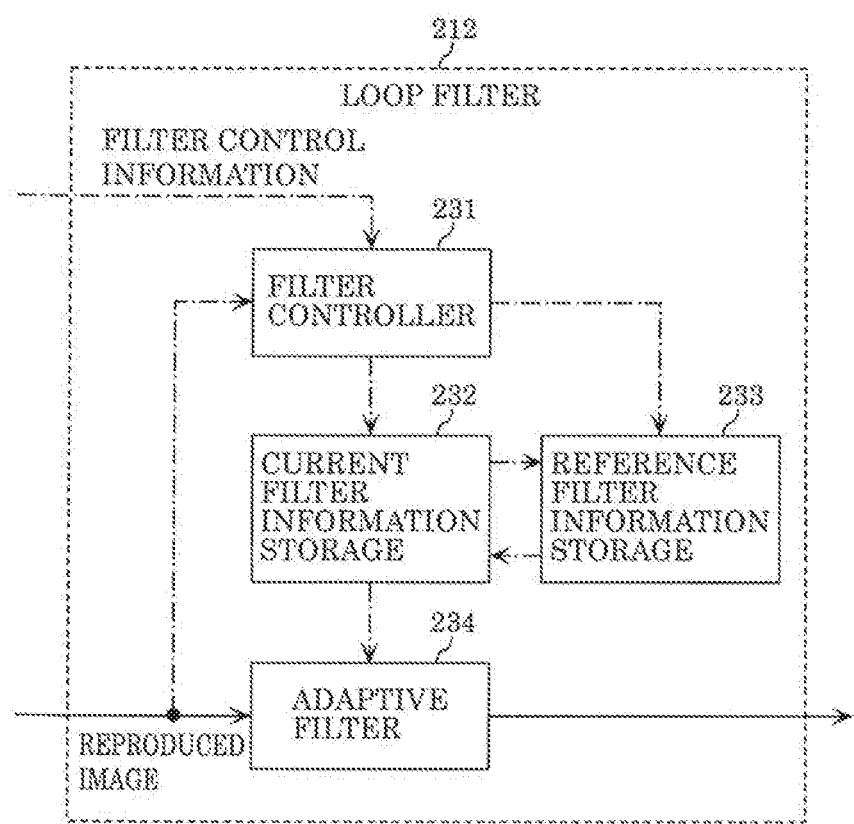
FIG. 15 is a block diagram illustrating a configuration of a loop filter of a decoder according to Embodiment 1.

FIG. 15 is a block diagram illustrating a configuration of loop filter 212 of decoder 200 according to Embodiment 1. The configuration of loop filter 212 of decoder 200 corresponds to the configuration of loop filter 120 of encoder 100. More specifically, loop filter 212 includes filter controller 231, current filter information storage 232, reference filter information storage 233, and adaptive filter 234.

Filter controller 231 is a circuit for processing filter information. Current filter information storage 232 is memory for storing filter information which is used by an adaptive loop filter. Reference filter information storage 233 is memory for storing filter information which has been used by an adaptive loop filter. Adaptive filter 234 is a circuit for applying, for each block, an adaptive loop filter using filter information stored in current filter information storage 232.

The operation performed by loop filter 212 of decoder 200 corresponds to the operation performed by loop filter 120 of encoder 100. For example, filter controller 231 sets a filter information set to current filter information storage 232 with reference to filter information stored in reference filter information storage 233 at the top of a slice.

Adaptive filter 234 applies, for each block, an adaptive loop filter using filter information set in current filter information storage 232. For example, adaptive filter 234 selects, for each block, filter coefficients for approximating a reproduced image (reconstructed image) to an input image (original image) from plural kinds of filter coefficients included in the filter information set according to properties of the reproduced image. Adaptive filter 234 then applies, for each block, an adaptive loop filter using the filter coefficients selected.

There is a case in which the NAL unit type of a current slice corresponds to a picture which is allowed to be used as a reference picture in inter prediction. In this case, filter controller 231 stores, in reference filter information storage 233, the filter information set used by the adaptive loop filter for the picture including the current slice.

Filter controller 231 then stores, in reference filter information storage 233, a plurality of filter information sets used by adaptive loop filters for a plurality of pictures.

Filter controller 231 manages a plurality of reference pictures stored in a reference picture buffer that is frame memory 214, in association with a plurality of filter information sets stored in reference filter information storage 233. At that time, filter controller 231 manages each of the plurality of filter information sets, in association with the reference picture to which the adaptive loop filter is applied using the filter information set.

In addition, for example, there is a case in which a reference pictures is given a mark of "unused for reference". In this case, filter controller 231 provides the filter information set associated with the reference picture with the mark of "unused for reference" with the mark of "unused for reference". In other words, when the reference picture is deleted, filter controller 231 deletes the filter information set associated with the reference picture.

In addition, filter control information regarding the method for setting the filter information to current filter information storage 232 may be notified from encoder 100 to decoder 200. In addition, filter control information regarding the method for setting the filter information to current filter information storage 232 may be input to filter controller 231.

For example, the filter control information is information for specifying the filter information set to be used by the adaptive loop filter to be applied to the picture. More specifically, the filter control information may indicate the value of the reference picture index of the reference picture associated with the filter information set to be used by the adaptive loop filter to be applied to the picture. The filter information set may be specified from the plurality of filter information sets in reference filter information storage 233 using the value of the reference picture index of the reference picture.

Alternatively, the filter control information may indicate filter coefficients of the filter information set generated based on the input image (original image) and the reproduced image (reconstructed image) instead of the filter information set in reference filter information storage 233. In this way, the filter information set to be used by the adaptive loop filter to be applied to the picture may be specified.

In addition, filter controller 231 may restrict reference so that only the filter information set associated with a reference picture that satisfies a determined condition is referred to. More specifically, filter controller 231 may allow reference, for only the filter information set associated with the picture that satisfies a restriction condition regarding a TSA picture. The picture that satisfies the restriction condition regarding the TSA picture may be a picture having a temporal ID smaller than the temporal ID of the TSA picture.

For example, in the decoding of the TSA picture and the following pictures in decoding order, it is prohibited that a picture which precedes the TSA picture in decoding order and has a temporal ID larger than or equal to the temporal ID of the TSA picture is referred to. Reference to the filter information set associated with the picture may be prohibited.

In addition, the picture that satisfies the restriction condition regarding the TSA picture may be a reference picture having a temporal ID smaller than any of the temporal IDs of the TSA pictures between the current picture and the reference picture in decoding order.

For example, when a TSA picture having a temporal ID smaller than or equal to the temporal ID of one reference picture is present between the current picture and the one reference picture in decoding order, reference to the one reference picture is prohibited. Accordingly, reference to the filter information set associated with the reference picture may be prohibited.

As for encoder 100, the operations explained with reference to FIGS. 12A to 14B can be explained as operations performed by decoder 200 by replacing "encoding" with "decoding".

For example, decoder 200 performs an operation corresponding to the operation indicated in FIG. 12A. The operation performed by decoder 200 correspondingly to the operation indicated in FIG. 12A can be explained based on FIG. 12A.

First, decoder 200 performs a slice header process (S101). For example, entropy decoder 202 analyzes and decodes the slice header of a current slice to be decoded.

Next, decoder 200 performs a filter control information process (S102). For example, entropy decoder 202 analyzes and decodes filter control information. Filter controller 231 then obtains the decoded filter control information. The filter control information may be included in the slice header. Accordingly, the filter control information process (S102) may be included in the slice header process (S101).

Next, decoder 200 determines whether the current slice is the top slice in a picture (S103). For example, entropy decoder 202 determines whether the current slice is the top slice in the picture. Any other constituent element may perform such a determination, or each of the constituent elements may perform the determination.

In the case where the current slice is not the top slice (No in S103), a processing loop for a Coding Unit (CU) is performed (S109). In other words, decoder 200 performs a decoding process for each CU. At that time, decoder 200 applies an adaptive loop filter.

In the opposite case where the current slice is the top slice in the picture (Yes in S103), decoder 200 updates a reference picture buffer (S104). More specifically, inter predictor 218 updates information of one or more reference pictures stored in frame memory 214. For example, inter predictor 218 provides an unnecessary reference picture which is not referred to with a mark of "unused for reference". In this way, the unnecessary reference picture which is not referred to is substantially deleted.

After the reference picture buffer is updated, decoder 200 deletes unnecessary filter information (S105). For example, filter controller 231 provides the filter information set associated with the reference picture with the mark of "unused for reference" with the mark of "unused for reference". In this way, the unnecessary filter information set which is not referred to is substantially deleted.

In other words, when the reference picture is deleted from the reference picture buffer, the filter information set associated with the reference picture is deleted.

Decoder 200 then determines whether the NAL unit type of the current slice indicates "used for reference" or "unused for reference" after deleting the unnecessary filter information (S106). For example, filter controller 231 determines whether the NAL unit type of the current slice is the type corresponding to the picture to be referred to, or the type corresponding to the picture not to be referred to.

In the case of "unused for reference" (UNUSED FOR REFERENCE in S106), the processing loop for the CU is performed (S109). In other words, decoder 200 performs a decoding process for each CU. At that time, decoder 200 applies an adaptive loop filter.

In the other case of "unused for reference" (USED FOR REFERENCE in S106), decoder 200 associates the current picture with a storage area (S107). For example, filter controller 231 associates the current picture including the current slice with the storage area in which the filter information set is stored in reference filter information storage 233.

Decoder 200 then stores the filter information in the storage area (S108). More specifically, filter controller 231 stores the filter information set to be used by the adaptive loop filter for the current picture in the storage area associated with the current picture.

Subsequently, the processing loop for the CU is performed (S109). In other words, decoder 200 performs a decoding process for each CU. At that time, decoder 200 applies an adaptive loop filter.

By performing the above operation, decoder 200 can update, at the top of the picture, the filter information in reference filter information storage 233 according to a state of a reference picture buffer. In addition, decoder 200 can store the filter information of the current picture in reference filter information storage 233.

In addition, by performing the above operation, decoder 200 can manage a reference picture and the filter information in association with each other in frame memory 214 and reference filter information storage 233. It is to be noted that the filter information set associated with the reference picture may be managed using a reference picture index for specifying the reference picture.

In addition, decoder 200 performs an operation corresponding to the operation indicated in FIG. 12B. The operation performed by decoder 200 correspondingly to the operation indicated in FIG. 12B can be explained based on FIG. 12B.

First, decoder 200 creates a reference picture list (S201). More specifically, inter predictor 218 creates the reference picture list. For example, when the process for updating a reference picture buffer (S104) is performed in FIG. 12A, a process for creating the reference picture list may be performed.

Next, decoder 200 obtains a filter control information (S202). For example, filter controller 231 obtains filter control information processed in filter control information process (S102) in FIG. 12A.

When the filter information set associated with the reference picture is used, the filter control information may include a reference picture index for specifying the filter information set in reference filter information storage 233.

In addition, when the filter information set associated with the reference picture is not used, the filter control information may include the filter information set to be used by an adaptive loop filter instead of the reference picture index. In other words, in this case, the filter control information may include filter coefficients included in the filter information set.

Next, decoder 200 determines whether to refer to the filter information of the reference picture (S203). More specifically, filter controller 231 determines whether to refer to the filter information set associated with the reference picture in the setting of the filter information set for the current picture.

When referring to the filter information of the reference picture (Yes in S203), decoder 200 sets the filter information based on the reference picture index (S204). For example, filter controller 231 specifies the filter information set associated with the reference picture specified by the reference picture index included in the filter control information from among the plurality of filter information sets in reference filter information storage 233. Filter controller 231 then stores the specified filter information set in current filter information storage 232.

In addition, when not referring to the filter information of the reference picture (No in S203), decoder 200 sets filter information based on the input image and the reproduced image (S205). In other words, decoder 200 stores the filter information set generated based on the input image and the reproduced image in current filter information storage 232. For example, the filter control information includes the filter information set generated based on the input image and the reproduced image. Filter controller 231 stores the filter information set included in the filter control information in current filter information storage 232.

Subsequently, the processing loop for the CU is performed (S206). In other words, decoder 200 performs a decoding process for each CU. At that time, decoder 200 applies an adaptive loop filter. More specifically, adaptive filter 234 applies an adaptive loop filter using the filter information which has been set.

By performing the above operation, decoder 200 can store the filter information for the current picture in current filter information storage 232 according to the filter control information.

In addition, decoder 200 may perform an operation corresponding to the operation indicated in FIG. 13A. The operation which can be performed by decoder 200 correspondingly to the operation indicated in FIG. 13A can be explained based on FIG. 13A.

First, decoder 200 performs the slice header process and the filter control information process (S301 and S302) as in the processes (S101 and S102) indicated in FIG. 12A. Decoder 200 then determines whether a current slice is the top slice in a picture as in the process (S103) indicated in FIG. 12A (S303).

In the opposite case where the current slice is the top slice in the picture (Yes in S303), decoder 200 updates a reference picture buffer, as in the case of the process (S104) indicated in FIG. 12A (S304). After the reference picture buffer is updated, decoder 200 deletes unnecessary filter information, as in the process (S105) indicated in FIG. 12A (S305).

Decoder 200 then determines whether the NAL unit type of the current slice indicates "used for reference" or "unused for reference" after deleting the unnecessary filter information, as in the case of the process (S106) indicated in FIG. 12A (S306).

In the other case of "used for reference" (USED FOR REFERENCE in S306), decoder 200 associates the current picture with a storage area, as in the case of the process (S107) indicated in FIG. 12A (S307).

When the current slice is not the top slice in the picture (No in S303), some of the processes are skipped, specifically, the processes are from the process for updating the reference picture buffer (S304) to the process for associating the current picture with the storage area (S307). In addition, when the NAL unit type of the current slice is "unused for reference" (UNUSED FOR REFERENCE in S306), the process for associating a current picture with a storage area (S307) is skipped.

Subsequently, the processing loop for the CU is performed (S308). In other words, decoder 200 performs a decoding process for each CU.

Next, decoder 200 sets filter information to be used by an adaptive loop filter (S309). More specifically, filter controller 231 stores the filter information set to be used by the adaptive loop filter in current filter information storage 232.

Next, decoder 200 applies an adaptive loop filter (S310). More specifically, adaptive filter 234 applies the adaptive loop filter to the current slice using the filter information set stored in current filter information storage 232.

Next, decoder 200 determines whether the NAL unit type of the current slice is "used for reference" or "unused for reference" (S311). For example, filter controller 231 determines whether the NAL unit type of the current slice is the type corresponding to the picture to be referred to, or the type corresponding to the picture not to be referred to.

In the case of "used for reference" (USED FOR REFERENCE in S311), decoder 200 then stores the filter information in the storage area (S312). More specifically, filter controller 231 stores the filter information set to be used by the adaptive loop filter for the current picture in the storage area associated with the current picture. In the case of "unused for reference" (UNUSED FOR REFERENCE in S311), the storage process (S312) is skipped.

It is to be noted that the filter information which has been set based on an input image and a reproduced image may be added to slice data instead of the slice header. Filter control information may indicate that the filter information added to the slice data is to be used. Entropy decoder 202 may decode such filter information and filter control information.

In addition, decoder 200 may perform an operation corresponding to the operation indicated in FIG. 13B. The operation performed by decoder 200 correspondingly to the operation indicated in FIG. 13B can be explained based on FIG. 13B.

First, decoder 200 creates a reference picture list as in the process (S201) indicated in FIG. 12B (S401). Decoder 200 then obtains filter control information as in the process (S202) indicated in FIG. 12B (S402).

Subsequently, the processing loop for the CU is performed (S403). In other words, decoder 200 performs a decoding process for each CU.

Subsequently, decoder 200 determines whether to refer to the filter information of the reference picture as in the process (S203) indicated in FIG. 12B (S404).

When referring to the filter information of the reference picture (Yes in S404), decoder 200 sets filter information based on a reference picture index as in the process (S204) indicated in FIG. 12B (S405). When not referring to the filter information of the reference picture (No in S404), decoder 200 sets filter information based on an input image and a reproduced image, as in the process (S205) indicated in FIG. 12B (S406).

Decoder 200 then applies an adaptive loop filter (S407). More specifically, adaptive filter 234 applies an adaptive loop filter using the filter information which has been set.

The explanations related to FIGS. 14A and 14B can also be applied as explanations related to decoder 200 by replacing "encoding" with "decoding".

[Variation of Filter Information Processing Method]

Next, a variation for the filter information processing method is described. In other words, as for filter information, a processing method different from the processing method indicated in FIGS. 12A to 14B is described. The basic constituent elements in the variation are the same as the constituent elements illustrated in FIGS. 1, 10, 11, and 15, and thus descriptions thereof are not repeated.

In this variation, filter control information is notified from encoder 100 to decoder 200 by means of a parameter set associated with a slice header. More specifically, the filter control information is included in the parameter set notified from encoder 100 to decoder 200. Here, the parameter set may be a Picture Parameter Set (PPS).

Figure 16:
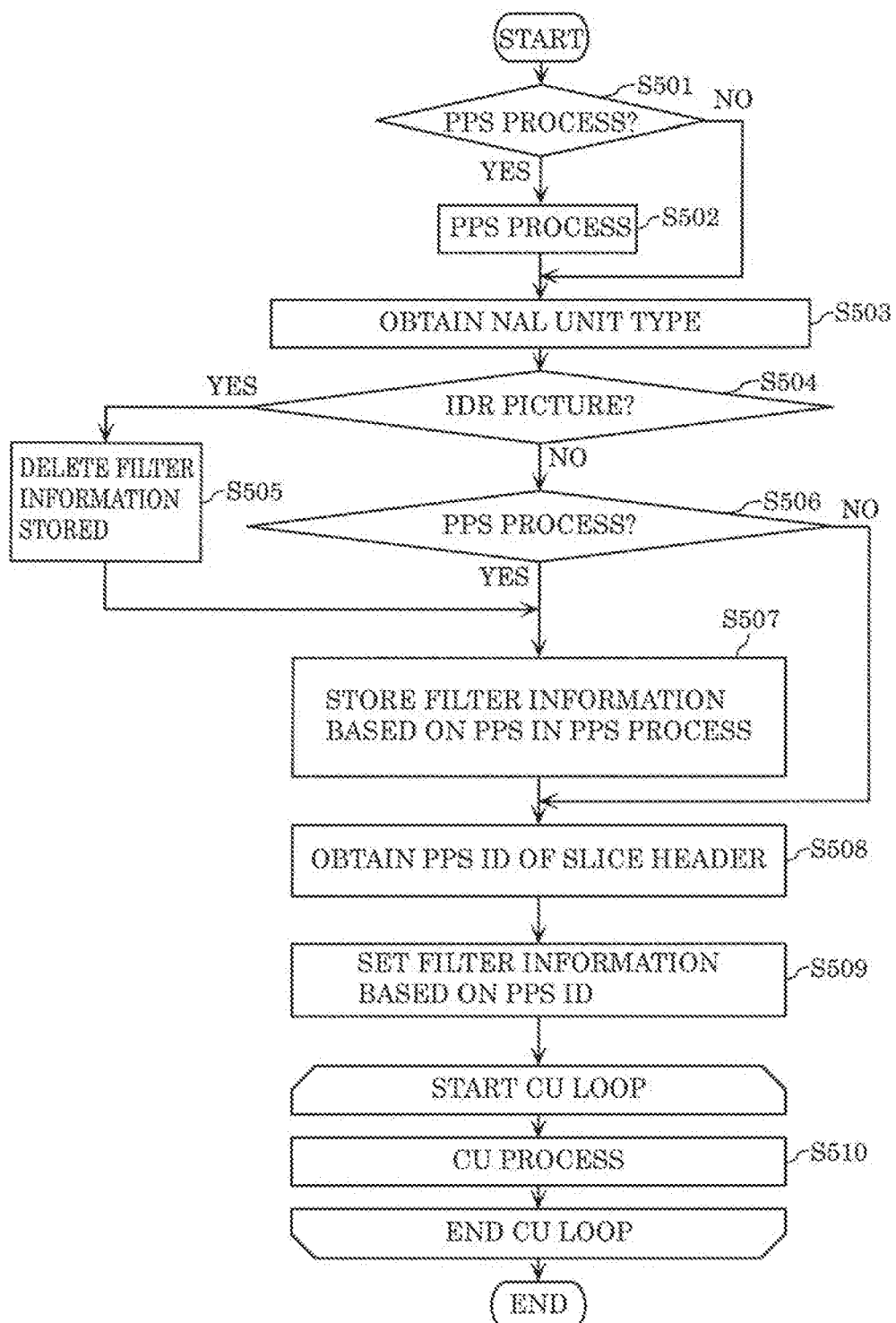
FIG. 16 is a flow chart indicating a first specific example of a processing procedure of filter information according to a variation.

FIG. 16 is a flow chart indicating a first specific example of a processing procedure of filter information according to this variation. Encoder 100 illustrated in FIG. 1 performs an operation indicated in FIG. 16, for example.

First, encoder 100 determines whether to perform a PPS process (S501). More specifically, the PPS process may correspond to the process for notifying the PPS from encoder 100 to decoder 200.

For example, entropy encoder 110 determines whether to encode the PPS. Entropy encoder 110 may determine whether to encode the PPS according to the coding order, display order, the type, etc. of a current picture to be encoded. More specifically, entropy encoder 110 may determine to encode the PPS, when the current picture is an Instantaneous Decoder Refresh (IDR) picture.

Encoder 100 performs the PPS process when determining to perform the PPS process (Yes in S501) (S502). For example, entropy encoder 110 encodes the PPS in the case of determining to encode the PPS. In addition, for example, the PPS includes filter control information. In addition, for example, the filter control information includes a filter information set. Encoder 100 skips a PPS process in the other case of determining not to perform any PPS process (No in S501).

Next, encoder 100 obtains a NAL unit type (S503). For example, entropy encoder 110 obtains the NAL unit type of the current picture. More specifically, entropy encoder 110 obtains the NAL unit type of a current slice to be encoded in the current picture. The NAL unit type of the current slice in the current picture corresponds to the type of the current picture.

Next, encoder 100 determines whether the current picture is an IDR picture (S504). For example, filter controller 131 determines whether the current picture is an IDR picture according to the NAL unit type of the current picture.

When it is determined that the current picture is an IDR picture (Yes in S504), encoder 100 deletes filter information stored (S505). For example, filter controller 131 deletes a plurality of filter information sets stored in reference filter information storage 133.

When it is determined that the current picture is not an IDR picture (No in S504), encoder 100 determines whether the PPS process (S502) has been performed (S506). For example, filter controller 131 determines whether the PPS has been encoded according to the coding order, display order, the type, etc., of the current picture.

In the case where it is determined that the PPS process (S502) has been performed (Yes in S506), encoder 100 stores the filter information based on the PPS in the PPS process (S502) (S507). In the other case where it is determined that the PPS process (S502) has not been performed (No in S506), encoder 100 skips a filter information storing process (S507).

In addition, when it is determined that the current picture is an IDR picture (Yes in S504), it is assumed that the PPS process (S502) has been performed. For this reason, in this case, encoder 100 stores the filter information based on the PPS in the PPS process (S502) without making a determination as to whether the PPS process has been performed after deletion of the filter information.

For example, filter controller 131 identifies the filter information set based on the filter control information included in the PPS encoded in the PPS process (S502), and stores the identified filter information set in reference filter information storage 133. In addition, filter controller 131 manages the filter information set identified based on the filter control information included in the PPS in association with a picture parameter set ID (PPS ID). In other words, the filter information set is stored in association with the picture parameter set ID.

In addition, when a plurality of PPSs is processed, for each of the plurality of PPSs, the filter information set corresponding to the PPS is identified and stored based on the filter control information of the PPS. In this way, for example, the plurality of filter information sets corresponding respectively to the plurality of PPSs inserted consecutively is identified and stored.

Next, encoder 100 obtains the picture parameter set ID of a slice header (S508). In other words, filter controller 131 obtains the picture parameter set ID included in the slice header of the current slice.

Next, encoder 100 sets filter information based on the picture parameter set ID (S509). For example, filter controller 131 selects the filter information set associated with the picture parameter set ID of the slice header, from among the plurality of filter information sets stored in reference filter information storage 133. Filter controller 131 then stores the selected filter information set in current filter information storage 132, thereby setting the filter information set.

Subsequently, the processing loop for the CU is performed (S510). In other words, encoder 100 performs an encoding process for each CU. At that time, encoder 100 applies an adaptive loop filter.

By performing the above operation, encoder 100 is capable of storing the filter information set based on the filter control information of the PPS in reference filter information storage 133. In addition, encoder 100 is capable of identifying the filter information set based on the picture parameter set ID of the slice header, from the plurality of filter information sets in reference filter information storage 133. Encoder 100 is capable of setting the identified filter information set in current filter information storage 132.

Figure 17:
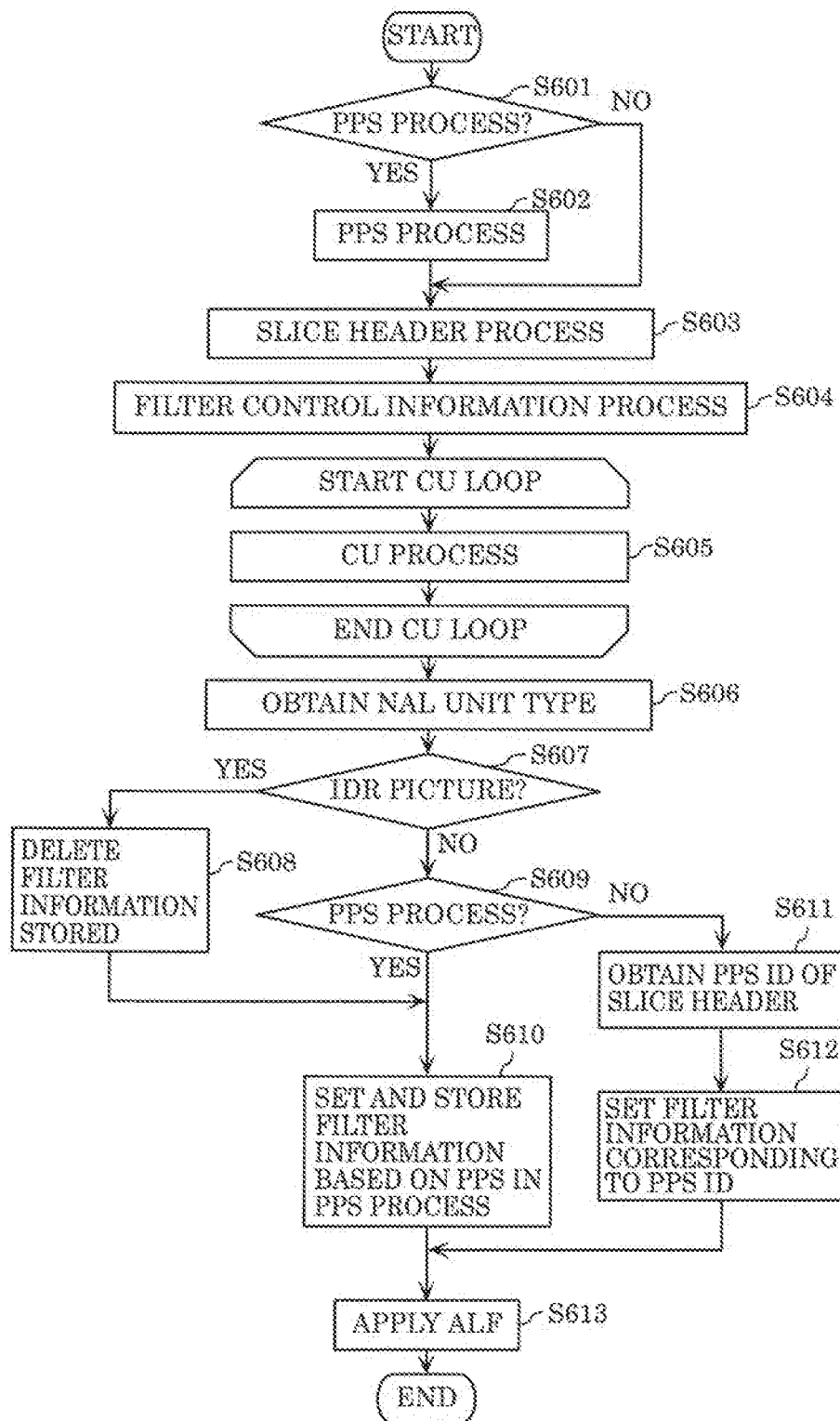
FIG. 17 is a flow chart indicating a second specific example of a processing procedure of filter information according to a variation.

FIG. 17 is a flow chart indicating a second specific example of a processing procedure of filter information according to this variation. Encoder 100 illustrated in FIG. 1 may perform an operation indicated in FIG. 17.

In this example, first, encoder 100 determines whether to perform a PPS process as in the process (S501) indicated in FIG. 16 (S601). Encoder 100 performs the PPS process when determining to perform the PPS process (Yes in S601) as in the process (S502) indicated in FIG. 16 (S602). Encoder 100 skips a PPS process in the other case of determining not to perform any PPS process (No in S601).

First, encoder 100 performs a slice header process (S603). For example, entropy encoder 110 generates and encodes the slice header of a current slice to be encoded.

Next, encoder 100 performs a filter control information process (S604). For example, filter controller 131 generates and outputs filter control information. In addition, entropy encoder 110 encodes the filter control information output from filter controller 131.

The filter control information may be included in a PPS. Accordingly, the filter control information process (S604) may be included in the PPS process (S602). In addition, in the slice header process (S603), the slice header including the picture parameter set ID of the PPS including the filter control information corresponding to the current slice may be generated and encoded.

Subsequently, the processing loop for the CU is performed (S605). In other words, encoder 100 performs an encoding process for each CU.

Next, encoder 100 obtains a NAL unit type as in the process (S503) indicated in FIG. 16 (S606). Next, encoder 100 determines whether the current picture is an IDR picture as in the process (S504) indicated in FIG. 16 (S607).

When it is determined that the current picture is an IDR picture (Yes in S607), encoder 100 deletes filter information stored as in the process (S505) indicated in FIG. 16 (S608).

When it is determined that the current picture is not an IDR picture (No in S504), encoder 100 determines whether the PPS process (S602) has been performed, as in the process (S506) indicated in FIG. 16 (S609).

When it is determined that the PPS process (S602) has been performed (Yes in S609), encoder 100 sets and stores the filter information based on the PPS in the PPS process (S602) (S610).

In addition, when it is determined that the current picture is an IDR picture (Yes in S607), it is assumed that the PPS process (S602) has been performed. For this reason, in this case, encoder 100 sets and stores the filter information based on the PPS in the PPS process (S602) without making a determination as to whether the PPS process has been performed after deletion of the filter information (S610).

For example, filter controller 131 identifies the filter information set based on the filter control information included in the PPS encoded in the PPS process (S602). Filter controller 131 then stores the specified filter information set in current filter information storage 132 and reference filter information storage 133.

In addition, filter controller 131 manages, in reference filter information storage 133, the filter information set identified based on the filter control information included in the PPS in association with a picture parameter set ID. In other words, the filter information set is stored in association with the picture parameter set ID.

In addition, when a plurality of PPSs is processed, for each of the plurality of PPSs, the filter information set corresponding to the PPS is identified and stored based on the filter control information of the PPS. In this way, for example, the plurality of filter information sets corresponding respectively to the plurality of PPSs inserted consecutively is identified and stored.

When it is determined that the PPS process (S602) has not been performed (No in S609), encoder 100 obtains the picture parameter set ID of the slice header as in the process (S508) indicated in FIG. 16 (S611). Next, encoder 100 sets filter information based on the picture parameter set ID as in the process (S509) indicated in FIG. 16 (S612).

Encoder 100 then applies an adaptive loop filter (S613). More specifically, adaptive filter 134 applies the adaptive loop filter to the current slice using the filter information set stored in current filter information storage 132.

By performing the above operation, encoder 100 can set the filter information after processing the CU, and apply the adaptive loop filter thereto. In this way, encoder 100 can appropriately generate the reproduced image before setting the filter information. Accordingly, encoder 100 can set the filter information based on the input image and the reproduced image.

It is to be noted that entropy encoder 110 may add the filter information which has been set based on the input image and the reproduced image to slice data instead of the PPS, and encodes the filter information. Entropy encoder 110 may then encode the PPS including the filter control information indicating that the filter information added to the slice data is to be used.

As for encoder 100, the operations explained with reference to FIGS. 16 and 17 can be explained as operations performed by decoder 200 by replacing "encoding" with "decoding".

For example, decoder 200 performs an operation corresponding to the operation indicated in FIG. 16. The operation performed by decoder 200 correspondingly to the operation indicated in FIG. 16 can be explained based on FIG. 16.

First, decoder 200 determines whether to perform a PPS process (S501). For example, entropy decoder 202 determines whether to decode a PPS. Entropy decoder 202 may determine whether to decode the PPS according to an encoded stream. More specifically, entropy decoder 202 may determine to decode the PPS when the PPS has been encoded in the encoded stream.

Decoder 200 performs the PPS process when determining to perform the PPS process (Yes in S501) (S502). For example, entropy decoder 202 decodes the PPS when determining to decode the PPS. Decoder 200 skips a PPS process in the other case of determining not to perform any PPS process (No in S501).

Next, decoder 200 obtains a NAL unit type (S503). For example, entropy decoder 202 obtains the NAL unit type of a current picture to be decoded. More specifically, entropy decoder 202 obtains the NAL unit type of a current slice to be decoded on the current picture. The NAL unit type of the current slice in the current picture corresponds to the type of the current picture.

Next, decoder 200 determines whether the current picture is an IDR picture (S504). For example, filter controller 231 determines whether the current picture is an IDR picture according to the NAL unit type of the current picture.

When it is determined that the current picture is an IDR picture (Yes in S504), decoder 200 deletes filter information stored (S505). For example, filter controller 231 deletes a plurality of filter information sets stored in reference filter information storage 233.

When it is determined that the current picture is not an IDR picture (No in S504), decoder 200 determines whether the PPS process (S502) has been performed (S506). For example, filter controller 231 determines whether a PPS has been decoded.

When it is determined that the PPS process (S502) has been performed (Yes in S506), decoder 200 stores the filter information based on the PPS in the PPS process (S502) (S507). In the other case where it is determined that the PPS process (S502) has not been performed (No in S506), decoder 200 skips a filter information storing process (S507).

In addition, when it is determined that the current picture is an IDR picture (Yes in S504), it is assumed that the PPS process (S502) has been performed. For this reason, in this case, decoder 200 stores the filter information based on the PPS in the PPS process (S502) without making a determination as to whether the PPS process has been performed after deletion of the filter information.

For example, filter controller 231 identifies the filter information set based on the filter control information included in the PPS decoded in the PPS process (S502), and stores the identified filter information set in reference filter information storage 233. In addition, filter controller 231 manages the filter information set identified based on the filter control information included in the PPS in association with a picture parameter set ID of the PPS. In other words, the filter information set is stored in association with the picture parameter set ID.

In addition, when a plurality of PPSs is processed, for each of the plurality of PPSs, the filter information set corresponding to the PPS is identified and stored based on the filter control information of the PPS. In this way, for example, the plurality of filter information sets corresponding respectively to the plurality of PPSs inserted consecutively is identified and stored.

Next, decoder 200 obtains the picture parameter set ID of the slice header (S508). In other words, filter controller 231 obtains the picture parameter set ID included in the slice header of the current slice to be decoded.

Next, decoder 200 sets filter information based on the picture parameter set ID (S509). For example, filter controller 231 selects the filter information set associated with the picture parameter set ID of the slice header, from among the plurality of filter information sets stored in reference filter information storage 233. Filter controller 231 then stores the selected filter information set in current filter information storage 232, thereby setting the filter information set.

Subsequently, the processing loop for the CU is performed (S510). In other words, decoder 200 performs a decoding process for each CU. At that time, decoder 200 applies an adaptive loop filter.

By performing the above operation, decoder 200 is capable of storing the filter information set based on the filter control information of the PPS in reference filter information storage 233. In addition, decoder 200 is capable of identifying the filter information set based on the picture parameter set ID of the slice header, from the plurality of filter information sets in reference filter information storage 233. Decoder 200 is capable of setting the identified filter information set in current filter information storage 232.

In addition, decoder 200 may perform an operation corresponding to the operation indicated in FIG. 17. The operation performed by decoder 200 correspondingly to the operation indicated in FIG. 17 can be explained based on FIG. 17.

First, decoder 200 determines whether to perform a PPS process as in the process (S501) indicated in FIG. 16 (S601). Decoder 200 performs the PPS process when determining to perform the PPS process (Yes in S601) as in the process (S502) indicated in FIG. 16 (S602). Decoder 200 skips a PPS process in the other case of determining not to perform any PPS process (No in S601).

First, decoder 200 performs a slice header process (S603). For example, entropy decoder 202 analyzes and decodes the slice header of the current slice to be decoded.

Next, decoder 200 performs a filter control information process (S604). For example, entropy decoder 202 decodes filter control information, and filter controller 231 obtains the filter control information decoded.

The filter control information may be included in a PPS. Accordingly, the filter control information process (S604) may be included in the PPS process (S602). In addition, in the slice header process (S603), the slice header including the picture parameter set ID of the PPS including the filter control information corresponding to the current slice may be decoded.

Subsequently, the processing loop for the CU is performed (S605). In other words, decoder 200 performs a decoding process for each CU.

Next, decoder 200 obtains a NAL unit type as in the process (S503) indicated in FIG. 16 (S606). Next, decoder 200 determines whether the current picture is an IDR picture as in the process (S504) indicated in FIG. 16 (S607).

When it is determined that the current picture is an IDR picture (Yes in S607), decoder 200 deletes filter information stored, as in the process (S505) indicated in FIG. 16 (S608).

When it is determined that the current picture is not an IDR picture (No in S607), decoder 200 determines whether the PPS process (S602) has been performed (S609), as in the process (S506) indicated in FIG. 16 (S609).

When it is determined that the PPS process (S602) has been performed (Yes in S609), decoder 200 sets and stores the filter information based on the PPS in the PPS process (S602) (S610).

In addition, when it is determined that the current picture is an IDR picture (Yes in S607), it is assumed that the PPS process (S602) has been performed. For this reason, in this case, decoder 200 sets and stores the filter information based on the PPS in the PPS process (S602) without making a determination as to whether the PPS process has been performed after deletion of the filter information (S610).

For example, filter controller 231 identifies the filter information set based on the filter control information included in the PPS decoded in the PPS process (S602). Filter controller 231 then stores the specified filter information set in current filter information storage 232 and reference filter information storage 233.

In addition, filter controller 231 manages, in reference filter information storage 233, the filter information set identified based on the filter control information included in the PPS in association with a picture parameter set ID. In other words, the filter information set is stored in association with the picture parameter set ID.

In addition, when a plurality of PPSs is processed, for each of the plurality of PPSs, the filter information set corresponding to the PPS is identified and stored based on the filter control information of the PPS. In this way, for example, the plurality of filter information sets corresponding respectively to the plurality of PPSs inserted consecutively is identified and stored.

When it is determined that the PPS process (S602) has not been performed (No in S609), decoder 200 obtains the picture parameter set ID of the slice header as in the process (S508) indicated in FIG. 16 (S611). Next, decoder 200 sets filter information based on the picture parameter set ID as in the process (S509) indicated in FIG. 16 (S612).

Decoder 200 then applies an adaptive loop filter (S613). More specifically, adaptive filter 234 applies the adaptive loop filter to the current slice using the filter information set stored in current filter information storage 232.

By performing the above operation, decoder 200 can set the filter information after processing the CU, and apply the adaptive loop filter thereto. In this way, decoder 200 can appropriately generate the reproduced image before setting the filter information. Accordingly, decoder 200 can set the filter information based on the input image and the reproduced image.

It is to be noted that the filter information which has been set based on an input image and a reproduced image may be added to slice data instead of the PPS. Filter control information may indicate that the filter information added to the slice data is to be used. Entropy decoder 202 may decode such filter information and filter control information.

[PPS Notification]

For example, the PPS including filter control information is notified from encoder 100 to decoder 200. In other words, entropy encoder 110 of encoder 100 encodes the PPS including the filter control information, and entropy decoder 202 of decoder 200 decodes the PPS including the filter control information. In this way, the filter control information is shared between encoder 100 and decoder 200.

In addition, each of the plurality of pictures included in a video may be assigned with a temporal ID indicating a hierarchical layer regarding temporal scalability. Furthermore, also the PPS may be assigned with a temporal ID indicating a hierarchical layer regarding temporal scalability.

In addition, for example, the plurality of PPSs correspond respectively to the plurality of hierarchical layers regarding temporal scalability, and each of the plurality of PPSs may be the PPS for one or more pictures which belong to the hierarchical layer corresponding to the PPS. In other words, the plurality of PPSs may include the PPS for the one or more pictures each assigned with a corresponding one of temporal IDs assigned to the plurality of pictures.

Here, the PPS for the one or more pictures mean a common PPS which is applied to the one or more pictures. In addition, the PPS corresponding to the hierarchical layer means a PPS for the one or more pictures which belong to the hierarchical layer, that is, the PPS for the one or more pictures each assigned with the temporal ID indicating the hierarchical layer. In other words, here, since the PPS corresponds to the hierarchical layer, the PPS is the common PPS which is applied to the one or more pictures each assigned with the temporal ID indicating the hierarchical layer.

It is to be noted that the hierarchical layer corresponding to the PPS and the hierarchical layer indicating the temporal ID assigned to the PPS may be different from each other. These hierarchical layers can be defined independently of each other. In addition, the hierarchical layer corresponding to the PPS can also be referred to as a hierarchical layer associated with the PPS.

In addition, for example, a PPS and the hierarchical layer corresponding to the PPS are associated with each other by a picture parameter set ID included in the slice header of the slice in a picture which belongs to the hierarchical layer. Basically, the slice header of the slice of the picture includes the picture parameter set ID of the PPS corresponding to the hierarchical layer to which the picture belongs.

Hereinafter, a description is given of a plurality of specific examples regarding PPS notification in a variation of the filter information processing method.

Figure 18:
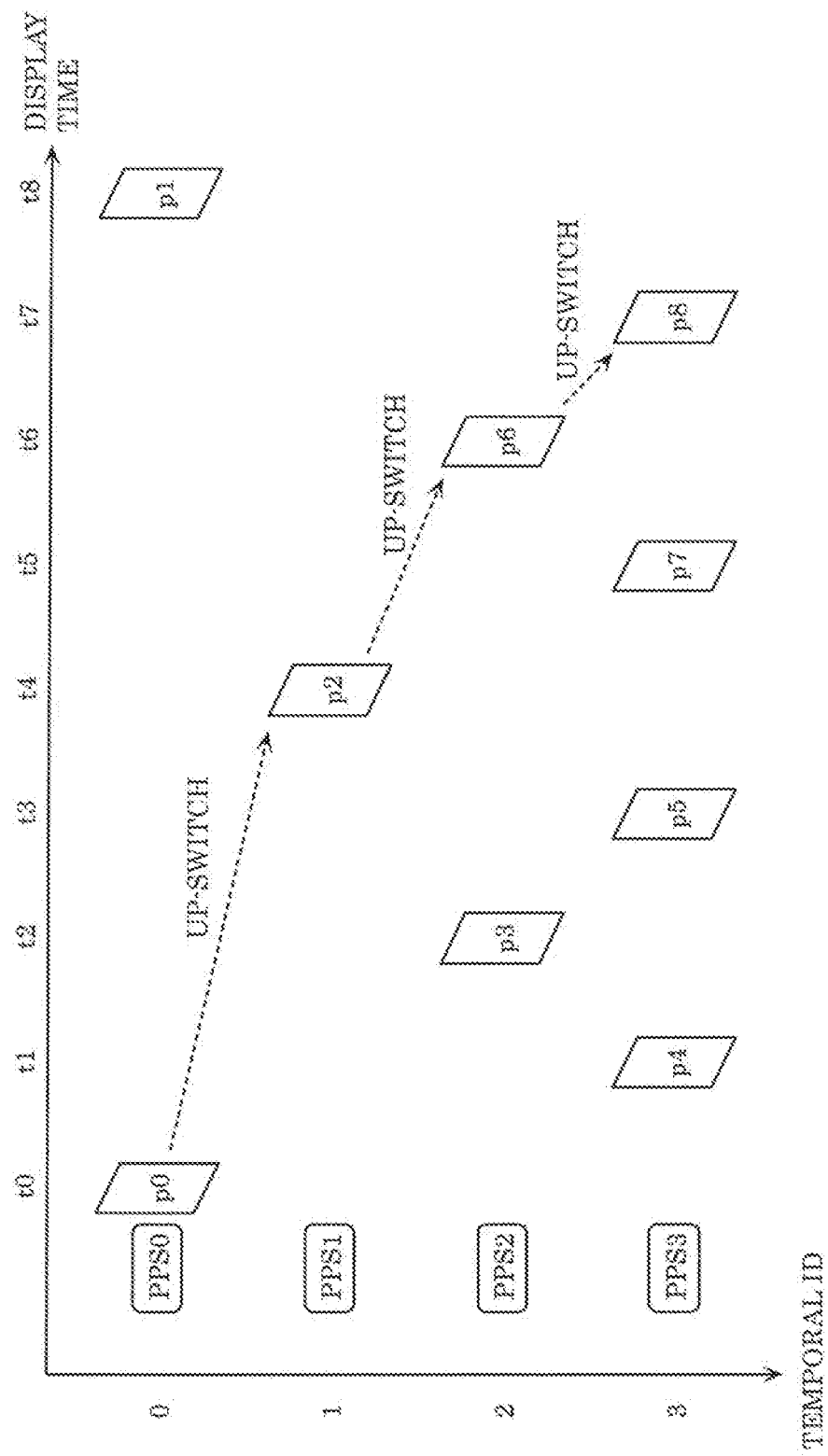
FIG. 18 is a conceptual diagram illustrating a first specific example of PPS notification according to a variation.

FIG. 18 is a conceptual diagram illustrating a first specific example of PPS notification according to this variation. FIG. 18 illustrates pictures p0 to p8 as in FIG. 14A. The coding order of pictures p0 to p8 and the temporal ID assigned to each of pictures p0 to p8 in FIG. 18 are the same as in the example in FIG. 14A.

FIG. 18 further illustrates PPS0 to PPS3. Here, PPSx is a PPS which is referred to in temporal layer x. In addition, here, x is a temporal ID, and temporal layer x includes a picture to which x is assigned as a temporal ID. Specifically, PPS0 is a PPS which is referred to in temporal layer 0. In other words, PPS0 is a PPS for a picture to which 0 is assigned as a temporal ID.

Specifically, PPS1 is a PPS which is referred to in temporal layer 1. In other words, PPS1 is a PPS for a picture to which 1 is assigned as a temporal ID. Likewise, PPS2 is a PPS which is referred to in temporal layer 2. In other words, PPS2 is a PPS for a picture to which 2 is assigned as a temporal ID. Likewise, PPS3 is a PPS which is referred to in temporal layer 3. In other words, PPS3 is a PPS for a picture to which 3 is assigned as a temporal ID.

In FIG. 18, PPSx is assigned with x as a temporal ID. Specifically, PPS0 is assigned with 0 as a temporal ID. Likewise, PPS1 is assigned with 1 as a temporal ID, PPS2 is assigned with 2 as a temporal ID, and PPS3 is assigned with 3 as a temporal ID.

In addition, in FIG. 18, encoder 100 encodes PPS0 to PPS3 before encoding pictures p0 to p8. Encoder 100 then encodes pictures p0 and p1 according to PPS0. In addition, encoder 100 then encodes picture p2 according to PPS1. In addition, encoder 100 then encodes pictures p3 and p6 according to PPS2. In addition, encoder 100 then encodes pictures p4, p5, p7, and p8 according to PPS3.

Likewise, decoder 200 decodes PPS0 to PPS3 before decoding pictures p0 to p8. Decoder 200 then decodes pictures p0 and p1 according to PPS0. Decoder 200 then decodes picture p2 according to PPS1. Decoder 200 then decodes pictures p3 and p6 according to PPS2. In addition, decoder 200 then decodes pictures p4, p5, p7, and p8 according to PPS3.

In addition, decoder 200 may decode only pictures each having a temporal ID smaller than or equal to a determined value among pictures p0 to p8. For example, when the determined value is 1, decoder 200 then decodes pictures p0 and p1 according to PPS0, and decodes picture p2 according to PPS1.

For example, when decoding only the pictures each having a temporal ID smaller than or equal to the determined value among pictures p0 to p8, decoder 200 discards the remaining pictures each having a temporal ID larger than the determined value among pictures p0 to p8 without decoding the remaining pictures. In this case, decoder 200 may discard the PPSs having a temporal ID larger than the determined value without decoding the PPSs. Since the PPSs having a temporal ID larger than the determined value may have been discarded without having been decoded, it is difficult to perform an appropriate up-switch.

For example, when decoding only pictures p0 to p2 each having a temporal ID of 1 or below among pictures p0 to p8, decoder 200 may decode PPS0 and PPS1 and discard PPS2 and PPS3 without decoding PPS2 and PPS3. Meanwhile, in such a state, it is difficult to perform an up-switch in which picture p6 is decoded after picture p2 is decoded. In other words, in the example of FIG. 18, it is difficult to perform an appropriate up-switch.

FIG. 19 is a conceptual diagram illustrating a second specific example of PPS notification according to this variation. FIG. 19 illustrates pictures p0 to p8 as in FIG. 18. The coding order of pictures p0 to p8 and the temporal ID assigned to each of pictures p0 to p8 in FIG. 19 are the same as in the example of FIG. 18. FIG. 19 further illustrates PPS0 to PPS3. Here, PPSx is a PPS which is referred to in temporal layer x as in the example of FIG. 18.

In the example of FIG. 19, each of PPS0 to PPS3 is assigned with 0 as a temporal ID.

In addition, in the example of FIG. 19, encoder 100 encodes PPS0 to PPS3 before encoding pictures p0 to p8 as in the example in FIG. 18. Encoder 100 then encodes pictures p0 and p1 according to PPS0, encodes picture p2 according to PPS1, encodes pictures p3 and p6 according to PPS2, and encodes pictures p4, p5, p7, and p8 according to PPS3.

Likewise, decoder 200 decodes PPS0 to PPS3 before decoding pictures p0 to p8. Decoder 200 then decodes pictures p0 and p1 according to PPS0, decodes picture p2 according to PPS1, decodes pictures p3 and p6 according to PPS2, and decodes pictures p4, p5, p7, and p8 according to PPS3.

In addition, decoder 200 may decode only pictures each having a temporal ID smaller than or equal to a determined value among pictures p0 to p8. For example, when the determined value is 1, decoder 200 then decodes pictures p0 and p1 according to PPS0, and decodes picture p2 according to PPS1.

In addition, for example, when decoding only the pictures each having a temporal ID smaller than or equal to the determined value among pictures p0 to p8, decoder 200 discards the remaining pictures each having a temporal ID larger than the determined value among pictures p0 to p8 without decoding the remaining pictures. Even in this case, decoder 200 decodes PPS0 to PPS3 whose temporal IDs are 0. Accordingly, it is possible to perform an appropriate up-switch.

More specifically, for example, decoder 200 decodes PPS0 to PPS3 even in the case of decoding only pictures p0 to p2 whose temporal IDs are 1 or below among pictures p0 to p8. For this reason, it is possible to decode picture p6 according to PPS2 after decoding of picture p2. In other words, in the example of FIG. 19, it is difficult to perform an appropriate up-switch.

FIG. 20A is a conceptual diagram illustrating a third specific example of PPS notification according to a variation. FIG. 20A illustrates pictures p0 to p8 as in FIG. 18. The coding order of pictures p0 to p8 and the temporal ID assigned to each of pictures p0 to p8 in the example of FIG. 20A are the same as in the example in FIG. 18. FIG. 20A further illustrates PPS0 to PPS3. Here, PPSx is a PPS which is referred to in temporal layer x as in the example of FIG. 18.

In addition, in the example of FIG. 20A, encoder 100 encodes PPS0 to PPS3 before encoding pictures p0 to p8 as in the example of FIG. 18. PPSx which is encoded at this time is assigned with x as a temporal ID. Specifically, PPS0 is assigned with 0 as a temporal ID. Likewise, PPS1 is assigned with 1 as a temporal ID, PPS2 is assigned with 2 as a temporal ID, and PPS3 is assigned with 3 as a temporal ID.

Encoder 100 then encodes pictures p0 and p1 according to PPS0, encodes picture p2 according to PPS1, encodes pictures p3 and p6 according to PPS2, and encodes pictures p4, p5, p7, and p8 according to PPS3.

In addition, in the example of FIG. 20A, encoder 100 encodes one or more PPSs which are referred to in one or more temporal layers each having a temporal ID larger than or equal to the temporal ID assigned to a TSA picture before encoding the TSA picture. The one or more PPSs which are encoded at this time may be assigned with the same temporal ID as the temporal ID assigned to the TSA picture.

More specifically, in the example of FIG. 20A, picture p6 assigned with 2 as a temporal ID is the TSA picture. In this case, encoder 100 encodes PPS2 and PPS3 which are referred to in temporal layer 2 and temporal layer 3, respectively, before encoding picture p6. PPS2 and PPS3 which are encoded at this time may be assigned with 2 as a temporal ID.

Likewise, decoder 200 decodes PPS0 to PPS3 before decoding pictures p0 to p8. PPSx which is decoded at this time is assigned with x as a temporal ID. Decoder 200 then decodes pictures p0 and p1 according to PPS0, decodes picture p2 according to PPS1, decodes pictures p3 and p6 according to PPS2, and decodes pictures p4, p5, p7, and p8 according to PPS3.

In addition, decoder 200 decodes one or more PPSs which are referred to in one or more temporal layers each having a temporal ID larger than or equal to the temporal ID assigned to a TSA picture before decoding the TSA picture. The one or more PPSs which are decoded at this time may be assigned with the same temporal ID as the temporal ID assigned to the TSA picture.

More specifically, in the example of FIG. 20A, picture p6 assigned with 2 as a temporal ID is the TSA picture.

Accordingly, decoder 200 decodes PPS2 and PPS3 which are referred to in temporal layer 2 and temporal layer 3, respectively, before decoding picture p6. PPS2 and PPS3 which are decoded at this time may be assigned with 2 as a temporal ID.

For example, decoder 200 may decode only PPS0 and PPS1 among PPS0 to PPS3 before decoding picture p0 in order to decode only pictures p0 to p2 whose temporal IDs are 1 or below among pictures p0 to p8. Decoder 200 may then discard PPS2 and PPS3 among PPS0 to PPS3 without decoding PPS2 and PPS3 before decoding picture p0.

Subsequently, decoder 200 decodes PPS2 which is referred to in temporal layer 2 in order to decode picture p6 which is the TSA picture in temporal layer 2. Furthermore, decoder 200 decodes PPS3 which is referred to in temporal layer 3.

In this way, after picture p2, decoder 200 is capable of decoding picture p6 according to PPS2, and decoding pictures p7 and p8 whose temporal IDs are 3 according to PPS3.

In other words, decoder 200 is capable of performing an up-switch which is allowed according to the TSA picture appropriately before decoding the TSA picture.

It is to be noted that in an up-switch in which a transition is made from a lower temporal layer to a higher temporally layer, one or more pictures and one or more PPSs corresponding to the higher layer are highly likely to be decoded. For this reason, a PPS which is processed before the TSA picture may be assigned with the temporal ID of the temporal layer in which the PPS is referred to.

For example, in the example of FIG. 20A, as for PPS2 and PPS3 which are processed before picture p6, PPS2 may be assigned with 2 as a temporal ID, and PPS3 may be assigned with 3 as a temporal ID.

FIG. 20B is a conceptual diagram illustrating a fourth specific example of PPS notification according to a variation. FIG. 20B illustrates pictures p0 to p8 as in FIG. 20A. The coding order of pictures p0 to p8 and the temporal ID assigned to each of pictures p0 to p8 in the example of FIG. 20B are the same as in the example in FIG. 20A. FIG. 20B further illustrates PPS0 to PPS3. Here, PPSx is a PPS which is referred to in temporal layer x as in the example of FIG. 20A.

In addition, in the example of FIG. 20B, encoder 100 encodes PPS0 to PPS3 before encoding pictures p0 to p8 as in the example of FIG. 20A. PPSx which is encoded at this time is assigned with x as a temporal ID. Encoder 100 then encodes pictures p0 and p1 according to PPS0, encodes picture p2 according to PPS1, encodes pictures p3 and p6 according to PPS2, and encodes pictures p4, p5, p7, and p8 according to PPS3.

In addition, in the example of FIG. 20B, encoder 100 encodes a PPS which is referred to in a temporal layer having the temporal ID assigned to an STSA picture before encoding the STSA picture. Also the PPS which is encoded at this time is assigned with the same temporal ID as the temporal ID assigned to the STSA picture.

More specifically, in the example of FIG. 20B, picture p6 assigned with 2 as a temporal ID is the STSA picture. In this case, encoder 100 encodes PPS2 which is referred to in temporal layer 2 before encoding picture p6. PPS2 which is encoded at this time may be assigned with 2 as a temporal ID.

Likewise, decoder 200 decodes PPS0 to PPS3 before decoding pictures p0 to p8. PPSx which is decoded at this time is assigned with x as a temporal ID. Decoder 200 then decodes pictures p0 and p according to PPS0, decodes picture p2 according to PPS1, decodes pictures p3 and p6 according to PPS2, and decodes pictures p4, p5, p7, and p8 according to PPS3.

In addition, decoder 200 decodes the PPS which is referred to in the temporal layer having the temporal ID assigned to the STSA picture before decoding the STSA picture. Also the PPS which is decoded at this time is assigned with the same temporal ID as the temporal ID assigned to the STSA picture.

More specifically, in the example of FIG. 20B, picture p6 assigned with 2 as a temporal ID is the STSA picture. Accordingly, decoder 200 decodes PPS2 which is referred to in temporal layer 2 before decoding picture p6. Also PPS2 which is encoded at this time may be assigned with 2 as a temporal ID.

For example, decoder 200 may decode only PPS0 and PPS1 among PPS0 to PPS3 before decoding picture p0 in order to decode only pictures p0 to p2 whose temporal IDs are 1 or below among pictures p0 to p8. Decoder 200 may then discard PPS2 and PPS3 among PPS0 to PPS3 without decoding PPS2 and PPS3 before decoding picture p0.

Subsequently, decoder 200 decodes PPS2 which is referred to in temporal layer 2 in order to decode picture p6 which is the STSA picture in temporal layer 2.

In this way, decoder 200 is capable of decoding picture p6 according to PPS2 after picture p2.

In other words, decoder 200 is capable of performing an up-switch which is allowed according to the STSA picture appropriately before decoding the STSA picture.

FIG. 21A is a conceptual diagram illustrating a fifth specific example of PPS notification according to a variation. FIG. 21A illustrates pictures p0 to p8 as in FIG. 18. The coding order of pictures p0 to p8 and the temporal ID assigned to each of pictures p0 to p8 in the example of FIG. 21A are the same as in the example in FIG. 18. FIG. 21A further illustrates PPS0 to PPS3. Here, PPSx is a PPS which is referred to in temporal layer x as in the example of FIG. 18.

In the example of FIG. 21A, each of pictures p2 to p8 whose temporal IDs are 0 or more is a TSA picture. Each of pictures p2 to p8 whose temporal IDs are 0 or more may be defined as the TSA picture according to a flag included in a sequence parameter set. For example, in HEVC, when sps_temporal_id_nesting_flag is 1, each of pictures p2 to p8 whose temporal IDs are 0 or more is defined as the TSA picture.

In addition, in the example of FIG. 21A, encoder 100 encodes PPS0 which is referred to in temporal layer 0 before encoding pictures p0 to p8. PPS0 which is encoded at this time is assigned with 0 as a temporal ID. Encoder 100 then encodes pictures p0 and p according to PPS0.

In addition, in the example of FIG. 21A, encoder 100 encodes the PPS for the TSA picture before encoding the TSA picture. Here, the PPS for the TSA picture is assigned with the same temporal ID as the temporal ID assigned to the TSA picture. Encoder 100 then encodes the TSA picture according to the PPS for the TSA picture after encoding the PPS for the TSA picture.

For example, encoder 100 encodes PPS1 for picture p2 before encoding picture p2. Here, PPS1 for picture p2 is assigned with, as a temporal ID, 1 which is the same as the value of the temporal ID assigned to picture p2. Encoder 100 then encodes picture p2 according to PPS1 for picture p2 after encoding PPS1 for picture p2. The processes for the other pictures p3 to p8 are also the same as the process for picture p2.

Likewise, decoder 200 decodes PPS0 which is referred to in temporal layer 0 before decoding pictures p0 to p8. PPS0 which is decoded at this time is assigned with 0 as a temporal ID. Decoder 200 then decodes pictures p0 and p1 according to PPS0.

In addition, decoder 200 decodes the PPS for a TSA picture before decoding the TSA picture. Here, the PPS for the TSA picture is assigned with the same temporal ID as the temporal ID assigned to the TSA picture. Decoder 200 then decodes the TSA picture according to the PPS for the TSA picture after decoding the PPS for the TSA picture.

For example, decoder 200 decodes PPS1 for picture p2 before decoding picture p2. Here, PPS1 for picture p2 is assigned with, as a temporal ID, 1 which is the same as the value of the temporal ID assigned to picture p2. Decoder 200 then decodes picture p2 according to PPS1 for picture p2 after decoding PPS1 for picture p2. The processes for the other pictures p3 to p8 are also the same as the process for picture p2.

In addition, decoder 200 may decode only pictures each having a temporal ID smaller than or equal to a determined value among pictures p0 to p8. Decoder 200 then may discard remaining pictures each having a temporal ID larger than a determined value among pictures p0 to p8 without decoding the remaining pictures. In addition, decoder 200 may decode only PPSs each having a temporal ID smaller than or equal to the determined value among PPS0 to PPS3. Decoder 200 may then discard remaining PPSs each having a temporal ID larger than the determined value among PPS0 to PPS3 without decoding the remaining PPSs.

For example, when the determined value is 1, decoder 200 then decodes PPS0 and decodes pictures p0 and p according to PPS0. In addition, decoder 200 decodes PPS1 for picture p2 before decoding picture p2. Decoder 200 then decodes picture p2 according to PPS1 for picture p2 after decoding PPS1 for picture p2. Decoder 200 then discards the remaining pictures and PPSs each having a temporal ID larger than 1 without decoding the remaining pictures and PPSs.

An up-switch may be performed while the above operation is being performed. For example, the determined value may be changed to a value larger than 1.

More specifically, for example, an up-switch may be performed so that picture p6 is decoded after picture p2 is decoded. Even when such an up-switch is performed, decoder 200 is capable of decoding PPS2 for picture p6 before decoding picture p6. Accordingly, decoder 200 is capable of appropriately decoding picture p6 according to PPS2 for picture p6. Accordingly, decoder 200 is capable of performing such an up-switch.

In other words, decoder 200 is capable of decoding PPS for each of TSA pictures before decoding the TSA even when such an up-switch is performed. Accordingly, decoder 200 is capable of appropriately decoding the TSA picture according to the PPS for the TSA picture. Accordingly, decoder 200 is capable of performing an up-switch appropriately.

FIG. 21B is a conceptual diagram illustrating a sixth specific example of PPS notification according to a variation. FIG. 21B illustrates pictures p0 to p8 as in FIG. 21A. The coding order of pictures p0 to p8 and the temporal ID assigned to each of pictures p0 to p8 in the example of FIG. 21B are the same as in the example in FIG. 21A. FIG. 21B further illustrates PPS0 to PPS3. Here, PPSx is a PPS which is referred to in temporal layer x as in the example of FIG. 21A.

In the example of FIG. 21B, each of pictures p2 to p8 each having a temporal ID larger than 0 is a TSA picture as in the example of FIG. 21A.

In addition, in the example of FIG. 21B, encoder 100 encodes PPS0 which is referred to in temporal layer 0 before encoding pictures p0 to p8 as in the example of FIG. 21A. PPS0 which is encoded at this time is assigned with 0 as a temporal ID. Encoder 100 then encodes pictures p0 and p1 according to PPS0.

In addition, in the example of FIG. 21B, encoder 100 encodes the PPS for a picture in a middle hierarchical layer before encoding the picture in the middle hierarchical layer. Here, the PPS for the picture in the middle hierarchical layer is assigned with the same temporal ID as the temporal ID assigned to the picture in the middle hierarchical layer. Encoder 100 then encodes the picture in the middle hierarchical layer according to the PPS for the picture in the middle hierarchical layer after encoding the PPS of the picture in the middle hierarchical layer.

Here, the picture in the middle hierarchical layer is a picture assigned with a temporal ID which is larger than a smallest temporal ID and smaller than a largest temporal ID.

In addition, in the example of FIG. 21B, encoder 100 encodes the PPS for a picture in the uppermost hierarchical layer before encoding a picture in a particular middle hierarchical layer among middle hierarchical layers. Here, the picture in the uppermost hierarchical layer is a picture assigned with the largest temporal ID. The picture in the particular middle hierarchical layer is a picture assigned with a temporal ID which is largest next to the largest temporal ID.

In other words, encoder 100 encodes the PPS for the picture in the particular middle hierarchical layer and the PPS for the picture in the uppermost hierarchical layer before encoding the picture in the particular middle hierarchical layer. Here, the PPS in the particular middle hierarchical layer and the PPS for the picture in the uppermost hierarchical layer may be assigned with the same temporal ID as the temporal ID assigned to the picture in the particular middle hierarchical layer.

Encoder 100 then encodes the picture in the particular middle hierarchical layer according to the PPS for the picture in the particular middle hierarchical layer after encoding the PPS of the picture in the particular middle hierarchical layer. In addition, encoder 100 encodes the picture in the uppermost hierarchical layer according to the PPS for the picture in the uppermost hierarchical layer after encoding the PPS for the picture in the uppermost hierarchical layer.

Specifically, each of pictures p2, p3, and p6 is a picture in a middle hierarchical layer among pictures p0 to p8. In particular, each of pictures p3 and p6 is a picture in the particular middle hierarchical layer among pictures p2, p3, and p6. In particular, each of pictures p4, p5, p7, and p8 is a picture in the uppermost hierarchical layer among pictures p0 to p8.

For example, encoder 100 encodes PPS1 before encoding picture p2. Here, PPS1 is assigned with, as a temporal ID, 1 which is the same as the value of the temporal ID assigned to picture p2. Encoder 100 then encodes picture p2 according to PPS1 after encoding PPS1.

In addition, encoder 100 encodes PPS2 and PPS3 before encoding picture p3. Here, each of PPS2 and PPS3 is assigned with, as a temporal ID, 2 which is the same as the value of the temporal ID assigned to picture p3. Encoder 100 then encodes picture p3 according to PPS2 after encoding PPS2. In addition, encoder 100 then encodes pictures p4 and p5 according to PPS3 after encoding PPS3.

In addition, encoder 100 encodes PPS2 and PPS3 before encoding picture p6. Here, each of PPS2 and PPS3 is assigned with, as a temporal ID, 2 which is the same as the value of the temporal ID assigned to picture p6. Encoder 100 then encodes picture p6 according to PPS2 after encoding PPS2. In addition, encoder 100 then encodes pictures p7 and p8 according to PPS3 after encoding PPS3.

Likewise, decoder 200 decodes PPS0 which is referred to in temporal layer 0 before decoding pictures p0 to p8. PPS0 which is decoded at this time is assigned with 0 as a temporal ID. Decoder 200 then decodes pictures p0 and p according to PPS0.

In addition, decoder 200 decodes the PPS for a picture in the middle hierarchical layer before decoding the picture in the middle hierarchical layer. Here, the PPS for the picture in the middle hierarchical layer is assigned with the same temporal ID as the temporal ID assigned to the picture in the middle hierarchical layer. Decoder 200 then decodes the picture in the middle hierarchical layer according to the PPS for the picture in the middle hierarchical layer after decoding the PPS for the picture in the middle hierarchical layer.

Here, the picture in the middle hierarchical layer is a picture assigned with a temporal ID which is larger than a smallest temporal ID and smaller than a largest temporal ID.

In addition, decoder 200 decodes the PPS for the picture in the uppermost hierarchical layer before decoding the picture in the particular middle hierarchical layer. Here, the picture in the uppermost hierarchical layer is a picture assigned with the largest temporal ID. The picture in the particular middle hierarchical layer is a picture assigned with a temporal ID which is largest next to the largest temporal ID.

In addition, decoder 200 decodes the PPS for the picture in the uppermost hierarchical layer before decoding the picture in the particular middle hierarchical layer before decoding the picture in the particular middle hierarchical layer. Here, the PPS in the particular middle hierarchical layer and the PPS for the picture in the uppermost hierarchical layer may be assigned with the same temporal ID as the temporal ID assigned to the picture in the particular middle hierarchical layer.

Decoder 200 then decodes the picture in the particular middle hierarchical layer according to the PPS for the picture in the particular middle hierarchical layer after decoding the PPS for the picture in the particular middle hierarchical layer. In addition, decoder 200 decodes the picture in the uppermost hierarchical layer according to the PPS for the picture in the uppermost hierarchical layer after decoding the PPS for the picture in the uppermost hierarchical layer.

Specifically, each of pictures p2, p3, and p6 is a picture in a middle hierarchical layer among pictures p0 to p8. In particular, each of pictures p3 and p6 is a picture in the particular middle hierarchical layer among pictures p2, p3, and p6. In particular, each of pictures p4, p5, p7, and p8 is a picture in the uppermost hierarchical layer among pictures p0 to p8.

For example, decoder 200 decodes PPS1 before decoding picture p2. Here, PPS1 is assigned with, as a temporal ID, 1 which is the same as the value of the temporal ID assigned to picture p2. Decoder 200 then decodes picture p2 according to PPS1 after decoding PPS1.

In addition, decoder 200 decodes PPS2 and PPS3 before decoding picture p3. Here, each of PPS2 and PPS3 is assigned with, as a temporal ID, 2 which is the same as the value of the temporal ID assigned to picture p3. Decoder 200 then decodes picture p3 according to PPS2 after decoding PPS2. In addition, decoder 200 then decodes pictures p4 and p5 according to PPS3 after decoding PPS3.

In addition, decoder 200 decodes PPS2 and PPS3 before decoding picture p6. Here, each of PPS2 and PPS3 is assigned with, as a temporal ID, 2 which is the same as the value of the temporal ID assigned to picture p6. Decoder 200 then decodes picture p6 according to PPS2 after decoding PPS2. In addition, decoder 200 then decodes pictures p7 and p8 according to PPS3 after decoding PPS3.

In addition, decoder 200 may decode only pictures each having a temporal ID smaller than or equal to a determined value among pictures p0 to p8. Decoder 200 then may discard remaining pictures each having a temporal ID larger than a determined value among pictures p0 to p8 without decoding the remaining pictures. In addition, decoder 200 may decode only PPSs each having a temporal ID smaller than or equal to the determined value among PPS0 to PPS3. Decoder 200 may then discard remaining PPSs each having a temporal ID larger than the determined value among PPS0 to PPS3 without decoding the remaining PPSs.

For example, when the determined value is 1, decoder 200 then decodes PPS0 and decodes pictures p0 and p according to PPS0. In addition, decoder 200 decodes PPS1 for picture p2 before decoding picture p2. Decoder 200 then decodes picture p2 according to PPS1 for picture p2 after decoding PPS1 for picture p2. Decoder 200 then discards the remaining pictures and PPSs each having a temporal ID larger than 1 without decoding the remaining pictures and PPSs.

An up-switch may be performed while the above operation is being performed. For example, the determined value may be changed to a value larger than 1.

More specifically, for example, an up-switch may be performed so that picture p6 is decoded after picture p2 is decoded. Even when such an up-switch is performed, decoder 200 is capable of decoding PPS2 for picture p6 before decoding picture p6. Accordingly, decoder 200 is capable of appropriately decoding picture p6 according to PPS2 for picture p6. Accordingly, decoder 200 is capable of performing such an up-switch.

In addition, furthermore, an up-switch may be performed so that picture p7 is decoded after picture p6 is decoded. Even when such an up-switch is performed, decoder 200 is capable of decoding PPS3 for picture p6 before decoding picture p7. Accordingly decoder 200 is capable of appropriately decoding picture p7 according to PPS3 for picture p7. Accordingly, decoder 200 is capable of performing such an up-switch.

In other words, decoder 200 is capable of appropriately decoding the pictures according to the PPSs even when an up-switch is performed. Accordingly, decoder 200 is capable of performing an up-switch appropriately.

PPS notification explained with reference to FIGS. 18 to 21B is not limited to the PPS notification in the variations of the filter information processing method. For example, a PPS does not always need to include filter control information, or is not related to any adaptive loop filter. A PPS may not include information related to an adaptive loop filter, and may include other information to be used in encoding or decoding of a picture. For example, a PPS may include information of a reference picture list or information of a quantization matrix.

In addition, the operations related to FIG. 18 to FIG. 21B are not limited to PPS notification, and are applicable to notification of other parameter sets such as a sequence parameter set or an adaptive parameter set. In other words, the PPSs in the explanations related to FIGS. 18 to 21B can be replaced by parameter sets.

In addition, the temporal IDs related to FIGS. 14A, 14B, and FIGS. 18 to 21B may be assigned according to the coding order, decoding order, display order, the type of data, etc. In addition, encoder 100 may encode a temporal ID, and decoder 200 may decode the temporal ID. Alternatively, by the temporal ID being assigned according to the same standard between encoder 100 and decoder 200, encoding and decoding of the temporal ID may be omitted.

In encoder 100, entropy encoder 110 may assign a temporal ID, or another constituent element may assign a temporal ID. In decoder 200, entropy decoder 202 may assign a temporal ID, or another constituent element may assign a temporal ID.

[Mounting Example of Encoder]

Figure 22:
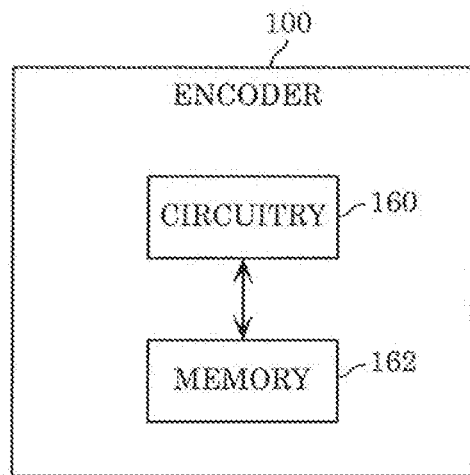
FIG. 22 is a block diagram illustrating a mounting example of an encoder.

FIG. 22 is a block diagram illustrating a mounting example of encoder 100. Encoder 100 includes circuitry 160 and memory 162. For example, a plurality of constituent elements of encoder 100 illustrated in FIG. 1 is mounted on circuitry 160 and memory 162 illustrated in FIG. 22.

Circuitry 160 is an electronic circuit accessible to memory 162, and performs information processing. For example, circuitry 160 is exclusive or general electronic circuitry which encodes a video using memory 162. Circuitry 160 may be a processor such as a CPU. In addition, circuitry 160 may be a combination of a plurality of electronic circuits.

In addition, for example circuitry 160 may take roles of a plurality of constituent elements other than the constituent elements for storing information among the plurality of constituent elements of encoder 100 illustrated in FIG. 1. In other words, circuitry 160 may perform the above-described operations as operations by these constituent elements.

Memory 162 is exclusive or general memory in which information used by circuitry 160 to encode a video is stored. Memory 162 may be electronic circuitry, may be connected to circuitry 160, or may be included in circuitry 160.

In addition, memory 162 may be a combination of a plurality of electronic circuits, or may include a plurality sub-memories. In addition, memory 162 may be a magnetic disc, an optical disc, or the like, and may be represented as storage, a recording medium, or the like. In addition, memory 162 may be a non-volatile memory, or a volatile memory.

For example, memory 162 may take roles of the constituent elements for storing information among the plurality of constituent elements of encoder 100 illustrated in FIG. 1. More specifically, memory 162 may take roles of block memory 118, frame memory 122, current filter information storage 132, and reference filter information storage 133 illustrated in FIG. 1.

In addition, memory 162 may store a video to be encoded, or a bit string corresponding to an encoded video. In addition, memory 162 may store a program used by circuitry 160 to encode a video.

It is to be noted that encoder 100 does not always need to mount all of the plurality of constituent elements illustrated in FIG. 1, or the plurality of processes described above do not always need to be performed. Part of the plurality of constituent elements illustrated in FIG. 1 may be included in one or more other devices, or part of the plurality of processes described above may be executed by one or more other devices. Subsequently, by means of the part of the plurality of constituent elements illustrated in FIG. 1 being mounted on encoder 100 and the part of the plurality of processes being performed, information related to encoding of a video can be appropriately set.

Figure 23:
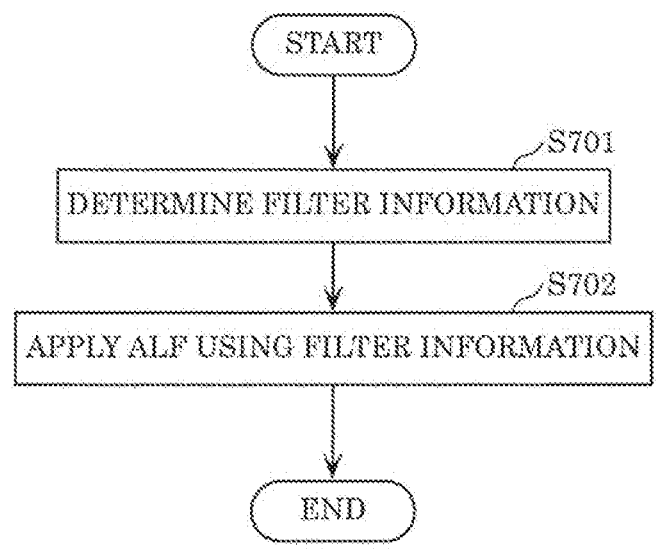
FIG. 23 is a flow chart indicating a first operation example of an encoder.

FIG. 23 is a flow chart indicating a first operation example of encoder 100 illustrated in FIG. 22. For example, encoder 100 illustrated in FIG. 22 performs an operation illustrated in FIG. 23 when an adaptive loop filter is applied in encoding of a video including a plurality of pictures each assigned with a temporal ID indicating a hierarchical layer regarding temporal scalability. Specifically, circuitry 160 performs operations indicated below using memory 162.

First, circuitry 160 determines first filter information for applying an adaptive loop filter for a first picture among a plurality of pictures with reference to second filter associated with the second picture (S701). Here, the second picture is a picture which precedes the first picture in coding order among the plurality of pictures.

At this time, when the NAL unit type of the first picture is a determined NAL unit type, circuitry 160 prohibits that third filter information associated with a third picture is referred to as second filter information. Here, the third picture is a picture which precedes the first picture in coding order among the plurality of pictures and has the same temporal ID as the temporal ID of the first picture. Circuitry 160 then applies an adaptive loop filter to the first picture using the determined first filter information (S702).

In this way, encoder 100 is capable of determining the first filter information of the first picture with reference to the second filter information of the second picture. At that time, encoder 100 is capable of prohibiting that third filter information of the third picture in the hierarchical layer in which the first picture of the determined NAL unit type is present is referred to as the second filter information.

In other words, encoder 100 is capable of placing a reference restriction on the filter information of the picture in the hierarchical layer in which the first picture of the determined NAL unit type is present, as in the case of the reference restriction which can be performed on a picture in the hierarchical layer in which the first picture of the determined NAL unit type is present. Accordingly, encoder 100 is capable of appropriately managing the filter information in association with the picture, and appropriately restricting filter information and setting filter information to be referred to. Thus, encoder 100 is capable of appropriately setting information related to encoding of the video.

For example, in the determining of the first filter information, circuitry 160 may prohibit that the fourth filter information associated with the fourth picture is referred to as the second filter information. Here, the fourth picture is a picture which precedes the first picture in coding order among the plurality of pictures and has a temporal ID larger than the temporal ID of the first picture.

In this way, it is prohibited that the fourth filter information of the fourth picture having the temporal ID larger than the temporal ID of the first picture is referred to as the second filter information when determining the first filter information of the first picture with reference to the second filter information of the second picture.

Accordingly, encoder 100 is capable of placing a reference restriction on the filter information associated with the picture, as in the case of the reference restriction placed on the picture in temporal scalability. Thus, encoder 100 is capable of appropriately restricting the filter information and setting the filter information to be referred to.

In addition, for example, circuitry 160 may determine fifth filter information for applying an adaptive loop filter to a fifth picture which follows the first picture in coding order among the plurality of pictures, with reference to sixth filter information associated with a sixth picture. Here, the sixth picture is a picture which precedes the fifth picture in coding order among the plurality of pictures.

At this time, when the NAL unit type of the first picture is a determined NAL unit type, circuitry 160 may prohibit that third filter information associated with a third picture is referred to as sixth filter information. Circuitry 160 may then apply an adaptive loop filter to the fifth picture using the determined fifth filter information.

In this way, encoder 100 is capable of determining the fifth filter information of the fifth picture which follows the first picture in coding order with reference to the sixth filter information of the sixth picture. At that time, encoder 100 is capable of prohibiting that third filter information of the third picture in the hierarchical layer in which the first picture of the determined NAL unit type is present is referred to as the sixth filter information.

In other words, after the first picture of the determined NAL unit type, encoder 100 is capable of placing a reference restriction on the filter information of the picture in the hierarchical layer in which the first picture of the determined NAL unit type is present, as in the case of the reference restriction which can be performed on a picture in the hierarchical layer in which the first picture of the determined NAL unit type is present. Accordingly, encoder 100 is capable of appropriately managing the filter information in association with the picture, and appropriately restricting filter information and setting filter information to be referred to. Thus, encoder 100 is capable of appropriately setting information related to encoding of the video.

In addition, for example, when the NAL unit type of the first picture is a determined NAL unit type, circuitry 160 may prohibit that fourth filter information associated with a fourth picture is referred to as sixth filter information in the determining of the fifth filter information. Here, the fourth picture is a picture which precedes the first picture in coding order among the plurality of pictures and has a temporal ID larger than the temporal ID of the first picture.

In this way, it is prohibited that the fourth filter information of the fourth picture having the temporal ID larger than the temporal ID of the first picture is referred to as the fifth filter information when determining the fifth filter information of the fifth picture with reference to the sixth filter information of the sixth picture.

In other words, after the first picture of the determined NAL unit type, encoder 100 is capable of placing a reference restriction on the filter information, as in the case of the reference restriction which can be performed on a picture having the temporal ID larger than the temporal ID of the first picture. Accordingly, encoder 100 is capable of appropriately managing the filter information in association with the picture, and appropriately restricting filter information and setting filter information to be referred to. Thus, encoder 100 is capable of appropriately setting information related to encoding of the video.

In addition, for example, in the determining of the first filter information, circuitry 160 may prohibit that seventh filter information associated with a seventh picture is referred to as the second filter information in a determined case.

Here, the determined case is a case in which an eighth picture is present between the first picture and the seventh picture and the NAL unit type of the eighth picture is a determined NAL unit type. In addition, the seventh picture is a picture which precedes the first picture in coding order among the plurality of pictures and has a temporal ID larger than 0. In addition, the eighth picture is a picture having a temporal ID that is smaller than or equal to the temporal ID of the seventh picture.

In this way, after the eighth picture of the determined NAL unit type, encoder 100 is capable of prohibiting reference to, as the second filter information, the seventh filter information of the seventh picture having a larger or equal temporal ID compared with the temporal ID of the eighth picture.

In other words, after the eighth picture of the determined NAL unit type, encoder 100 is capable of placing a reference restriction on the seventh filter information of the seventh picture, as in the case of the reference restriction which can be performed on the seventh picture. Accordingly, encoder 100 is capable of appropriately managing the filter information in association with the picture, and appropriately restricting filter information and setting filter information to be referred to. Thus, encoder 100 is capable of appropriately setting information related to encoding of the video.

In addition, for example, the determined NAL unit type may be a NAL unit type of a TSA picture.

In this way, encoder 100 is capable of placing a reference restriction on the filter information of the picture in the hierarchical layer in which the TSA picture is present, as in the case of the reference restriction which can be placed on the picture in the hierarchical layer in which the TSA picture is present. Accordingly, encoder 100 is capable of appropriately managing the filter information in association with the picture, and appropriately restricting filter information and setting filter information to be referred to. Thus, encoder 100 is capable of appropriately setting information related to encoding of the video.

In addition, for example, circuitry 160 may determine fifth filter information for applying an adaptive loop filter to a fifth picture which follows the first picture in coding order among the plurality of pictures with reference to sixth filter information associated with a sixth picture. Here, the sixth picture is a picture which precedes the fifth picture in coding order among the plurality of pictures.

In addition, for example, circuitry 160 may prohibit that third filter information associated with a third picture is referred to as the sixth filter information in a determined case. Here, the determined case is a case in which the NAL unit type of the first picture is a determined NAL unit type, and the temporal ID of the fifth picture is the same as the temporal ID of the first picture. Circuitry 160 may then apply an adaptive loop filter to the fifth picture using the determined fifth filter information.

In this way, encoder 100 is capable of determining the fifth filter information of the fifth picture which is in the hierarchical layer in which the first picture is present and which follows the first picture in coding order with reference to the sixth filter information of the sixth picture. At that time, encoder 100 is capable of prohibiting that third filter information of the third picture in the hierarchical layer in which the first picture of the determined NAL unit type is present is referred to as the sixth filter information.

In other words, after the first picture of the determined NAL unit type and in the hierarchical layer in which the first picture is present, encoder 100 is capable of placing a reference restriction on the filter information, as in the case of the reference restriction which can be performed on the picture which precedes the first picture. Accordingly, encoder 100 is capable of appropriately managing the filter information in association with the picture, and appropriately restricting filter information and setting filter information to be referred to. Thus, encoder 100 is capable of appropriately setting information related to encoding of the video.

In addition, for example, the determined NAL unit type may be a NAL unit type of an STSA picture.

In this way, encoder 100 is capable of placing a reference restriction on the filter information of the picture in the hierarchical layer in which the STSA picture is present, as in the case of the reference restriction which can be placed on the picture in the hierarchical layer in which the STSA picture is present. Accordingly, encoder 100 is capable of appropriately managing the filter information in association with the picture, and appropriately restricting filter information and setting filter information to be referred to. Thus, encoder 100 is capable of appropriately setting information related to encoding of the video.

Figure 24:
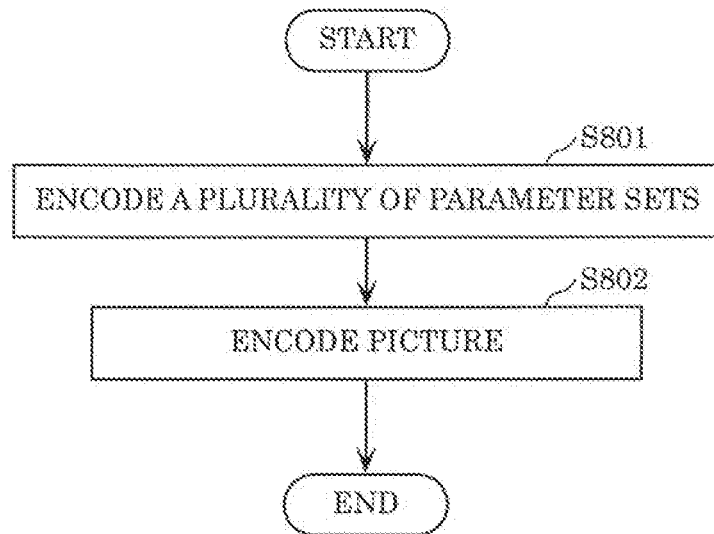
FIG. 24 is a flow chart indicating a second operation example of the encoder.

FIG. 24 is a flow chart indicating a second operation example of encoder 100 illustrated in FIG. 22. For example, encoder 100 illustrated in FIG. 22 performs an operation illustrated in FIG. 24 when encoding a video including a plurality of pictures each assigned with a temporal ID indicating a hierarchical layer regarding temporal scalability. Specifically, circuitry 160 performs operations indicated below using memory 162.

First, circuitry 160 encodes a plurality of parameter sets each assigned with 0 as a temporal ID indicating a hierarchical layer regarding temporal scalability (S801). Circuitry 160 then encodes an initial picture in coding order among the plurality of pictures after encoding the plurality of parameter sets (S802).

Here, the plurality of parameter sets correspond respectively to a plurality of hierarchical layers indicated by a plurality of temporal IDs assigned to the plurality of pictures. In addition, each of the plurality of parameter sets is a parameter set for one or more pictures each assigned with a temporal ID indicating a hierarchical layer corresponding to the parameter set among the plurality of pictures.

In this way, encoder 100 is capable of collectively encoding the plurality of parameter sets corresponding respectively to the plurality of hierarchical layers at the beginning. In addition, each of the plurality of parameter sets is assigned with 0 as a temporal ID. Accordingly, the plurality of parameter sets can be appropriately processed without being discarded. Thus, encoder 100 is capable of appropriately setting information related to encoding of the video.

For example, the plurality of pictures may be included in a first picture group. In addition, the plurality of parameter sets may be included in a first parameter set group. In addition, the video may include a plurality of pictures in a second picture group. Circuitry 160 may then encode the plurality of parameter sets in the second parameter set group after encoding the pictures in the first picture group.

Here, the plurality of parameter sets in the second parameter group may be a plurality of parameter sets each assigned with 0 as a temporal ID indicating a hierarchical layer regarding temporal scalability. In addition, the plurality of parameter sets in the second parameter set group may correspond respectively to the plurality of hierarchical layers indicated by the plurality of temporal IDs assigned to the plurality of pictures in the second picture group.

In addition, each of the parameter sets in the second parameter set group may be a parameter set for one or more pictures each assigned with a temporal ID indicating a hierarchical layer for the parameter set among the pictures in the second picture group.

In addition, circuitry 160 may encode an initial picture in coding order among the plurality of pictures in the second picture group after encoding the plurality of parameters in the second parameter set group.

In this way, encoder 100 is capable of collectively encoding, for each picture group, the plurality of parameter sets corresponding respectively to the plurality of hierarchical layers at the beginning. Thus, encoder 100 is capable of appropriately setting, for each picture group, information related to encoding of the video.

Figure 25:
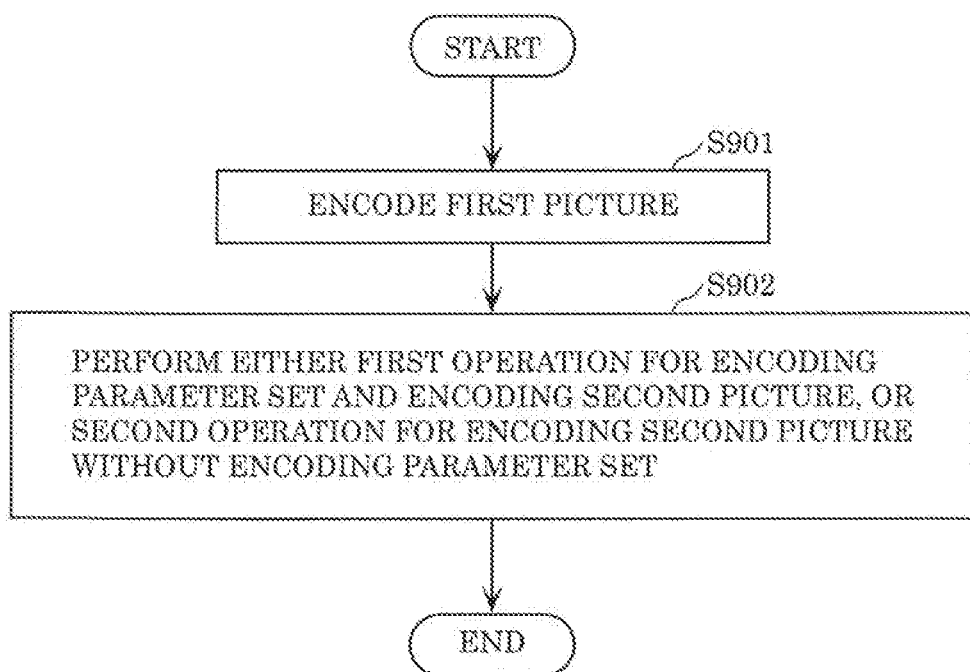
FIG. 25 is a flow chart indicating a third operation example of the encoder.

FIG. 25 is a flow chart indicating a third operation example of encoder 100 illustrated in FIG. 22. For example, encoder 100 illustrated in FIG. 22 performs operations illustrated in FIG. 25 when encoding a video including a plurality of pictures. Specifically, circuitry 160 performs operations indicated below using memory 162.

First, circuitry 160 encodes a first picture among the plurality of pictures (S901). Circuitry 160 then performs a first operation or a second operation (S902). At this time, circuitry 160 performs either the first operation when a second picture is a determined picture.

Here, the first operation is an operation for encoding a parameter set for the second picture after encoding the first picture and encoding the second picture after encoding a parameter set for the second picture. In addition, the second operation is an operation for encoding the second picture without encoding the parameter set for the second picture after encoding the first picture. In addition, the second picture is a picture which follows the first picture in coding order among the plurality of pictures.

In this way, encoder 100 is capable of encoding the parameter set for the determined picture before the determined picture. Accordingly, the parameter set for the determined picture can be appropriately processed in the up-switch, etc., for the determined picture. Thus, encoder 100 is capable of appropriately setting information related to encoding of the video.

For example, the determined picture may be a TSA picture. In this way, encoder 100 is capable of encoding the parameter set for the TSA picture before the TSA picture. Accordingly, the parameter set for the TSA picture can be appropriately processed in the up-switch, etc., for the TSA picture. Thus, encoder 100 is capable of appropriately setting information related to encoding of the video.

In addition, for example, each of the plurality of pictures may be a picture assigned with a temporal ID indicating a hierarchical layer regarding temporal scalability. In the first operation, circuitry 160 may then encode a plurality of related parameter sets which are a plurality of parameter sets including the parameter set for the second picture after encoding the first picture, and may encode the second picture after encoding the plurality of related parameter sets.

Here, the plurality of related parameter sets correspond respectively to the plurality of hierarchical layers indicated by the plurality of temporal IDs larger than or equal to the temporal ID assigned to the second picture. In addition, each of the plurality of related parameter sets is a parameter set for one or more pictures each assigned with a temporal ID indicating a hierarchical layer corresponding to the related parameter set among the plurality of pictures.

In this way, encoder 100 is capable of encoding, before encoding the determined picture, the plurality of parameter sets for the plurality of pictures each having a temporal ID larger than or equal to the temporal ID of the determined picture. Accordingly, the parameter sets can be appropriately processed in the up-switch, etc., for the pictures each having the temporal ID larger than the temporal ID of the determined picture. Thus, encoder 100 is capable of appropriately setting information related to encoding of the video.

In addition, for example, the determined picture may be an STSA picture. In this way, encoder 100 is capable of encoding the parameter set for the STSA picture before the STSA picture. Accordingly, the parameter set for the STSA picture can be appropriately processed in the up-switch, etc., for the STSA picture. Thus, encoder 100 is capable of appropriately setting information related to encoding of the video.

In addition, for example, the second picture may be a picture to be encoded next to the first picture among the plurality of pictures. In this way, encoder 100 is capable of appropriately encoding the parameter set for the determined picture before encoding the determined picture. Accordingly, the parameter set for the determined picture can be appropriately processed. Thus, encoder 100 is capable of appropriately setting information related to encoding of the video.

In addition, for example, each of the plurality of pictures may be a picture assigned with a temporal ID indicating a hierarchical layer regarding temporal scalability.

Circuitry 160 may then encode a plurality of collective parameter sets which are the plurality of parameter sets including the parameter set for the second picture before encoding an initial picture in coding order among the plurality of pictures.

Here, the plurality of collective parameter sets correspond respectively to a plurality of hierarchical layers indicated by a plurality of temporal IDs assigned to the plurality of pictures. In addition, each of the plurality of collective parameter sets is a parameter set for one or more pictures each assigned with a temporal ID indicating a hierarchical layer corresponding to the collective parameter set among the plurality of pictures.

In this way, encoder 100 is capable of re-encoding the parameter set for the determined picture before the determined picture even when the plurality of parameter sets including the parameter set for the determined picture has been encoded at the beginning. Accordingly, the parameter set for the determined picture can be appropriately processed. Thus, encoder 100 is capable of appropriately setting information related to encoding of the video.

In addition, for example, the determined picture may be either a TSA picture or an STSA picture. In addition, for example, circuitry 160 may prohibit the second operation when a second picture is a determined picture.

Figure 26:
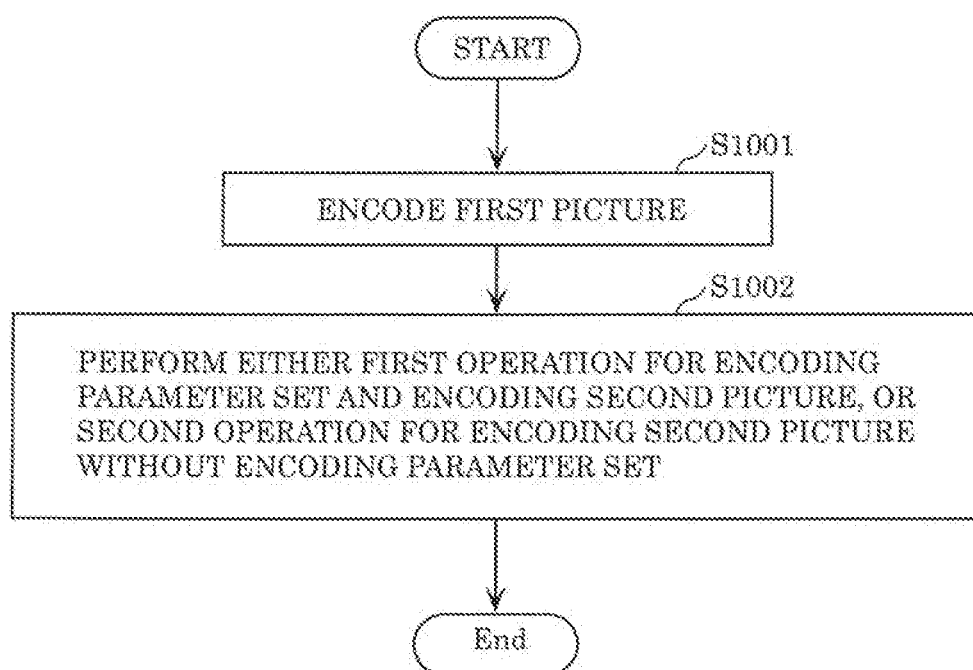
FIG. 26 is a flow chart indicating a fourth operation example of the encoder.

FIG. 26 is a flow chart indicating a fourth operation example of encoder 100 illustrated in FIG. 22. For example, encoder 100 illustrated in FIG. 22 performs an operation illustrated in FIG. 26 when encoding a video including a plurality of pictures each assigned with a temporal ID indicating a hierarchical layer regarding temporal scalability. Specifically, circuitry 160 performs operations indicated below using memory 162.

First, circuitry 160 encodes a first picture among the plurality of pictures (S1001). Circuitry 160 then performs either a first operation or a second operation (S1002). At this time, circuitry 160 performs the first operation when the temporal ID assigned to the second picture is larger than a smallest temporal ID and is smaller than a largest temporal ID.

Here, the first operation is an operation for encoding a parameter set for the second picture after encoding the first picture, and encoding the second picture after encoding a parameter set for the second picture. In addition, the second operation is an operation for encoding the second picture without encoding the parameter set for the second picture after encoding the first picture. In addition, the second picture is a picture which follows the first picture in coding order among the plurality of pictures.

In addition, the smallest temporal ID is the smallest temporal ID among the plurality of temporal IDs assigned to the plurality of pictures. In addition, the largest temporal ID is the largest temporal ID among the plurality of temporal IDs assigned to the plurality of pictures.

In this way, encoder 100 is capable of encoding the parameter set for a picture in a middle hierarchical layer before the picture in the middle hierarchical layer. Accordingly, the parameter set for the picture in the middle hierarchical layer can be appropriately processed in the up-switch, etc., for the picture in the middle hierarchical layer. Thus, encoder 100 is capable of appropriately setting information related to encoding of the video.

For example, circuitry 160 may perform the first operation even when the temporal ID assigned to the second picture is the largest temporal ID. In this way, encoder 100 is capable of encoding the parameter set for the picture in the uppermost hierarchical layer before the picture in the uppermost hierarchical layer. Accordingly, the parameter set for the picture in the uppermost hierarchical layer can be appropriately processed in the up-switch, etc., for the picture in the uppermost hierarchical layer. Thus, encoder 100 is capable of appropriately setting information related to encoding of the video.

In addition, for example, in the first operation performed in a determined case, circuitry 160 may encode the parameter set for the second picture and an uppermost parameter set after encoding the first picture. Circuitry 160 may then encode the second picture after encoding the parameter set for the second picture and the uppermost parameter set.

Here, the determined case is a case in which the temporal ID assigned to the second picture is a second largest temporal ID among the plurality of temporal IDs. In addition, the uppermost parameter set is a parameter set for one or more pictures each assigned with the largest temporal ID.

In this way, encoder 100 is capable of efficiently encoding the two parameter sets including the parameter set for the picture in the uppermost hierarchical layer.

In addition, for example, circuitry 160 may perform the second operation when the temporal ID assigned to the second picture is the largest temporal ID. In this way, encoder 100 is capable of encoding the parameter set for the picture in the uppermost hierarchical layer before the picture in the uppermost hierarchical layer.

In addition, for example, under a determined condition, circuitry 160 may perform the first operation when the temporal ID assigned to the second picture is larger than a smallest temporal ID and is smaller than a largest temporal ID. Here, the determined condition is a condition in which a determined flag included in a sequence parameter set for a plurality of pictures is a determined value. In this way, encoder 100 is capable of appropriately encoding the parameter set for a picture in a middle hierarchical layer before the picture in the middle hierarchical layer in a determined sequence.

In addition, for example, under a condition that the determined flag is the determined value, each of the plurality of pictures may be a TSA picture when the temporal ID assigned to the picture is not a smallest temporal ID. In this way, encoder 100 is capable of appropriately encoding the parameter set for the picture in the middle hierarchical layer before the picture in the middle hierarchical layer in the determined sequence including the TSA picture present in each of the hierarchical layers other than the uppermost hierarchical layer.

In addition, for example, circuitry 160 may prohibit the second operation when the temporal ID assigned to the second picture is larger than a smallest temporal ID and is smaller than a largest temporal ID. In addition, for example, circuitry 160 may prohibit the second operation also when the temporal ID assigned to the second picture is the largest temporal ID. In addition, for example, circuitry 160 may prohibit the second operation according to the temporal ID assigned to the second picture.

[Mounting Example of Decoder]

Figure 27:
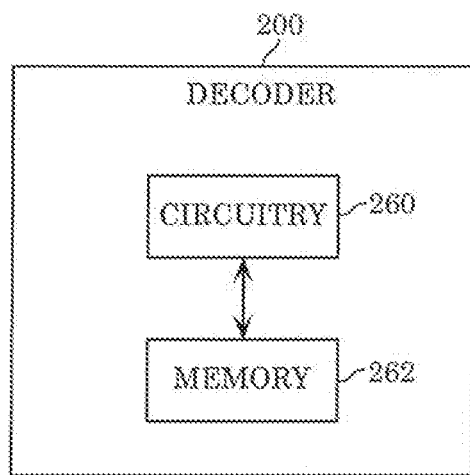
FIG. 27 is a block diagram illustrating a mounting example of a decoder.

FIG. 27 is a block diagram illustrating a mounting example of decoder 200. Decoder 200 includes circuitry 260 and memory 262. For example, a plurality of constituent elements of decoder 200 illustrated in FIG. 10 is mounted on circuitry 260 and memory 262 illustrated in FIG. 27.

Circuitry 260 is an electronic circuit accessible to memory 262, and performs information processing. For example, circuitry 260 is exclusive or general electronic circuitry which decodes a video using memory 262. Circuitry 260 may be a processor such as a CPU. In addition, circuitry 260 may be a combination of a plurality of electronic circuits.

In addition, for example, circuitry 260 may take roles of a plurality of constituent elements other than the constituent elements for storing information among the plurality of constituent elements of decoder 200 illustrated in FIG. 10. In other words, circuitry 260 may perform the above-described operations as operations by these constituent elements.

Memory 262 is an exclusive or general memory in which information used by circuitry 260 to decode a video is stored. Memory 262 may be an electronic circuitry, may be connected to circuitry 260, or may be included in circuitry 260.

In addition, memory 262 may be a combination of a plurality of electronic circuits, or may include a plurality sub-memories. In addition, memory 262 may be a magnetic disc, an optical disc, or the like, and may be represented as storage, a recording medium, or the like. In addition, memory 262 may be a non-volatile memory, or a volatile memory.

For example, memory 262 may take roles of the constituent elements for storing information among the plurality of constituent elements of decoder 200 illustrated in FIG. 10. More specifically, memory 262 may take roles of block memory 210, frame memory 214, current filter information storage 232, and reference filter information storage 233 illustrated in FIG. 10.

In addition, memory 262 may store a bit string corresponding to a encoded video or a video to be decoded. In addition, memory 262 may store a program used by circuitry 260 to decode a video.

It is to be noted that decoder 200 does not always need to mount all of the plurality of constituent elements illustrated in FIG. 10, or the plurality of processes described above do not always need to be performed. Part of the plurality of constituent elements illustrated in FIG. 10 may be included in one or more other devices, or part of the plurality of processes described above may be executed by one or more other devices. Subsequently, by means of the part of the plurality of constituent elements illustrated in FIG. 10 being mounted on decoder 200 and the part of the plurality of processes being performed, information related to decoding of a video can be appropriately set.

Figure 28:
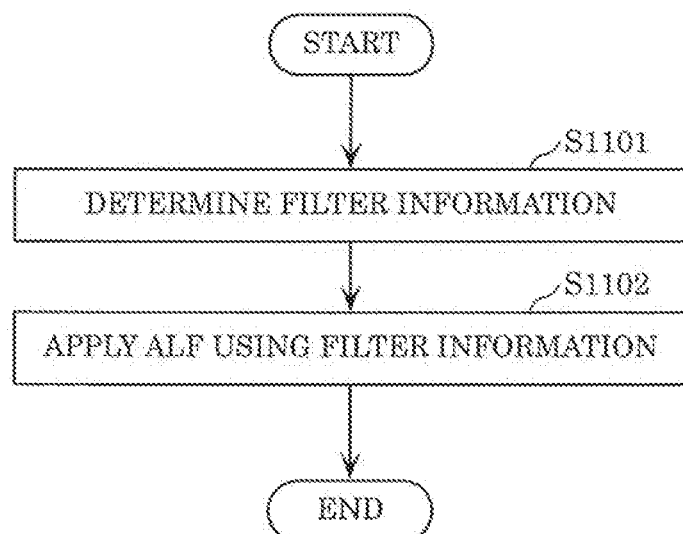
FIG. 28 is a flow chart indicating a first operation example of the decoder.

FIG. 28 is a flow chart indicating a first operation example of decoder 200 illustrated in FIG. 27. For example, decoder 200 illustrated in FIG. 27 performs an operation illustrated in FIG. 28 when an adaptive loop filter is applied in decoding of a video including a plurality of pictures each assigned with a temporal ID indicating a hierarchical layer regarding temporal scalability. Specifically, circuitry 260 performs operations indicated below using memory 262.

First, circuitry 260 determines first filter information for applying an adaptive loop filter for a first picture among a plurality of pictures with reference to second filter associated with the second picture (S1101). Here, the second picture is a picture which precedes the first picture in decoding order among the plurality of pictures.

At this time, when the NAL unit type of the first picture is a determined NAL unit type, circuitry 260 prohibits that third filter information associated with a third picture is referred to as second filter information. Here, the third picture is a picture which precedes the first picture in decoding order among the plurality of pictures and has the same temporal ID as the temporal ID of the first picture. Circuitry 260 then applies an adaptive loop filter to the first picture using the determined first filter information (S1102).

In this way, decoder 200 is capable of determining the first filter information of the first picture with reference to the second filter information of the second picture. At that time, decoder 200 is capable of prohibiting that third filter information of the third picture in the hierarchical layer in which the first picture of the determined NAL unit type is present is referred to as the second filter information.

In other words, decoder 200 is capable of placing a reference restriction on the filter information of the picture in the hierarchical layer in which the first picture of the determined NAL unit type is present, as in the case of the reference restriction which can be performed on a picture in the hierarchical layer in which the first picture of the determined NAL unit type is present. Accordingly, decoder 200 is capable of appropriately managing the filter information in association with the picture, and appropriately restricting filter information and setting filter information to be referred to. Thus, decoder 200 is capable of appropriately setting information related to decoding of the video.

For example, in the determining of the first filter information, circuitry 260 may prohibit that the fourth filter information associated with the fourth picture is referred to as the second filter information. Here, the fourth picture is a picture which precedes the first picture in decoding order and has a temporal ID larger than the temporal ID of the first picture among the plurality of pictures.

In this way, it is prohibited that the fourth filter information of the fourth picture having the temporal ID larger than the temporal ID of the first picture is referred to as the second filter information when determining the first filter information of the first picture with reference to the second filter information of the second picture.

Accordingly, decoder 200 is capable of placing a reference restriction on the filter information associated with the picture, as in the case of the reference restriction placed on the picture in temporal scalability. Thus, decoder 200 is capable of appropriately restricting the filter information and setting the filter information to be referred to.

In addition, for example, circuitry 260 may determine fifth filter information for applying an adaptive loop filter to a fifth picture which follows the first picture in decoding order among the plurality of pictures with reference to sixth filter information associated with a sixth picture. Here, the sixth picture is a picture which precedes the fifth picture in decoding order among the plurality of pictures.

At this time, when the NAL unit type of the first picture is a determined NAL unit type, circuitry 260 may prohibit that third filter information associated with a third picture is referred to as sixth filter information. Circuitry 260 may then apply an adaptive loop filter to the fifth picture using the determined fifth filter information.

In this way, decoder 200 is capable of determining the fifth filter information of the fifth picture which follows the first picture in decoding order with reference to the sixth filter information of the sixth picture. At that time, decoder 200 is capable of prohibiting that third filter information of the third picture in the hierarchical layer in which the first picture of the determined NAL unit type is present is referred to as the sixth filter information.

In other words, after the first picture of the determined NAL unit type, decoder 200 is capable of placing a reference restriction on the filter information of the picture in the hierarchical layer in which the first picture is present, as in the case of the reference restriction which can be performed on a picture in the hierarchical layer in which the first picture is present. Accordingly, decoder 200 is capable of appropriately managing the filter information in association with the picture, and appropriately restricting filter information and setting filter information to be referred to. Thus, decoder 200 is capable of appropriately setting information related to decoding of the video.

In addition, for example, when the NAL unit type of the first picture is a determined NAL unit type, circuitry 260 may prohibit that fourth filter information associated with a fourth picture is referred to as sixth filter information in the determining of the fifth information. Here, the fourth picture is a picture which precedes the first picture in decoding order and has a temporal ID larger than the temporal ID of the first picture among the plurality of pictures.

In this way, it is prohibited that the fourth filter information of the fourth picture having the temporal ID larger than the temporal ID of the first picture is referred to as the fifth filter information when determining the fifth filter information of the fifth picture with reference to the sixth filter information of the sixth picture.

In other words, after the first picture of the determined NAL unit type, decoder 200 is capable of placing a reference restriction on the filter information, as in the case of the reference restriction which can be performed on a picture having the temporal ID larger than the temporal ID of the first picture. Accordingly, decoder 200 is capable of appropriately managing the filter information in association with the picture, and appropriately restricting filter information and setting filter information to be referred to. Thus, decoder 200 is capable of appropriately setting information related to decoding of the video.

In addition, for example, in the determining of the first filter information, circuitry 260 may prohibit that seventh filter information associated with a seventh picture is referred to as the second filter information in a determined case.

Here, the determined case is a case in which an eighth picture is present between the first picture and the seventh picture and the NAL unit type of the eighth picture is a determined NAL unit type. In addition, the seventh picture is a picture which precedes the first picture in decoding order among the plurality of pictures and has a temporal ID larger than 0. In addition, the eighth picture is a picture having a temporal ID that is smaller than or equal to the temporal ID of the seventh picture.

In this way, after the eighth picture of the determined NAL unit type, decoder 200 is capable of prohibiting reference to, as the second filter information, the seventh filter information of the seventh picture having a larger or equal temporal ID compared with the temporal ID of the eighth picture.

In other words, after the eighth picture of the determined NAL unit type, decoder 200 is capable of placing a reference restriction on the seventh filter information of the seventh picture, as in the case of the reference restriction which can be performed on the seventh picture. Accordingly, decoder 200 is capable of appropriately managing the filter information in association with the picture, and appropriately restricting filter information and setting filter information to be referred to. Thus, decoder 200 is capable of appropriately setting information related to decoding of the video.

In addition, for example, the determined NAL unit type may be a NAL unit type of a TSA picture.

In this way, decoder 200 is capable of placing a reference restriction on the filter information of the picture in the hierarchical layer in which the TSA picture is present, as in the case of the reference restriction which can be placed on the picture in the hierarchical layer in which the TSA picture is present. Accordingly, decoder 200 is capable of appropriately managing the filter information in association with the picture, and appropriately restricting filter information and setting filter information to be referred to. Thus, decoder 200 is capable of appropriately setting information related to decoding of the video.

In addition, for example, circuitry 260 may determine fifth filter information for applying an adaptive loop filter to a fifth picture which follows the first picture in decoding order among the plurality of pictures with reference to sixth filter information associated with a sixth picture. Here, the sixth picture is a picture which precedes the fifth picture in decoding order among the plurality of pictures.

In addition, for example, circuitry 260 may prohibit that third filter information associated with a third picture is referred to as the sixth filter information in a determined case. Here, the determined case is a case in which the NAL unit type of the first picture is a determined NAL unit type, and the temporal ID of the fifth picture is the same as the temporal ID of the first picture. Circuitry 260 may then apply an adaptive loop filter to the fifth picture using the determined fifth filter information.

In this way, decoder 200 is capable of determining the fifth filter information of the fifth picture which is in the hierarchical layer in which the first picture is present and which follows the first picture in decoding order with reference to the sixth filter information of the sixth picture. At that time, decoder 200 is capable of prohibiting that third filter information of the third picture in the hierarchical layer in which the first picture of the determined NAL unit type is present is referred to as the sixth filter information.

In other words, after the first picture of the determined NAL unit type and in the hierarchical layer in which the first picture is present, decoder 200 is capable of placing a reference restriction on the filter information, as in the case of the reference restriction which can be performed on the picture which precedes the first picture. Accordingly, decoder 200 is capable of appropriately managing the filter information in association with the picture, and appropriately restricting filter information and setting filter information to be referred to. Thus, decoder 200 is capable of appropriately setting information related to decoding of the video.

In addition, for example, the determined NAL unit type may be a NAL unit type of an STSA picture.

In this way, decoder 200 is capable of placing a reference restriction on the filter information of the picture in the hierarchical layer in which the STSA picture is present, as in the case of the reference restriction which can be placed on the picture in the hierarchical layer in which the STSA picture is present. Accordingly, decoder 200 is capable of appropriately managing the filter information in association with the picture, and appropriately restricting filter information and setting filter information to be referred to. Thus, decoder 200 is capable of appropriately setting information related to decoding of the video.

Figure 29:
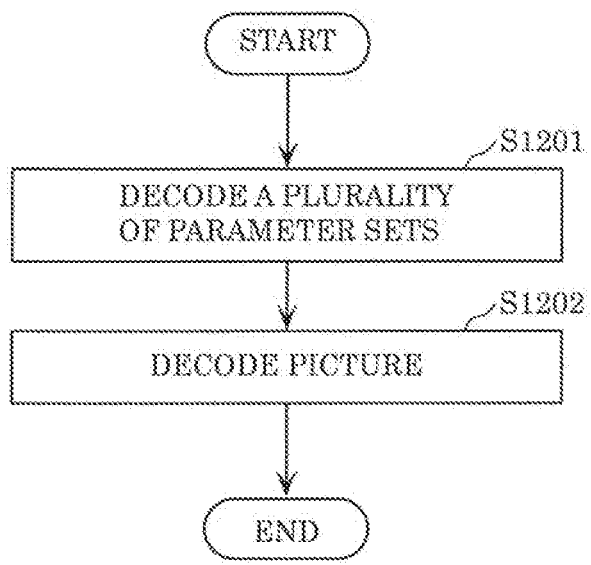
FIG. 29 is a flow chart indicating a second operation example of the decoder.

FIG. 29 is a flow chart indicating a second operation example of decoder 200 illustrated in FIG. 27. For example, decoder 200 illustrated in FIG. 27 performs an operation illustrated in FIG. 29 when decoding a video including a plurality of pictures each assigned with a temporal ID indicating a hierarchical layer regarding temporal scalability. Specifically, circuitry 260 performs operations indicated below using memory 262.

First, circuitry 260 decodes a plurality of parameter sets each assigned with 0 as a temporal ID indicating a hierarchical layer regarding temporal scalability (S1201). Circuitry 260 then decodes an initial picture in decoding order among a plurality of pictures after decoding a plurality of parameter sets (S1202).

Here, the plurality of parameter sets correspond respectively to a plurality of hierarchical layers indicated by a plurality of temporal IDs assigned to the plurality of pictures. In addition, each of the plurality of parameter sets is a parameter set for one or more pictures each assigned with a temporal ID indicating a hierarchical layer corresponding to the parameter set among the plurality of pictures.

In this way, decoder 200 is capable of collectively decoding a plurality of parameter sets corresponding respectively to the plurality of hierarchical layers at the beginning. In addition, each of the plurality of parameter sets is assigned with 0 as a temporal ID. Accordingly, the plurality of parameter sets can be appropriately processed without being discarded. Thus, decoder 200 is capable of appropriately setting information related to decoding of the video.

For example, the plurality of pictures may be included in a first picture group. In addition, the plurality of parameter sets may be included in a first parameter set group. In addition, the video may include a plurality of pictures in a second picture group. Circuitry 260 may then decode the plurality of parameter sets in the second parameter set group after decoding the pictures in the first picture group.

Here, the plurality of parameter sets in the second parameter group may be a plurality of parameter sets each assigned with 0 as a temporal ID indicating a hierarchical layer regarding temporal scalability. In addition, the plurality of parameter sets in the second parameter set group may correspond respectively to the plurality of hierarchical layers indicated by the plurality of temporal IDs assigned to the plurality of pictures in the second picture group.

In addition, each of the parameter sets in the second parameter set group may be a parameter set for one or more pictures each assigned with a temporal ID indicating a hierarchical layer for the parameter set among the pictures in the second picture group.

In addition, circuitry 260 may decode an initial picture in decoding order among the plurality of pictures in the second picture group after decoding the plurality of parameter sets in the second parameter group.

In this way, decoder 200 is capable of collectively decoding, for each picture group, a plurality of parameter sets corresponding respectively to the plurality of hierarchical layers at the beginning. Thus, decoder 200 is capable of appropriately setting, for each picture group, information related to decoding of the video.

Figure 30:
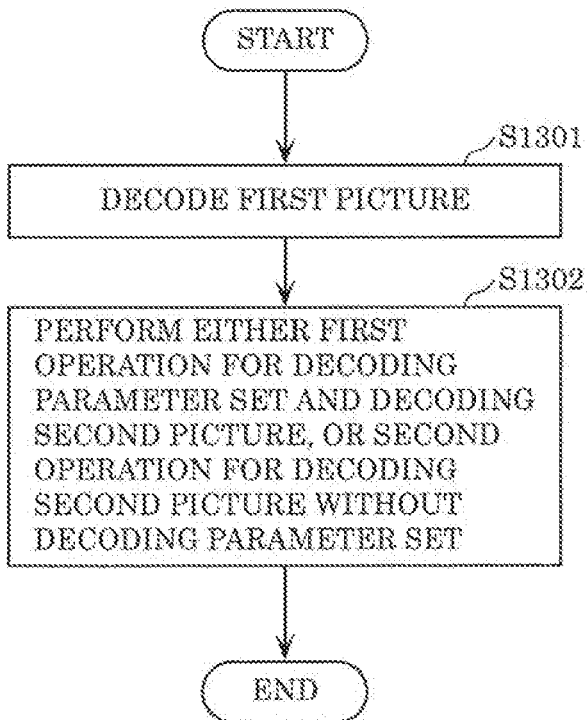
FIG. 30 is a flow chart indicating a third operation example of the decoder.

FIG. 30 is a flow chart indicating a third operation example of decoder 200 illustrated in FIG. 27. For example, decoder 200 illustrated in FIG. 27 performs an operation illustrated in FIG. 30 when decoding a video including a plurality of pictures. Specifically, circuitry 260 performs operations indicated below using memory 262.

First, circuitry 260 decodes a first picture among the plurality of pictures (S1301). Circuitry 260 then performs either a first operation or a second operation (S1302). At this time, circuitry 260 performs the first operation when a second picture is a determined picture.

Here, the first operation is an operation for decoding the parameter set for the second picture after decoding the first picture, and decoding the second picture after decoding the parameter set for the second picture. In addition, the second operation is an operation for decoding the second picture without decoding the parameter set for the second picture after decoding the first picture. In addition, the second picture is a picture which follows the first picture in decoding order among the plurality of pictures.

In this way, decoder 200 is capable of decoding the parameter set for the determined picture before the determined picture. Accordingly, the parameter set for the determined picture can be appropriately processed in the up-switch, etc., for the determined picture. Thus, decoder 200 is capable of appropriately setting information related to decoding of the video.

For example, the determined picture may be a TSA picture. In this way, decoder 200 is capable of decoding the parameter set for the TSA picture before the TSA picture. Accordingly, the parameter set for the TSA picture can be appropriately processed in the up-switch, etc., for the TSA picture. Thus, decoder 200 is capable of appropriately setting information related to decoding of the video.

In addition, for example, each of the plurality of pictures may be a picture assigned with a temporal ID indicating a hierarchical layer regarding temporal scalability. In the first operation, circuitry 260 may then decode a plurality of related parameter sets which are a plurality of parameter sets including the parameter set for the second picture after decoding the first picture, and decode the second picture after decoding the plurality of related parameter sets.

Here, the plurality of related parameter sets correspond respectively to the plurality of hierarchical layers indicated by the plurality of temporal IDs larger than or equal to the temporal ID assigned to the second picture. In addition, each of the plurality of related parameter sets is a parameter set for one or more pictures each assigned with a temporal ID indicating a hierarchical layer corresponding to the related parameter set among the plurality of pictures.

In this way, decoder 200 is capable of decoding, before decoding the determined picture, the plurality of parameter sets for the plurality of pictures each having a temporal ID larger than or equal to the temporal ID of the determined picture. Accordingly, the parameter sets can be appropriately processed in the up-switch, etc., for the pictures each having the temporal ID larger than the temporal ID of the determined picture. Thus, decoder 200 is capable of appropriately setting information related to decoding of the video.

In addition, for example, the determined picture may be an STSA picture. In this way, decoder 200 is capable of decoding the parameter set for the STSA picture before the STSA picture. Accordingly, the parameter set for the STSA picture can be appropriately processed in the up-switch, etc., for the STSA picture. Thus, decoder 200 is capable of appropriately setting information related to decoding of the video.

In addition, for example, the second picture may be a picture to be decoded next to the first picture among the plurality of pictures. In this way, decoder 200 is capable of appropriately decoding the parameter set for the determined picture immediately before decoding the determined picture. Accordingly, the parameter set for the determined picture can be appropriately processed. Thus, decoder 200 is capable of appropriately setting information related to decoding of the video.

In addition, for example, each of the plurality of pictures may be a picture assigned with a temporal ID indicating a hierarchical layer regarding temporal scalability.

Circuitry 260 may then decode a plurality of collective parameter sets which are a plurality of parameter sets including the parameter set for the second picture before decoding an initial picture in decoding order among the plurality of pictures.

Here, the plurality of parameter sets correspond respectively to a plurality of hierarchical layers indicated by a plurality of temporal IDs assigned to the plurality of pictures. In addition, each of the plurality of collective parameter sets is a parameter set for one or more pictures each assigned with a temporal ID indicating a hierarchical layer corresponding to the collective parameter set among the plurality of pictures.

In this way, decoder 200 is capable of re-decoding the parameter set for the determined picture before decoding the determined picture even when the plurality of parameter sets including the parameter set for the determined picture have been decoded at the beginning. Accordingly, the parameter set for the determined picture can be appropriately processed. Thus, decoder 200 is capable of appropriately setting information related to decoding of the video.

In addition, for example, the determined picture may be either a TSA picture or an STSA picture. In addition, for example, circuitry 260 may prohibit the second operation when a second picture is a determined picture.

Figure 31:
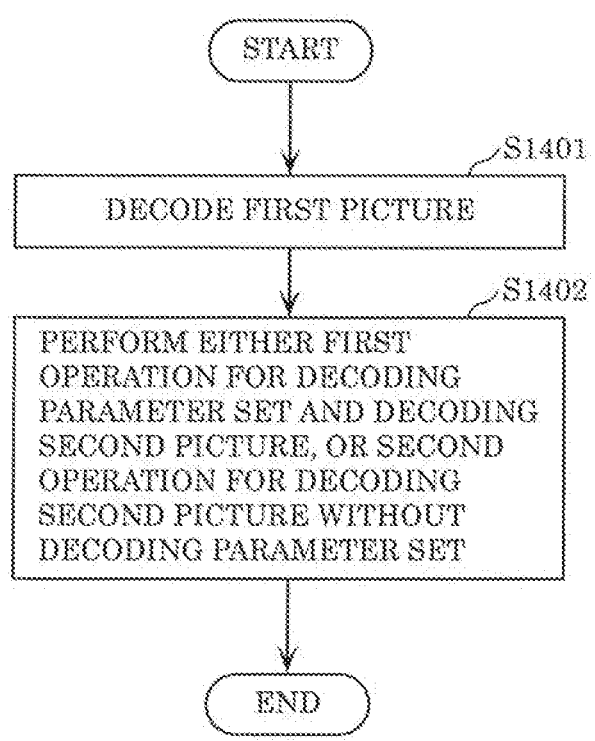
FIG. 31 is a flow chart indicating a fourth operation example of the decoder.

FIG. 31 is a flow chart indicating a fourth operation example of decoder 200 illustrated in FIG. 27. For example, decoder 200 illustrated in FIG. 27 performs an operation illustrated in FIG. 31 when decoding a video including a plurality of pictures each assigned with a temporal ID indicating a hierarchical layer regarding temporal scalability. Specifically, circuitry 260 performs operations indicated below using memory 262.

First, circuitry 260 decodes a first picture among the plurality of pictures (S1401). Circuitry 260 then performs either a first operation or a second operation (S1402). At this time, circuitry 260 performs the first operation when the temporal ID assigned to the second picture is larger than a smallest temporal ID and is smaller than a largest temporal ID.

Here, the first operation is an operation for decoding the parameter set for the second picture after decoding the first picture, and decoding the second picture after decoding the parameter set for the second picture. In addition, the second operation is an operation for decoding the second picture without decoding the parameter set for the second picture after decoding the first picture. In addition, the second picture is a picture which follows the first picture in decoding order among the plurality of pictures.

In addition, the smallest temporal ID is the smallest temporal ID among the plurality of temporal IDs assigned to the plurality of pictures. In addition, the largest temporal ID is the largest temporal ID among the plurality of temporal IDs assigned to the plurality of pictures.

In this way, decoder 200 is capable of decoding the parameter set for a picture in a middle hierarchical layer before the picture in the middle hierarchical layer. Accordingly, the parameter set for the picture in the middle hierarchical layer can be appropriately processed in the up-switch, etc., for the picture in the middle hierarchical layer. Thus, decoder 200 is capable of appropriately setting information related to decoding of the video.

For example, circuitry 260 may perform the first operation also when the temporal ID assigned to the second picture is the largest temporal ID. In this way, decoder 200 is capable of decoding the parameter set for the pictures in the uppermost hierarchical layer before the pictures in the uppermost hierarchical layer. Accordingly, the parameter set for the pictures in the uppermost hierarchical layer can be appropriately processed in the up-switch, etc., for the pictures in the uppermost hierarchical layer. Thus, decoder 200 is capable of appropriately setting information related to decoding of the video.

In addition, for example, circuitry 260 may decode the parameter set for the second picture and an uppermost parameter set after decoding the first picture in the first operation performed in a determined case. Circuitry 260 may then decode the second picture after decoding the parameter set for the second picture and the uppermost parameter set.

Here, the determined case is a case in which the temporal ID assigned to the second picture is a second largest temporal ID among the plurality of temporal IDs. In addition, the uppermost parameter set is a parameter set for one or more pictures each assigned with the largest temporal ID.

In this way, decoder 200 is capable of efficiently decoding the two parameter sets including the parameter set for the pictures in the uppermost hierarchical layer.

In addition, for example, circuitry 260 may perform the second operation when the temporal ID assigned to the second picture is the largest temporal ID. In this way, decoder 200 is capable of skipping decoding of the parameter set for the pictures in the uppermost hierarchical layer before the pictures in the uppermost hierarchical layer.

In addition, for example, under a determined condition, circuitry 260 may perform the first operation when the temporal ID assigned to the second picture is larger than a smallest temporal ID and is smaller than a largest temporal ID. Here, the determined condition is a condition in which a determined flag included in a sequence parameter set for a plurality of pictures indicates a determined value. In this way, decoder 200 is capable of appropriately decoding the parameter set for each picture in the middle hierarchical layer before the picture in the middle hierarchical layer in a determined sequence.

In addition, for example, under a condition that the determined flag indicates the determined value, each of the plurality of pictures may be a TSA picture when the temporal ID assigned to the picture is not a smallest temporal ID. In this way, decoder 200 is capable of appropriately decoding the parameter set for the picture in the middle hierarchical layer before the picture in the middle hierarchical layer in a determined sequence including the TSA picture present in each of the hierarchical layers other than the uppermost hierarchical layer.

In addition, for example, circuitry 260 may prohibit the second operation when the temporal ID assigned to the second picture is larger than a smallest temporal ID and is smaller than a largest temporal ID. In addition, for example, circuitry 260 may prohibit the second operation also when the temporal ID assigned to the second picture is the largest temporal ID. In addition, for example, circuitry 260 may prohibit the second operation according to the temporal ID assigned to the second picture under a determined condition.

[Supplements]

Encoder 100 and decoder 200 according to this embodiment may be used as an image encoder and an image decoder, respectively, or used as a video encoder and a video decoder, respectively.

Alternatively, encoder 100 and decoder 200 may be used as a parameter encoder and a parameter decoder, respectively. In other words, encoder 100 and decoder 200 may correspond only to entropy encoder 110 and entropy decoder 202, respectively. The constituent elements other than inter predictor 126 or 218, or the like may be included in other one or more devices.

Alternatively, each of encoder 100 and decoder 200 can be used as a filter device. In other words, encoder 100 and decoder 200 may correspond only to loop filter 120 and loop filter 212, respectively. The constituent elements other than inter predictor 126 or 218, or the like may be included in other one or more devices.

Alternatively, encoder 100 may correspond only to entropy encoder 110 and loop filter 120. Decoder 200 may correspond only to entropy decoder 202 and loop filter 212.

In addition, at least part of this embodiment may be used as an encoding method or a decoding method, as a parameter setting method, or another method.

In addition, in each of the embodiments, each of the constituent elements may be configured with exclusive hardware, or may be implemented by executing a software program appropriate for each constituent element. Each constituent element may be implemented by means of a program executor that is a CPU, a processor, or the like reading and executing a software program stored in a recording medium that is a hard disc, a semiconductor memory, or the like.

Specifically, each of encoder 100 and decoder 200 may include processing circuitry and storage electrically connected to the processing circuitry and accessible from the processing circuitry. For example, the processing circuitry corresponds to circuitry 160 or 260, and the storage corresponds to memory 162 or 262.

The processing circuitry includes at least one of the exclusive hardware and the program executor, and executes the process using the storage. In addition, when the processing circuitry includes the program executor, the storage stores a software program that is executed by the program executor.

Here, the software which implements encoder 100, decoder 200, etc., according to the embodiments is a program as indicated below.

This program may cause a computer to execute an encoding method for applying an adaptive loop filter in encoding of a video including a plurality of pictures each assigned with a temporal ID indicating a hierarchical layer regarding temporal scalability. The encoding method may include: determining first filter information for applying an adaptive loop filter to a first picture among the plurality of pictures with reference to second filter information associated with a second picture which precedes the first picture in coding order among the plurality of pictures; and applying the adaptive loop filter to the first picture using the first filter information determined. In the determining of the first filter information, it may be prohibited that third filter information associated with a third picture is referred to as the second filter information when a Network Abstraction Layer (NAL) unit type of the first picture is a determined NAL unit type. The third picture may be a picture which precedes the first picture in coding order among the plurality of pictures, and has the same temporal ID as the temporal ID of the first picture.

Alternatively, this program may cause a computer to execute a decoding method for applying an adaptive loop filter in decoding of a video including a plurality of pictures each assigned with a temporal ID indicating a hierarchical layer regarding temporal scalability. The decoding method may include: determining first filter information for applying an adaptive loop filter to a first picture among the plurality of pictures with reference to second filter information associated with a second picture which precedes the first picture in decoding order among the plurality of pictures; and applying the adaptive loop filter to the first picture using the first filter information determined. In the determining of the first filter information, it may be prohibited that third filter information associated with a third picture is referred to as the second filter information when a Network Abstraction Layer (NAL) unit type of the first picture is a determined NAL unit type. The third picture may be a picture which precedes the first picture in decoding order among the plurality of pictures, and has the same temporal ID as the temporal ID of the first picture.

Alternatively, this program may cause a computer to execute an encoding method for encoding a video including a plurality of pictures each assigned with a temporal ID indicating a hierarchical layer regarding temporal scalability. The encoding method may include: encoding a plurality of parameter sets each assigned with 0 as a temporal ID indicating a hierarchical layer regarding the temporal scalability; and encoding an initial picture in coding order among the plurality of pictures after encoding the plurality of parameter sets. The plurality of parameter sets may correspond respectively to a plurality of hierarchical layers indicated by a plurality of temporal IDs assigned to the plurality of pictures. Each of the parameter sets may be a parameter set for one or more pictures each assigned with a temporal ID indicating a hierarchical layer corresponding to the parameter set among the plurality of pictures.

Alternatively, this program may cause a computer to execute a decoding method for decoding a video including a plurality of pictures each assigned with a temporal ID indicating a hierarchical layer regarding temporal scalability. The decoding method may include: decoding a plurality of parameter sets each assigned with 0 as a temporal ID indicating a hierarchical layer regarding the temporal scalability; and decoding an initial picture in decoding order among the plurality of pictures after decoding the plurality of parameter sets. The plurality of parameter sets may correspond respectively to a plurality of hierarchical layers indicated by a plurality of temporal IDs assigned to the plurality of pictures. Each of the parameter sets may be a parameter set for one or more pictures each assigned with a temporal ID indicating a hierarchical layer corresponding to the parameter set among the plurality of pictures.

Alternatively, this program may cause a computer to execute an encoding method for encoding a video including a plurality of picture. The encoding method may include: encoding a first picture among the plurality of pictures; and performing (i) a first operation for encoding a parameter set for a second picture which follows the first picture in coding order among the plurality of pictures after encoding the first picture, and encoding the second picture after encoding the parameter set, or (ii) a second operation for encoding the second picture without encoding the parameter set after encoding the first picture. The first operation may be performed when the second picture is a determined picture, in the performing of the first operation or the second operation.

Alternatively, this program may cause a computer to execute a decoding method for decoding a video including a plurality of pictures. The decoding method may include: decoding a first picture among the plurality of pictures; and performing (i) a first operation for decoding a parameter set for a second picture which follows the first picture in decoding order among the plurality of pictures after decoding the first picture, and decoding the second picture after decoding the parameter set, or (ii) a second operation for decoding the second picture without decoding the parameter set after decoding the first picture. The first operation may be performed when the second picture is a determined picture, in the performing of the first operation or the second operation.

Alternatively, this program may cause a computer to execute an encoding method for encoding a video including a plurality of pictures each assigned with a temporal ID indicating a hierarchical layer regarding temporal scalability. The encoding method may include: encoding a first picture among the plurality of pictures; and performing (i) a first operation for encoding a parameter set for a second picture which follows the first picture in coding order among the plurality of pictures after encoding the first picture, and encoding the second picture after encoding the parameter set, or (ii) a second operation for encoding the second picture without encoding the parameter set after encoding the first picture. In the performing of the first operation or the second operation, the first operation may be performed when a temporal ID assigned to the second picture is larger than a smallest temporal ID among a plurality of temporal IDs assigned to the plurality of pictures and smaller than a largest temporal ID among the plurality of temporal IDs.

Alternatively, this program may cause a computer to execute a decoding method for decoding a video including a plurality of pictures each assigned with a temporal ID indicating a hierarchical layer regarding temporal scalability. The decoding method may include: decoding a first picture among the plurality of pictures; and performing (i) a first operation for decoding a parameter set for a second picture which follows the first picture in decoding order among the plurality of pictures after decoding the first picture, and decoding the second picture after decoding the parameter set, or (ii) a second operation for decoding the second picture without decoding the parameter set after decoding the first picture In the performing of the first operation or the second operation, the first operation may be performed when a temporal ID assigned to the second picture is larger than a smallest temporal ID among a plurality of temporal IDs assigned to the plurality of pictures and smaller than a largest temporal ID among the plurality of temporal IDs.

In addition, each constituent element may be circuitry as described above. Circuits may compose circuitry as a whole, or may be separate circuits. Alternatively, each constituent element may be implemented as a general processor, or may be implemented as an exclusive processor.

In addition, the process that is executed by a particular constituent element may be executed by another constituent element. In addition, the processing execution order may be modified, or a plurality of processes may be executed in parallel. In addition, an encoder and decoder may include encoder 100 and decoder 200.

In addition, the ordinal numbers such as "first" and "second" used for explanations may be arbitrarily changed. A new ordinal number may be attached to a constituent element, or an ordinal number attached to a constituent element may be removed.

Although some aspects of encoder 100 and decoder 200 have been explained based on the above embodiments, aspects of encoder 100 and decoder 200 are not limited to these embodiments. The scope of the aspects of encoder 100 and decoder 200 may encompass embodiments obtainable by adding, to any of these embodiments, various kinds of modifications that a person skilled in the art would arrive at without deviating from the scope of the present disclosure and embodiments configurable by arbitrarily combining constituent elements in different embodiments.

This aspect may be implemented in combination with one or more of the other aspects according to the present disclosure. In addition, part of the processes in the flowcharts, part of the constituent elements of the apparatuses, and part of the syntax described in this aspect may be implemented in combination with other aspects.

Embodiment 2

As described in each of the above embodiments, each functional block can typically be realized as an MPU and memory, for example. Moreover, processes performed by each of the functional blocks are typically realized by a program execution unit, such as a processor, reading and executing software (a program) recorded on a recording medium such as ROM. The software may be distributed via, for example, downloading, and may be recorded on a recording medium such as semiconductor memory and distributed. Note that each functional block can, of course, also be realized as hardware (dedicated circuit).

Moreover, the processing described in each of the embodiments may be realized via integrated processing using a single apparatus (system), and, alternatively, may be realized via decentralized processing using a plurality of apparatuses. Moreover, the processor that executes the above-described program may be a single processor or a plurality of processors. In other words, integrated processing may be performed, and, alternatively, decentralized processing may be performed.

Embodiments of the present disclosure are not limited to the above exemplary embodiments; various modifications may be made to the exemplary embodiments, the results of which are also included within the scope of the embodiments of the present disclosure.

Next, application examples of the moving picture encoding method (image encoding method) and the moving picture decoding method (image decoding method) described in each of the above embodiments and a system that employs the same will be described. The system is characterized as including an image encoder that employs the image encoding method, an image decoder that employs the image decoding method, and an image encoder/decoder that includes both the image encoder and the image decoder. Other configurations included in the system may be modified on a case-by-case basis.

Usage Examples

Figure 32:
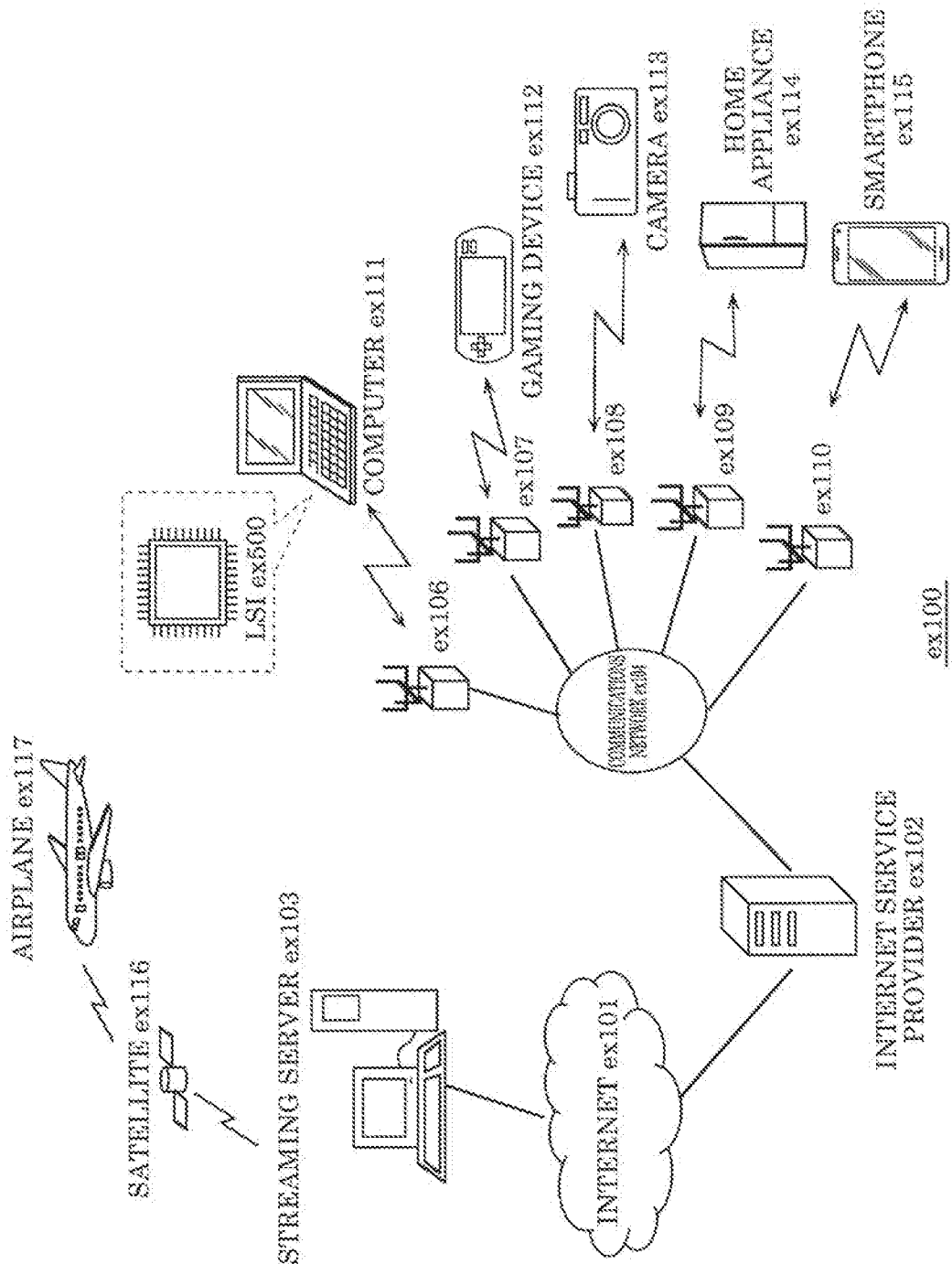
FIG. 32 illustrates an overall configuration of a content providing system for implementing a content distribution service.

FIG. 32 illustrates an overall configuration of content providing system ex100 for implementing a content distribution service. The area in which the communication service is provided is divided into cells of desired sizes, and base stations ex106, ex107, ex108, ex109, and ex110, which are fixed wireless stations, are located in respective cells.

In content providing system ex100, devices including computer ex111, gaming device ex112, camera ex113, home appliance ex114, and smartphone ex115 are connected to internet ex101 via internet service provider ex102 or communications network ex104 and base stations ex106 through ex110. Content providing system ex100 may combine and connect any combination of the above elements. The devices may be directly or indirectly connected together via a telephone network or near field communication rather than via base stations ex106 through ex110, which are fixed wireless stations. Moreover, streaming server ex103 is connected to devices including computer ex111, gaming device ex112, camera ex113, home appliance ex114, and smartphone ex115 via, for example, internet ex101. Streaming server ex103 is also connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via internet ex101 or internet service provider ex102, and may be connected to airplane ex117 directly instead of via satellite ex116.

Camera ex113 is a device capable of capturing still images and video, such as a digital camera. Smartphone ex115 is a smartphone device, cellular phone, or personal handyphone system (PHS) phone that can operate under the mobile communications system standards of the typical 2G, 3G, 3.9G, and 4G systems, as well as the next-generation 5G system.

Home appliance ex118 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex111, gaming device ex112, camera ex113, home appliance ex114, smartphone ex115, or airplane ex117) performs the encoding processing described in the above embodiments on still-image or video content captured by a user via the terminal, multiplexes video data obtained via the encoding and audio data obtained by encoding audio corresponding to the video, and transmits the obtained data to streaming server ex103. In other words, the terminal functions as the image encoder according to one aspect of the present disclosure.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data decode and reproduce the received data. In other words, the devices each function as the image decoder according to one aspect of the present disclosure.

[Decentralized Processing]

Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near the client is dynamically assigned to the client. Content is cached and streamed to the edge server to reduce load times. In the event of, for example, some kind of an error or a change in connectivity due to, for example, a spike in traffic, it is possible to stream data stably at high speeds since it is possible to avoid affected parts of the network by, for example, dividing the processing between a plurality of edge servers or switching the streaming duties to a different edge server, and continuing streaming.

Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing that maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount from an image, compresses data related to the feature amount as metadata, and transmits the compressed metadata to a server. For example, the server determines the significance of an object based on the feature amount and changes the quantization accuracy accordingly to perform compression suitable for the meaning of the image. Feature amount data is particularly effective in improving the precision and efficiency of motion vector prediction during the second compression pass performed by the server. Moreover, encoding that has a relatively low processing load, such as variable length coding (VLC), may be handled by the terminal, and encoding that has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos and the server, on a per-unit basis. The units may be, for example, groups of pictures (GOP), pictures, or tiles resulting from dividing a picture. This makes it possible to reduce load times and achieve streaming that is closer to real-time.

Moreover, since the videos are of approximately the same scene, management and/or instruction may be carried out by the server so that the videos captured by the terminals can be cross-referenced. Moreover, the server may receive encoded data from the terminals, change reference relationship between items of data or correct or replace pictures themselves, and then perform the encoding. This makes it possible to generate a stream with increased quality and efficiency for the individual items of data.

Moreover, the server may stream video data after performing transcoding to convert the encoding format of the video data. For example, the server may convert the encoding format from MPEG to VP, and may convert H.264 to H.265.

In this way, encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes.

[3D, Multi-Angle]

In recent years, usage of images or videos combined from images or videos of different scenes concurrently captured or the same scene captured from different angles by a plurality of terminals such as camera ex113 and/or smartphone ex115 has increased. Videos captured by the terminals are combined based on, for example, the separately-obtained relative positional relationship between the terminals, or regions in a video having matching feature points.

In addition to the encoding of two-dimensional moving pictures, the server may encode a still image based on scene analysis of a moving picture either automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. Note that the server may separately encode three-dimensional data generated from, for example, a point cloud, and may, based on a result of recognizing or tracking a person or object using three-dimensional data, select or reconstruct and generate a video to be transmitted to a reception terminal from videos captured by a plurality of terminals.

This allows the user to enjoy a scene by freely selecting videos corresponding to the video capturing terminals, and allows the user to enjoy the content obtained by extracting, from three-dimensional data reconstructed from a plurality of images or videos, a video from a selected viewpoint. Furthermore, similar to with video, sound may be recorded from relatively different angles, and the server may multiplex, with the video, audio from a specific angle or space in accordance with the video, and transmit the result.

In recent years, content that is a composite of the real world and a virtual world, such as virtual reality (VR) and augmented reality (AR) content, has also become popular. In the case of VR images, the server may create images from the viewpoints of both the left and right eyes and perform encoding that tolerates reference between the two viewpoint images, such as multi-view coding (MVC), and, alternatively, may encode the images as separate streams without referencing. When the images are decoded as separate streams, the streams may be synchronized when reproduced so as to recreate a virtual three-dimensional space in accordance with the viewpoint of the user.

In the case of AR images, the server superimposes virtual object information existing in a virtual space onto camera information representing a real-world space, based on a three-dimensional position or movement from the perspective of the user. The decoder may obtain or store virtual object information and three-dimensional data, generate two-dimensional images based on movement from the perspective of the user, and then generate superimposed data by seamlessly connecting the images. Alternatively, the decoder may transmit, to the server, motion from the perspective of the user in addition to a request for virtual object information, and the server may generate superimposed data based on three-dimensional data stored in the server in accordance with the received motion, and encode and stream the generated superimposed data to the decoder. Note that superimposed data includes, in addition to RGB values, an a value indicating transparency, and the server sets the a value for sections other than the object generated from three-dimensional data to, for example, 0, and may perform the encoding while those sections are transparent. Alternatively, the server may set the background to a predetermined RGB value, such as a chroma key, and generate data in which areas other than the object are set as the background.

Decoding of similarly streamed data may be performed by the client (i.e., the terminals), on the server side, or divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV, for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area or inspect a region in further detail up close.

In the future, both indoors and outdoors, in situations in which a plurality of wireless connections are possible over near, mid, and far distances, it is expected to be able to seamlessly receive content even when switching to data appropriate for the current connection, using a streaming system standard such as MPEG-DASH. With this, the user can switch between data in real time while freely selecting a decoder or display apparatus including not only his or her own terminal, but also, for example, displays disposed indoors or outdoors. Moreover, based on, for example, information on the position of the user, decoding can be performed while switching which terminal handles decoding and which terminal handles the displaying of content. This makes it possible to, while in route to a destination, display, on the wall of a nearby building in which a device capable of displaying content is embedded or on part of the ground, map information while on the move. Moreover, it is also possible to switch the bit rate of the received data based on the accessibility to the encoded data on a network, such as when encoded data is cached on a server quickly accessible from the reception terminal or when encoded data is copied to an edge server in a content delivery service.

[Scalable Encoding]

Figure 33:
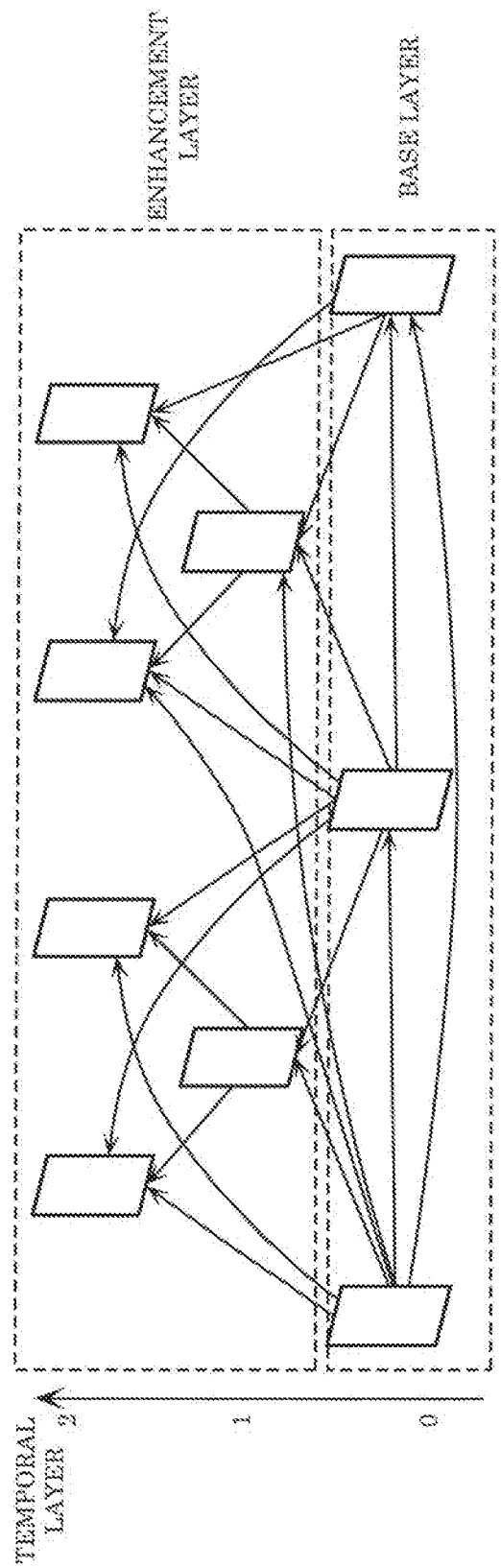
FIG. 33 illustrates one example of an encoding structure in scalable encoding.

The switching of content will be described with reference to a scalable stream, illustrated in FIG. 33, that is compression coded via implementation of the moving picture encoding method described in the above embodiments. The server may have a configuration in which content is switched while making use of the temporal and/or spatial scalability of a stream, which is achieved by division into and encoding of layers, as illustrated in FIG. 33. Note that there may be a plurality of individual streams that are of the same content but different quality. In other words, by determining which layer to decode up to based on internal factors, such as the processing ability on the decoder side, and external factors, such as communication bandwidth, the decoder side can freely switch between low resolution content and high resolution content while decoding. For example, in a case in which the user wants to continue watching, at home on a device such as a TV connected to the internet, a video that he or she had been previously watching on smartphone ex115 while on the move, the device can simply decode the same stream up to a different layer, which reduces server side load.

Furthermore, in addition to the configuration described above in which scalability is achieved as a result of the pictures being encoded per layer and the enhancement layer is above the base layer, the enhancement layer may include metadata based on, for example, statistical information on the image, and the decoder side may generate high image quality content by performing super-resolution imaging on a picture in the base layer based on the metadata. Super-resolution imaging may be improving the SN ratio while maintaining resolution and/or increasing resolution. Metadata includes information for identifying a linear or a non-linear filter coefficient used in super-resolution processing, or information identifying a parameter value in filter processing, machine learning, or least squares method used in super-resolution processing.

Figure 34:
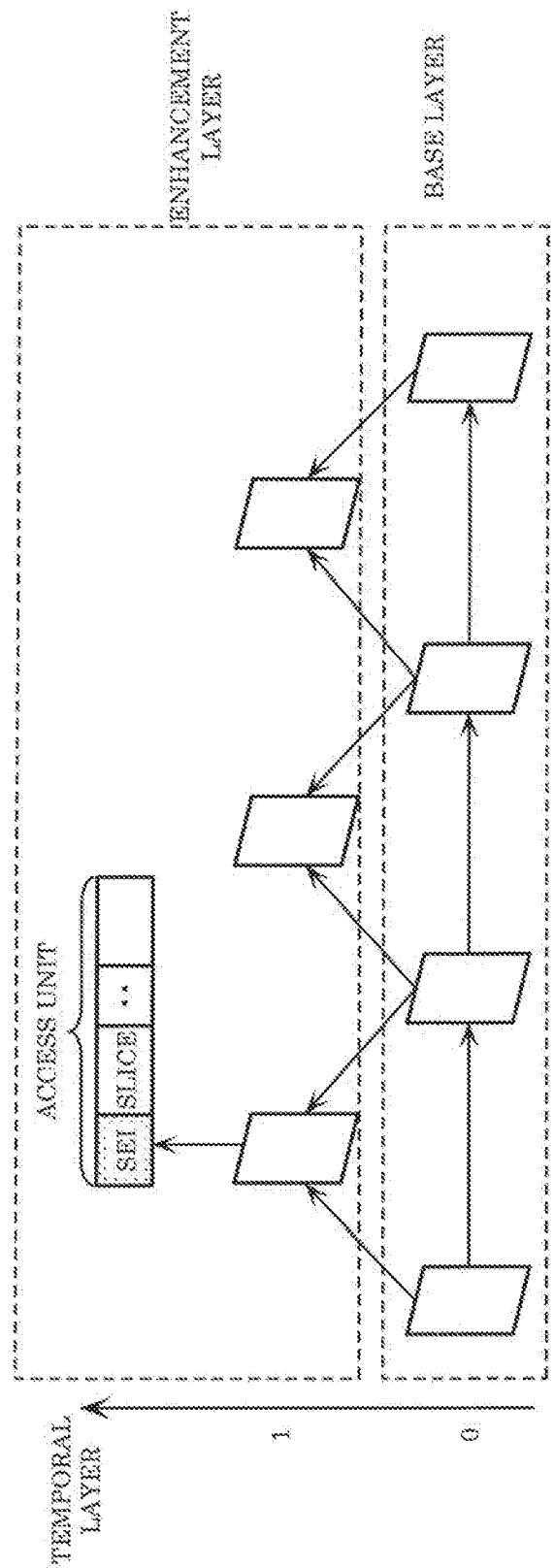
FIG. 34 illustrates one example of an encoding structure in scalable encoding.

Alternatively, a configuration in which a picture is divided into, for example, tiles in accordance with the meaning of, for example, an object in the image, and on the decoder side, only a partial region is decoded by selecting a tile to decode, is also acceptable. Moreover, by storing an attribute about the object (person, car, ball, etc.) and a position of the object in the video (coordinates in identical images) as metadata, the decoder side can identify the position of a desired object based on the metadata and determine which tile or tiles include that object. For example, as illustrated in FIG. 34, metadata is stored using a data storage structure different from pixel data such as an SEI message in HEVC. This metadata indicates, for example, the position, size, or color of the main object.

Moreover, metadata may be stored in units of a plurality of pictures, such as stream, sequence, or random access units. With this, the decoder side can obtain, for example, the time at which a specific person appears in the video, and by fitting that with picture unit information, can identify a picture in which the object is present and the position of the object in the picture.

[Web Page Optimization]

Figure 35:
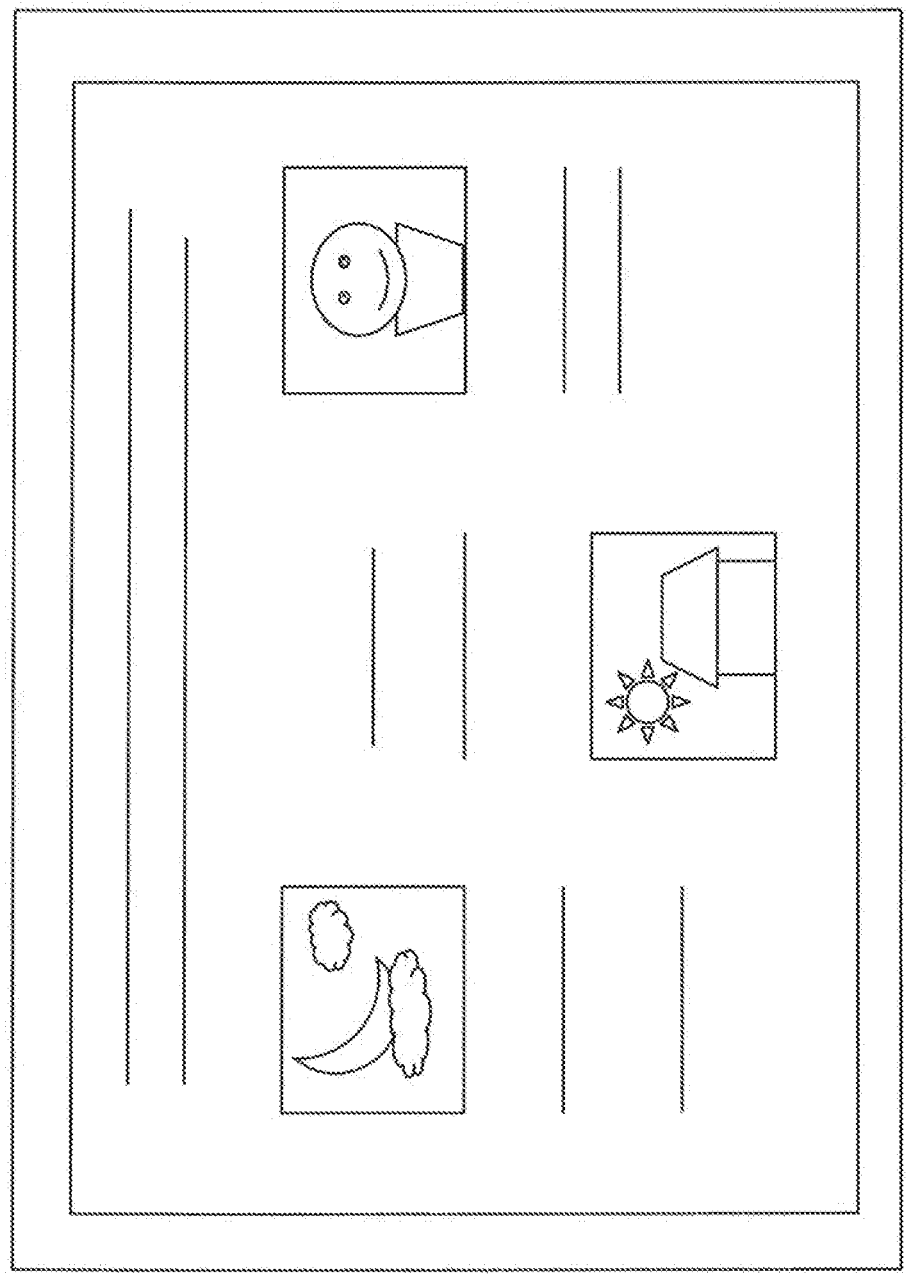
FIG. 35 illustrates an example of a display screen of a web page.
Figure 36:
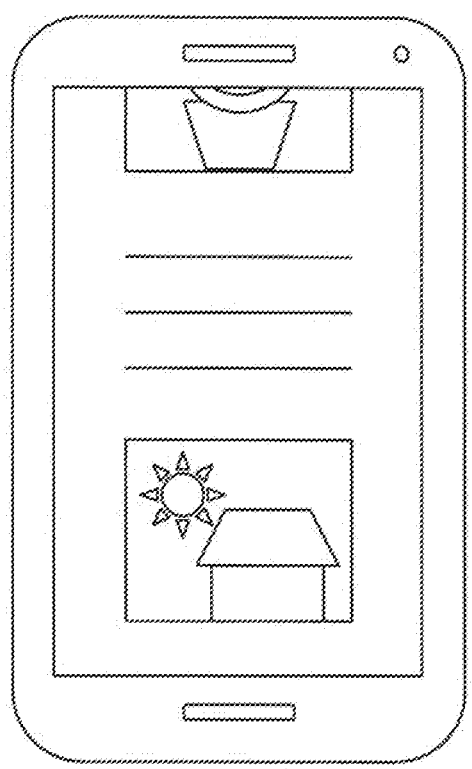
FIG. 36 illustrates an example of a display screen of a web page.

FIG. 35 illustrates an example of a display screen of a web page on, for example, computer ex111. FIG. 36 illustrates an example of a display screen of a web page on, for example, smartphone ex115. As illustrated in FIG. 35 and FIG. 36, a web page may include a plurality of image links which are links to image content, and the appearance of the web page differs depending on the device used to view the web page. When a plurality of image links are viewable on the screen, until the user explicitly selects an image link, or until the image link is in the approximate center of the screen or the entire image link fits in the screen, the display apparatus (decoder) displays, as the image links, still images included in the content or I pictures, displays video such as an animated gif using a plurality of still images or I pictures, for example, or receives only the base layer and decodes and displays the video.

When an image link is selected by the user, the display apparatus decodes giving the highest priority to the base layer. Note that if there is information in the HTML code of the web page indicating that the content is scalable, the display apparatus may decode up to the enhancement layer. Moreover, in order to guarantee real time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Moreover, the display apparatus may purposely ignore the reference relationship between pictures and coarsely decode all B and P pictures as forward reference pictures, and then perform normal decoding as the number of pictures received over time increases.

[Autonomous Driving]

When transmitting and receiving still image or video data such two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively, may simply be multiplexed with the image data.

In such a case, since the automobile, drone, airplane, etc., including the reception terminal is mobile, the reception terminal can seamlessly receive and decode while switching between base stations among base stations ex106 through ex110 by transmitting information indicating the position of the reception terminal upon reception request. Moreover, in accordance with the selection made by the user, the situation of the user, or the bandwidth of the connection, the reception terminal can dynamically select to what extent the metadata is received or to what extent the map information, for example, is updated.

With this, in content providing system ex100, the client can receive, decode, and reproduce, in real time, encoded information transmitted by the user.

[Streaming of Individual Content]

In content providing system ex100, in addition to high image quality, long content distributed by a video distribution entity, unicast or multicast streaming of low image quality, short content from an individual is also possible. Moreover, such content from individuals is likely to further increase in popularity. The server may first perform editing processing on the content before the encoding processing in order to refine the individual content. This may be achieved with, for example, the following configuration.

In real-time while capturing video or image content or after the content has been captured and accumulated, the server performs recognition processing based on the raw or encoded data, such as capture error processing, scene search processing, meaning analysis, and/or object detection processing. Then, based on the result of the recognition processing, the server-either when prompted or automatically-edits the content, examples of which include: correction such as focus and/or motion blur correction; removing low-priority scenes such as scenes that are low in brightness compared to other pictures or out of focus; object edge adjustment; and color tone adjustment. The server encodes the edited data based on the result of the editing. It is known that excessively long videos tend to receive fewer views. Accordingly, in order to keep the content within a specific length that scales with the length of the original video, the server may, in addition to the low-priority scenes described above, automatically clip out scenes with low movement based on an image processing result. Alternatively, the server may generate and encode a video digest based on a result of an analysis of the meaning of a scene.

Note that there are instances in which individual content may include content that infringes a copyright, moral right, portrait rights, etc. Such an instance may lead to an unfavorable situation for the creator, such as when content is shared beyond the scope intended by the creator. Accordingly, before encoding, the server may, for example, edit images so as to blur faces of people in the periphery of the screen or blur the inside of a house, for example. Moreover, the server may be configured to recognize the faces of people other than a registered person in images to be encoded, and when such faces appear in an image, for example, apply a mosaic filter to the face of the person. Alternatively, as pre- or post-processing for encoding, the user may specify, for copyright reasons, a region of an image including a person or a region of the background be processed, and the server may process the specified region by, for example, replacing the region with a different image or blurring the region. If the region includes a person, the person may be tracked in the moving picture, and the head region may be replaced with another image as the person moves.

Moreover, since there is a demand for real-time viewing of content produced by individuals, which tends to be small in data size, the decoder first receives the base layer as the highest priority and performs decoding and reproduction, although this may differ depending on bandwidth. When the content is reproduced two or more times, such as when the decoder receives the enhancement layer during decoding and reproduction of the base layer and loops the reproduction, the decoder may reproduce a high image quality video including the enhancement layer. If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

Other Usage Examples

The encoding and decoding may be performed by LSI ex500, which is typically included in each terminal. LSI ex500 may be configured of a single chip or a plurality of chips. Software for encoding and decoding moving pictures may be integrated into some type of a recording medium (such as a CD-ROM, a flexible disk, or a hard disk) that is readable by, for example, computer ex111, and the encoding and decoding may be performed using the software. Furthermore, when smartphone ex115 is equipped with a camera, the video data obtained by the camera may be transmitted. In this case, the video data is coded by LSI ex500 included in smartphone ex115.

Note that LSI ex500 may be configured to download and activate an application. In such a case, the terminal first determines whether it is compatible with the scheme used to encode the content or whether it is capable of executing a specific service. When the terminal is not compatible with the encoding scheme of the content or when the terminal is not capable of executing a specific service, the terminal first downloads a codec or application software then obtains and reproduces the content.

Aside from the example of content providing system ex100 that uses internet ex101, at least the moving picture encoder (image encoder) or the moving picture decoder (image decoder) described in the above embodiments may be implemented in a digital broadcasting system. The same encoding processing and decoding processing may be applied to transmit and receive broadcast radio waves superimposed with multiplexed audio and video data using, for example, a satellite, even though this is geared toward multicast whereas unicast is easier with content providing system ex100.

[Hardware Configuration]

Figure 37:
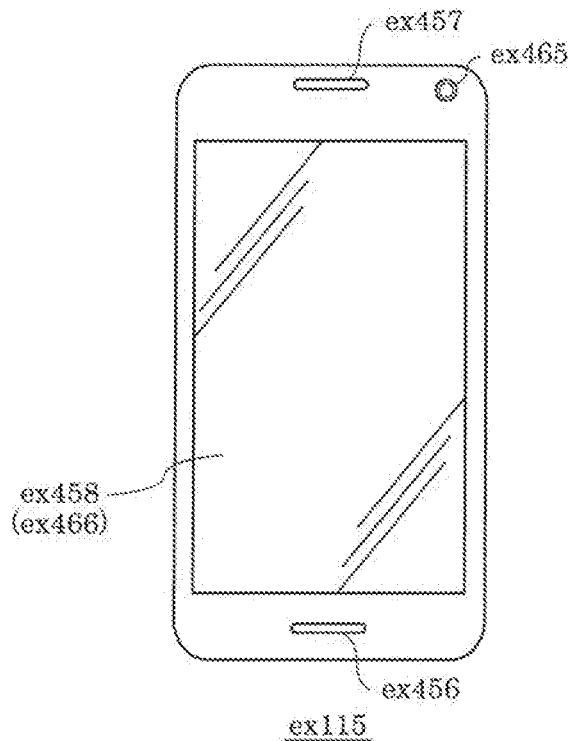
FIG. 37 illustrates one example of a smartphone.
Figure 38:
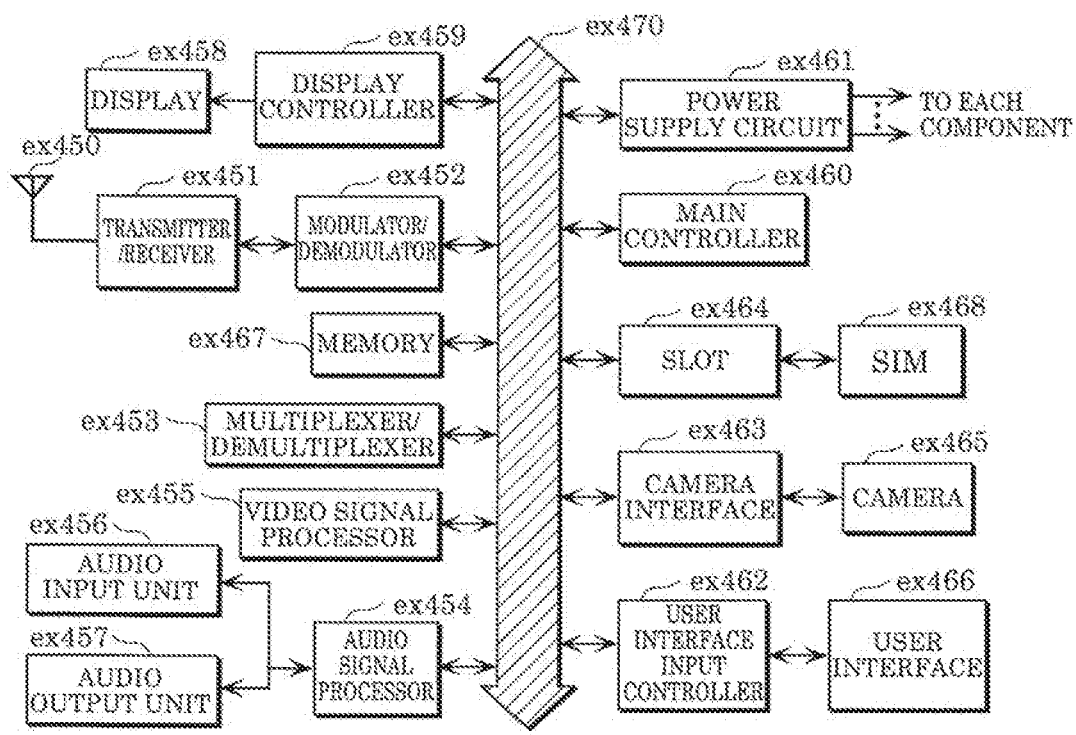
FIG. 38 is a block diagram illustrating a configuration example of a smartphone.

FIG. 37 illustrates smartphone ex115. FIG. 38 illustrates a configuration example of smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 further includes user interface ex466 such as a touch panel, audio output unit ex457 such as a speaker for outputting speech or other audio, audio input unit ex456 such as a microphone for audio input, memory ex467 capable of storing decoded data such as captured video or still images, recorded audio, received video or still images, and mail, as well as decoded data, and slot ex464 which is an interface for SIM ex468 for authorizing access to a network and various data. Note that external memory may be used instead of memory ex467.

Moreover, main controller ex460 which comprehensively controls display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns the power button of power supply circuit ex461 on, smartphone ex115 is powered on into an operable state by each component being supplied with power from a battery pack.

Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, and this is applied with spread spectrum processing by modulator/demodulator ex452 and digital-analog conversion and frequency conversion processing by transmitter/receiver ex451, and then transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457. In data transmission mode, text, still-image, or video data is transmitted by main controller ex460 via user interface input controller ex462 as a result of operation of, for example, user interface ex466 of the main body, and similar transmission and reception processing is performed. In data transmission mode, when sending a video, still image, or video and audio, video signal processor ex455 compression encodes, via the moving picture encoding method described in the above embodiments, a video signal stored in memory ex467 or a video signal input from camera ex465, and transmits the encoded video data to multiplexer/demultiplexer ex453. Moreover, audio signal processor ex454 encodes an audio signal recorded by audio input unit ex456 while camera ex465 is capturing, for example, a video or still image, and transmits the encoded audio data to multiplexer/demultiplexer ex453. Multiplexer/demultiplexer ex453 multiplexes the encoded video data and encoded audio data using a predetermined scheme, modulates and converts the data using modulator/demodulator (modulator/demodulator circuit) ex452 and transmitter/receiver ex451, and transmits the result via antenna ex450.

When video appended in an email or a chat, or a video linked from a web page, for example, is received, in order to decode the multiplexed data received via antenna ex450, multiplexer/demultiplexer ex453 demultiplexes the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470. Video signal processor ex455 decodes the video signal using a moving picture decoding method corresponding to the moving picture encoding method described in the above embodiments, and video or a still image included in the linked moving picture file is displayed on display ex458 via display controller ex459. Moreover, audio signal processor ex454 decodes the audio signal and outputs audio from audio output unit ex457. Note that since real-time streaming is becoming more and more popular, there are instances in which reproduction of the audio may be socially inappropriate depending on the user's environment. Accordingly, as an initial value, a configuration in which only video data is reproduced, i.e., the audio signal is not reproduced, is preferable. Audio may be synchronized and reproduced only when an input, such as when the user clicks video data, is received.

Although smartphone ex115 was used in the above example, three implementations are conceivable: a transceiver terminal including both an encoder and a decoder; a transmitter terminal including only an encoder; and a receiver terminal including only a decoder. Further, in the description of the digital broadcasting system, an example is given in which multiplexed data obtained as a result of video data being multiplexed with, for example, audio data, is received or transmitted, but the multiplexed data may be video data multiplexed with data other than audio data, such as text data related to the video. Moreover, the video data itself rather than multiplexed data maybe received or transmitted.

Although main controller ex460 including a CPU is described as controlling the encoding or decoding processes, terminals often include GPUs. Accordingly, a configuration is acceptable in which a large area is processed at once by making use of the performance ability of the GPU via memory shared by the CPU and GPU or memory including an address that is managed so as to allow common usage by the CPU and GPU. This makes it possible to shorten encoding time, maintain the real-time nature of the stream, and reduce delay. In particular, processing relating to motion estimation, deblocking filtering, sample adaptive offset (SAO), and transformation/quantization can be effectively carried out by the GPU instead of the CPU in units of, for example pictures, all at once.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to, for example, television receivers, digital video recorders, car navigation systems, mobile phones, digital cameras, digital video cameras, teleconferencing systems, electronic mirrors, etc.

What is claimed is:

1. An encoder which encodes a video including a plurality of pictures, the encoder comprising:
   circuitry; and
   memory,
   wherein, using the memory, the circuitry performs:
      encoding a first picture among the plurality of pictures, each of the plurality of pictures being assigned with a temporal ID indicating a hierarchical layer regarding temporal scalability; and
      performing (i) a first operation for encoding a parameter set for a second picture which follows the first picture in coding order among the plurality of pictures after encoding the first picture, and encoding the second picture after encoding the parameter set, or (ii) a second operation for encoding the second picture without encoding the parameter set after encoding the first picture,
   wherein the circuitry performs the first operation when the type of the second picture corresponds to a Step-wise Temporal Sub-layer Access (STSA) picture.

2. The encoder according to claim 1,
   wherein the parameter set is a common parameter set for the plurality of pictures included in a hierarchical layer including the second picture among the plurality of hierarchical layers.

3. The encoder according to claim 2,
   wherein in the first operation, the circuitry encodes a plurality of related parameter sets which are a plurality of parameter sets including the parameter set for the second picture after encoding the first picture, and encodes the second picture after encoding the plurality of related parameter sets,
   the plurality of related parameter sets correspond respectively to a plurality of hierarchical layers indicated by a plurality of temporal IDs larger than a temporal ID assigned to the second picture, and
   each of the plurality of related parameter sets is a parameter set for one or more pictures each assigned with a temporal ID indicating a hierarchical layer corresponding to the related parameter set among the plurality of pictures.

4. The encoder according to claim 1,
   wherein the second picture is a picture to be encoded next to the first picture among the plurality of pictures.

5. The encoder according to claim 1,
   wherein the circuitry further encodes a plurality of collective parameter sets which are a plurality of parameter sets including the parameter set for the second picture, before encoding an initial picture in coding order among the plurality of pictures,
   the plurality of collective parameter sets correspond respectively to a plurality of hierarchical layers indicated by a plurality of temporal IDs assigned to the plurality of pictures,
   each of the collective parameter sets is a parameter set for one or more pictures each assigned with a temporal ID indicating a hierarchical layer corresponding to the collective parameter set among the plurality of pictures, and
   in the first operation, the circuitry re-encodes the parameter set for the second picture after the first picture and before the second picture.

6. A decoder which decodes a video including a plurality of pictures, the decoder comprising:
circuitry; and
memory,
wherein, using the memory, the circuitry performs:
decoding a first picture among the plurality of pictures, each of the plurality of pictures being assigned with a temporal ID indicating a hierarchical layer regarding temporal scalability; and
performing (i) a first operation for decoding a parameter set for a second picture which follows the first picture in decoding order among the plurality of pictures after decoding the first picture, and decoding the second picture after decoding the parameter set, or (ii) a second operation for decoding the second picture without decoding the parameter set after decoding the first picture,
wherein the circuitry performs the first operation when the type of the second picture corresponds to a Step-wise Temporal Sub-layer Access (STSA) picture.

7. The decoder according to claim 6,
wherein the parameter set is a common parameter set for the plurality of pictures included in a hierarchical layer including the second picture among the plurality of hierarchical layers.

8. The decoder according to claim 7,
wherein in the first operation, the circuitry decodes a plurality of related parameter sets which are a plurality of parameter sets including the parameter set for the second picture after decoding the first picture, and decodes the second picture after decoding the plurality of related parameter sets,
the plurality of related parameter sets correspond respectively to a plurality of hierarchical layers indicated by a plurality of temporal IDs larger than a temporal ID assigned to the second picture, and
each of the plurality of related parameter sets is a parameter set for one or more pictures each assigned with a temporal ID indicating a hierarchical layer corresponding to the related parameter set among the plurality of pictures.

9. The decoder according to claim 6,
wherein the second picture is a picture to be decoded next to the first picture among the plurality of pictures.

10. The decoder according to claim 6,
wherein the circuitry further decodes a plurality of collective parameter sets which are a plurality of parameter sets including the parameter set for the second picture, before decoding an initial picture in decoding order among the plurality of pictures,
the plurality of collective parameter sets correspond respectively to a plurality of hierarchical layers indicated by a plurality of temporal IDs assigned to the plurality of pictures,
each of the collective parameter sets is a parameter set for one or more pictures each assigned with a temporal ID indicating a hierarchical layer corresponding to the collective parameter set among the plurality of pictures, and
in the first operation, the circuitry re-decodes the parameter set for the second picture after the first picture and before the second picture.

11. An encoding method for encoding a video including a plurality of pictures, the encoding method comprising:
encoding a first picture among the plurality of pictures, each of the plurality of pictures being assigned with a temporal ID indicating a hierarchical layer regarding temporal scalability; and
performing (i) a first operation for encoding a parameter set for a second picture which follows the first picture in coding order among the plurality of pictures after encoding the first picture, and encoding the second picture after encoding the parameter set, or (ii) a second operation for encoding the second picture without encoding the parameter set after encoding the first picture,
wherein the first operation is performed when the type of the second picture corresponds to a Step-wise Temporal Sub-layer Access (STSA) picture.

12. A decoding method for decoding a video including a plurality of pictures, the decoding method comprising:
decoding a first picture among the plurality of pictures, each of the plurality of pictures being assigned with a temporal ID indicating a hierarchical layer regarding temporal scalability; and
performing (i) a first operation for decoding a parameter set for a second picture which follows the first picture in decoding order among the plurality of pictures after decoding the first picture, and decoding the second picture after decoding the parameter set, or (ii) a second operation for decoding the second picture without decoding the parameter set after decoding the first picture,
wherein the first operation is performed when the type of the second picture corresponds to a Step-wise Temporal Sub-layer Access (STSA) picture.

* * * * *